United States Patent
Yanai et al.

(10) Patent No.: US 7,425,354 B2
(45) Date of Patent: *Sep. 16, 2008

(54) PHOTOPOLYMERIZABLE LIQUID CRYSTAL COMPOSITION, ITS POLYMER OR POLYMER COMPOSITION, AND OPTICAL COMPENSATION ELEMENT

(75) Inventors: Motoki Yanai, Chiba (JP); Kazuhiko Saigusa, Chiba (JP); Ryushi Shundo, Chiba (JP); Yoshiharu Hirai, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 398 days.

This patent is subject to a terminal disclaimer.

(21) Appl. No.: 10/992,565

(22) Filed: Nov. 19, 2004

(65) Prior Publication Data

US 2005/0213009 A1 Sep. 29, 2005

(30) Foreign Application Priority Data

Nov. 19, 2003 (JP) ............................. 2003-388976

(51) Int. Cl.
*C09K 19/52* (2006.01)
*C09K 19/38* (2006.01)
*C09K 19/34* (2006.01)
*C09K 19/32* (2006.01)
*C09K 19/30* (2006.01)
*C09K 19/12* (2006.01)
*C09K 19/20* (2006.01)

(52) U.S. Cl. .............. 428/1.1; 252/299.61; 252/299.62; 252/299.63; 252/299.64; 252/299.65; 252/299.66; 252/299.5; 252/299.01

(58) Field of Classification Search ................... 428/1.1; 252/299.61, 299.01, 299.5, 299.62, 299.63, 252/299.64, 299.65, 299.66, 299.67

See application file for complete search history.

(56) References Cited

U.S. PATENT DOCUMENTS 7,070,838 B2 * 7/2006 Sasada et al. ................ 428/1.1
7,157,124 B2 * 1/2007 Sasada et al. ................ 428/1.1

* cited by examiner

*Primary Examiner*—Shean C Wu
(74) *Attorney, Agent, or Firm*—Wenderoth, Lind & Ponack, L.L.P.

(57) ABSTRACT

The present invention provides a photopolymerizable liquid crystal composition comprising at least a compound having oxiranyl as a first component and at least a compound having oxetanyl as a second component, a polymer or a polymer composition obtained from the liquid crystal composition, a film obtained from the polymer or polymer composition, and an optical compensation element using the film.

30 Claims, No Drawings

PHOTOPOLYMERIZABLE LIQUID CRYSTAL COMPOSITION, ITS POLYMER OR POLYMER COMPOSITION, AND OPTICAL COMPENSATION ELEMENT

TECHNICAL FIELD

The present invention relates to a photopolymerizable liquid crystal composition, to a polymer or polymer composition obtained from the composition, and to a film obtained from the polymer or polymer composition, and an optical compensation element using the film.

BACKGROUND ART

In recent years, applications of polarizing plates or phase contrast plates employing photopolymerizable liquid crystals have been proposed as optical elements.

Such optical elements are obtained by liquid crystal-state polymerization and fixing of polymerizing liquid crystals with optical anisotropy. By accomplishing polymerization after appropriate control of orientation in the liquid crystal state, it is possible to obtain polymers having various modes of optical anisotropy such as homogeneous orientation, tilt orientation, hybrid orientation, homeotropic orientation and twist orientation.

Polymers with homogeneous orientation have been applied in combination with, for example, ½ wavelength plates, ¼ wavelength plates or films with other optical functions. Polymers with hybrid orientation have been applied, for example, as view angle compensation plates in TN (Twisted Nematic) mode. Polymers with homeotropic orientation have been applied in combination with, for example, films having other optical functions for enhancement of view angle characteristics of polarizing plates.

Also, polymers with twisted orientation, i.e. cholesteric liquid crystal polymers composed mainly of polymerizable liquid crystal molecules with positive birefringence, have been applied as various optical elements based on their helical pitch (P). For visible light applications, a pitch P sufficiently greater than the wavelength permits, for example, applications in head-up displays and projectors utilizing the rotatory function, or applications for optical compensation in ST (Super Twisted Nematic) mode, using the birefringence function (see Patent document 1).

When P is approximately equal to the wavelength, applications are largely divided into (A) $350/n_{ave}$ (nm)<P800/$n_{ave}$ (nm) and (B) P350/$n_{ave}$ (nm). Here, $n_{ave}$ is the mean refractive index. In the case of (A), for example, applications include utilizing selective reflection for purposes of design with decorative materials, anti-counterfeit measures and color filters used in liquid crystal display elements, or applications in brightness-enhanced films (see Non-patent document 1).

In the case of (B), the refractive index of the visible light range on the surface orthogonal to the helical axis is represented by $(ne^2+no^2)/2)^{0.5}$, and the refractive index of the visible light range in the helical axis direction is equal to no (see Non-patent document 2). Optical films with such optical properties are known as negative C-plates. Negative C-plates can compensate for retardation of liquid crystal regions with positive birefringence oriented orthogonal to the liquid crystal cell, and can therefore serve as compensation plates suited for enhanced viewing angle properties in liquid crystal display elements, particularly VA (Vertically Aligned), TN (Twisted Nematic), OCB (Optically Compensated Birefringence) and HAN (Hybrid Aligned Nematic) display elements. At the current time, these employ drawn polymer films or films utilizing discotic liquid crystals having planar oriented negative birefringence (see Patent document 2). Utilizing a cholesteric liquid crystal polymer made of liquid crystal molecules with positive birefringence increases the degree of design freedom for the refractive index anisotropy and its wavelength dispersion. Negative C-plates can also be used in combination with various compensation layers.

For all of the uses mentioned above, the optical anisotropy film may be provided either inside the cell or outside the cell. An example of a system where it is provided inside the cell is the system described in Patent document 3. An example of a system where it is provided outside the cell is the system described in JP-A-H14-372623/2002. When it is provided outside the cell, the polymerizable liquid crystal material is often laminated on a film such as TAC (triacetyl cellulose) or norbornene resin, as the support.

When the polymer of a polymerizable liquid crystal is utilized for the structure described above, a sufficient degree of heat resistance is required for use inside the cell, due to the conditions for molding of the other members, while for use outside the cell, satisfactory adhesion with the support and sufficient heat and humidity resistance are required. In both cases, it has been desirable to develop a photopolymerizable liquid crystal composition which, in terms of properties before curing, has a nematic phase at room temperature, has a wide nematic phase, exhibits satisfactory orientation properties and has rapid curing properties by UV irradiation in air, and in terms of properties after curing, has a suitable Δn for optical designs, has transparency and exhibits excellent heat and humidity resistance.

Patent document 1: JP-A-H8-87008/1996
Patent document 2: JP-A-H14-6138/2002
Patent document 3: JP-A-H13-222009/2001
Non-patent document 1: Y. Hisatake et al, Asia Display/IDW '01 LCT8-2
Non-patent document 2: W. H. de Jeu, Physical Properties of Liquid Crystalline Materials, Gordon and Breach, New York (1980)

SUMMARY OF THE INVENTION

The present invention comprises the following items A, B, C and D.
A. A liquid crystal composition comprising a compound with oxiranyl as the first component and a compound with oxetanyl as the second component.
B. A polymer or polymer composition obtained from the liquid crystal composition according to item A.
C. A film using the polymer or polymer composition according to item B.
D. An optical compensation element using the film according to item C.

DETAILED DESCRIPTION

It is an object of the present invention to provide a photopolymerizable liquid crystal composition which, in terms of properties of the photopolymerizable liquid crystals before curing, has a nematic phase at room temperature, has a wide nematic phase, exhibits satisfactory orientation properties and has rapid curing properties by UV irradiation in air, and in terms of properties after curing, has satisfactory adhesion with supports, exhibits sufficient heat and humidity resistance, has a suitable Δn and exhibits transparency, as well as a optical compensation element employing it.

The present invention encompasses the following items 1 to 31.

1. A liquid crystal composition comprising a compound with oxiranyl as the first component and a compound with oxetanyl as the second component.

2. A liquid crystal composition according to item 1, wherein the compound with oxiranyl as the first component is a compound represented by any of the following formulas (1-1) to (1-3):

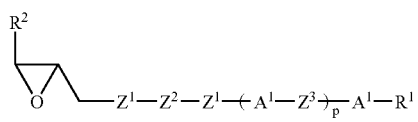
(1-1)

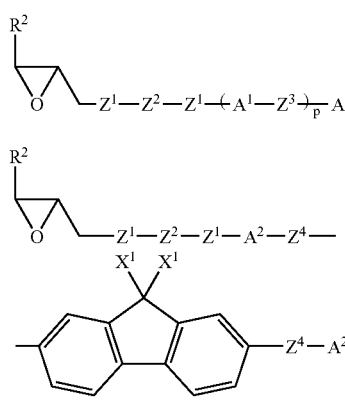
(1-2)
(1-3)

wherein, $R^1$ is a halogen, —CN, —NCS, —OCF$_3$, —OCF$_2$H, C2-30 alkenyl or C1-30 alkyl, wherein any —CH$_2$— in the alkyl or alkenyl may be replaced with —O— or —S—; $R^2$ is independently hydrogen, a halogen or C1-5 alkyl, wherein any hydrogen in the group may be replaced with a halogen; $Z^1$ is independently a single bond, —O—, —S—, —COO—, —OCO— or —OCOO—; $Z^2$ is independently a single bond or C1-30 alkylene, wherein any —CH$_2$— in the group may be replaced with —O— or —S—; $Z^3$ is independently a single bond, —CH$_2$CH$_2$—, —O—, —S—, —COO—, —OCO—, —OCOO—, —CC—, —CH=CH—, —CH$_2$O—, —OCH$_2$—, —N=N—, —N=N(O)—, —CH$_2$S—, —SCH$_2$—, —N=CH—, —CH=N—, —CO—NH—, —NH—CO—, —OCO—CH=CH—, —CH=CH—COO—, —CH=CH—CO—NH—, —NH—CO—CH=CH—, —(CH$_2$)$_q$—COO— or —OCO—(CH$_2$)$_q$—; $Z^4$ is independently a single bond, —CH$_2$CH$_2$—, —O—, —COO—, —OCO— or —CC—; $A^1$ is independently an aromatic ring, aliphatic ring, heterocyclic ring or fused ring, and any hydrogen in the ring may be replaced with a halogen or C1-10 alkyl, wherein the hydrogens of the alkyl may be replaced with halogens; $A^2$ is independently 1,4-cyclohexylene, 1,4-phenylene or 1,4-phenylene with at least one hydrogen replaced with a halogen or C1-10 alkyl, wherein any hydrogen of the alkyl may be replaced with a halogen; $X^1$ is independently hydrogen, a halogen or C1-10 alkyl, wherein any hydrogen of the alkyl may be replaced with a halogen; p is an integer of 1-3; and q is an integer of 1-20.

3. A liquid crystal composition according to item 1, wherein the compound with oxetanyl as the second component is a compound represented by any of the following formulas (2-1) to (2-3):

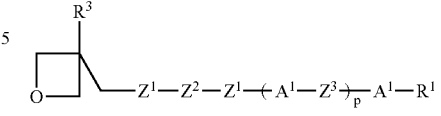
(2-1)

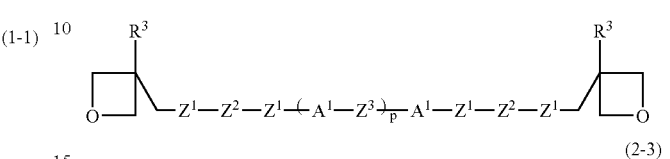
(2-2)

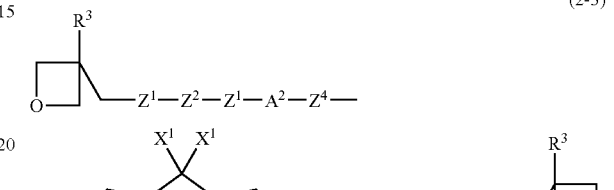
(2-3)

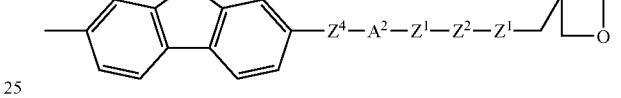

wherein $R^1$ is a halogen, —CN, —NCS, —OCF$_3$, —OCF$_2$H, C2-30 alkenyl or C1-30 alkyl, wherein any —CH$_2$— in the alkenyl or alkyl may be replaced with —O— or —S—; $R^3$ is independently a halogen or C1-5 alkyl, wherein any hydrogen in the group may be replaced with a halogen; $Z^1$ is independently a single bond, —O—, —S—, —COO—, —OCO— or —OCOO—; $Z^2$ is independently a single bond or C1-30 alkylene, wherein any —CH$_2$— in the group may be replaced with —O— or —S—; $Z^3$ is independently a single bond, —CH$_2$CH$_2$—, —O—, —S—, —COO—, —OCO—, —OCOO—, —CC—, —CH=CH—, —CH$_2$O—, —OCH$_2$—, —N=N—, —N=N(O)—, —CH$_2$S—, —SCH$_2$—, —N=CH—, —CH=N—, —CO—NH—, —NH—CO—, —OCO—CH=CH—, —CH=CH—COO—, —CH=CH—CO—NH—, —NH—CO—CH=CH—, —(CH$_2$)$_q$—COO or —OCO—(CH$_2$)$_q$—; $Z^4$ is independently a single bond, —CH$_2$CH$_2$—, —O—, —COO—, —OCO— or —CC—; $A^1$ is independently an aromatic ring, aliphatic ring, heterocyclic ring or fused ring, and any hydrogen in the ring may be replaced with a halogen or C1-10 alkyl, wherein the hydrogens of the alkyl group may be replaced with halogens; $A^2$ is independently 1,4-cyclohexylene, 1,4-phenylene or 1,4-phenylene with at least one hydrogen replaced with a halogen or C1-10 alkyl, wherein any hydrogen of the alkyl may be replaced with a halogen; $X^1$ is independently hydrogen, a halogen or C1-10 alkyl, wherein any hydrogen of the alkyl group may be replaced with a halogen; p is an integer of 1-3; and q is an integer of 1-20.

4. A liquid crystal composition according to item 1, which comprises at least one compound selected from the group consisting of compounds represented by formulas (1-1) to (1-3) as the first component composed of a compound with oxiranyl, and at least one compound selected from the group consisting of compounds represented by formulas (2-1) to (2-3) as the second component composed of a compound with oxetanyl:

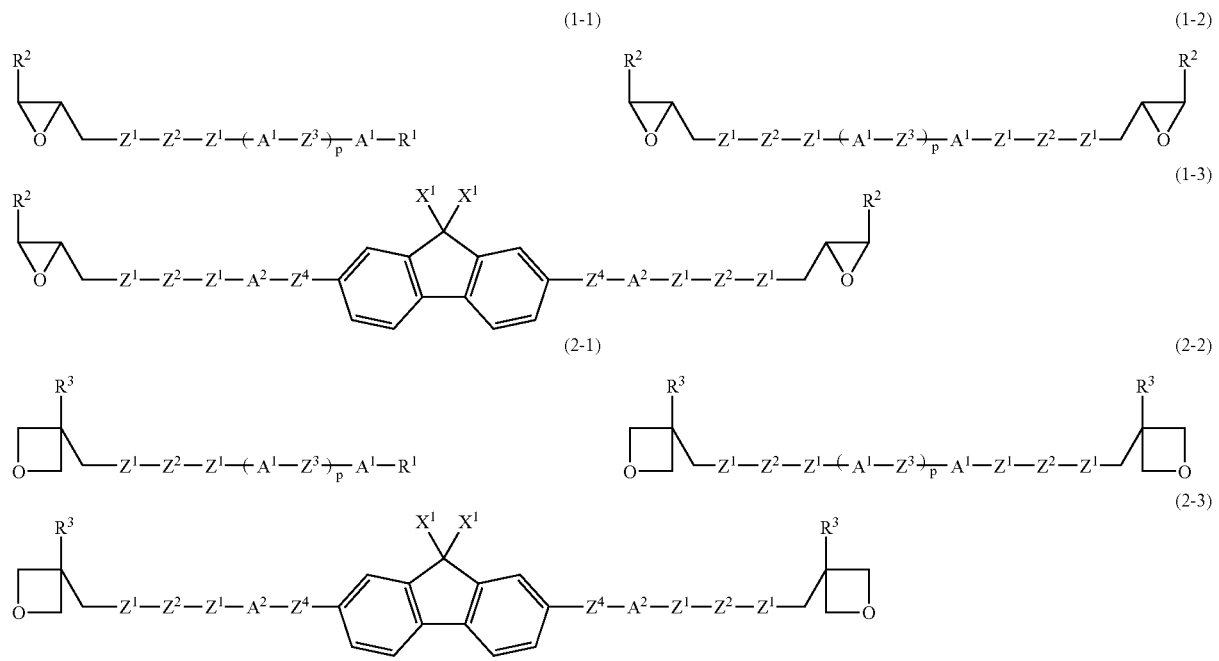

wherein, $R^1$ is a halogen, —CN, —NCS, —OCF$_3$, —OCF$_2$H, C2-30 alkenyl or C1-30 alkyl, wherein any —CH$_2$— in the alkenyl or alkyl group may be replaced with —O— or —S—; $R^2$ is independently hydrogen, a halogen or C1-5 alkyl, wherein any hydrogen in the group may be replaced with a halogen; $R^3$ is independently a halogen or C1-5 alkyl, wherein any hydrogen in the group may be replaced with a halogen; $Z^1$ is independently a single bond, —O—, —S—, —COO—, —OCO— or —OCOO—; $Z^2$ is independently a single bond or C1-30 alkylene, wherein any —CH$_2$— in the group may be replaced with —O— or —S—; $Z^3$ is independently a single bond, —CH$_2$CH$_2$—, —O—, —S—, —COO—, —OCO—, —OCOO—, —CC—, —CH=CH—, —CH$_2$O—, —OCH$_2$—, —N=N—, —N=N(O)—, —CH$_2$S—, —SCH$_2$—, —N=CH—, —CH=N—, —CO—NH—, —NH—CO—, —OCO—CH=CH—, —CH=CH— COO—, —CH=CH—CO—NH—, —NH—CO—CH=CH—, —(CH$_2$)$_q$—COO— or —OCO— (CH$_2$)$_q$—; $Z^4$ is independently a single bond, —CH$_2$CH$_2$—, —O—, —COO—, —OCO— or —CC—; $A^1$ is independently an aromatic ring, aliphatic ring, heterocyclic ring or fused ring, and at least one hydrogen in the ring may be replaced with a halogen or C1-10 alkyl, wherein the hydrogens of the alkyl may be replaced with halogens; $A^2$ is independently 1,4-cyclohexylene, 1,4-phenylene or 1,4-phenylene with at least one hydrogen replaced with a halogen or C1-10 alkyl, wherein any hydrogen of the alkyl may be replaced with a halogen; $X^1$ is independently hydrogen, a halogen or C1-10 alkyl, wherein any hydrogen of the alkyl may be replaced with a halogen; p is an integer of 1-3; and q is an integer of 1-20.

5. A liquid crystal composition according to item 4, wherein in formulas (1-1), (1-2), (1-3), (2-1), (2-2) and (2-3), $R^2$ is hydrogen; $R^3$ is methyl or ethyl; $Z^3$ is independently a single bond, —CH$_2$CH$_2$—, —O—, —COO—, —OCO—, —OCOO—, —CC—, —CH=CH—, —CH$_2$O—, —OCH$_2$—, —OCO—CH=CH—, —CH=CH— COO—, —(CH$_2$)$_q$—COO—, —OCO— (CH$_2$)$_q$—, —N=N—, —N=CH— or —CH=N—; $A^1$ is a ring selected from the group represented by the following formulas (B1) to (B15); and q is an integer of 1-20:

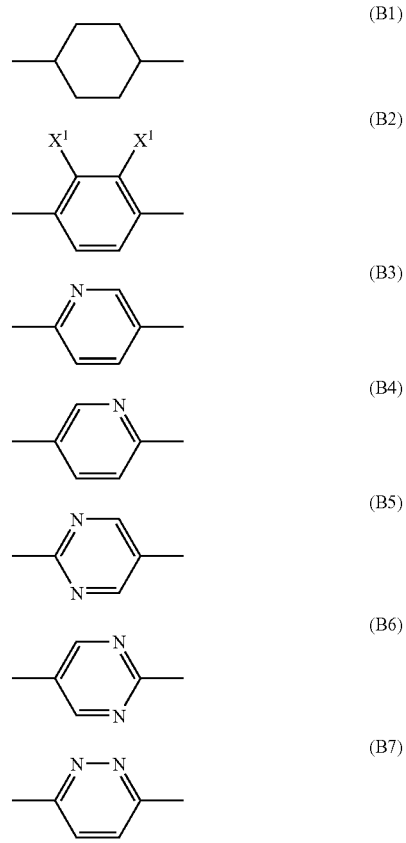

-continued

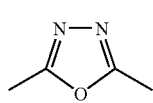
(B8)

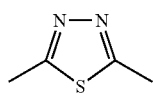
(B9)

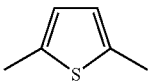
(B10)

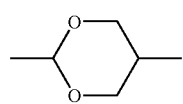
(B11)

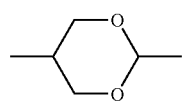
(B12)

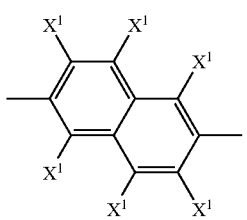
(B13)

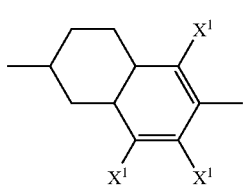
(B14)

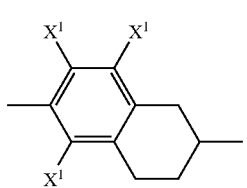
(B15)

wherein, $X^1$ is independently hydrogen, a halogen or C1-10 alkyl, wherein any hydrogen of the alkyl may be replaced with a halogen.

6. A liquid crystal composition according to item 5, which comprises at least one compound selected from the group consisting of compounds represented by formulas (1-1) or (1-2) as the first component composed of a compound with oxiranyl, and at least one compound selected from the group consisting of compounds represented by formula (2-1) or (2-2) as the second component composed of a compound with oxetanyl.

7. A liquid crystal composition according to item 5, which comprises at least one compound selected from the group consisting of compounds represented by formula (1-1) or (1-2) as the first component composed of a compound with oxiranyl, and at least one compound selected from the group consisting of compounds represented by formula (2-3) as the second component composed of a compound with oxetanyl.

8. A liquid crystal composition according to item 5, which comprises at least one compound selected from the group consisting of compounds represented by formula (1-3) as the first component composed of a compound with oxiranyl, and at least one compound selected from the group consisting of compounds represented by formula (2-1) or (2-2) as the second component composed of a compound with oxetanyl.

9. A liquid crystal composition according to item 5, which comprises at least one compound selected from the group consisting of compounds represented by formula (1-3) as the first component composed of a compound with oxiranyl, and at least one compound selected from the group consisting of compounds represented by formula (2-3) as the second component composed of a compound with oxetanyl.

10. A liquid crystal composition according to item 6, wherein p=1 or 2 in formula (1-1), p=1 or 2 in formula (1-2), p=1 or 2 in formula (2-1) and p=1 or 2 in formula (2-2).

11. A liquid crystal composition according to item 7, wherein p=1 or 2 in formula (1-1) and p=1 or 2 in formula (1-2).

12. A liquid crystal composition according to item 8, wherein $Z^4$ is independently —COO— or —OCO— in formula (1-3), p=1 or 2 in formula (2-1) and p=1 or 2 in formula (2-2).

13. A liquid crystal composition according to item 9, wherein $Z^4$ is independently —COO— or —OCO— in formula (1-3) and $Z^4$ is independently —COO— or —OCO— in formula (2-3).

14. A liquid crystal composition according to item 4, wherein in formulas (1-1), (1-2), (1-3), (2-1), (2-2) and (2-3), $R^1$ is —CN, F, ethyl or propyl; $R^2$ is hydrogen; $R^3$ is methyl or ethyl; $Z^1$ is a single bond or —O—; $Z^2$ is a single bond or methylene, ethylene, trimethylene, tetramethylene, pentamethylene or hexamethylene: $Z^3$ is independently a single bond, —CC—, —COO—, —OCO—, —(CH$_2$)$_q$—COO— or —OCO—(CH$_2$)$_q$—; $Z^4$ is —COO— or —OCO—; $A^1$ is 1,4-phenylene, 2-fluoro-1,4-phenylene, 3-fluoro-1,4-phenylene, 2,3-difluoro-1,4-phenylene, 2-trifluoromethyl-1,4-phenylene, 3-trifluoromethyl-1,4-phenylene, 2,3-di-trifluoromethyl-1,4-phenylene, 2-methyl-1,4-phenylene, 3-methyl-1,4-phenylene, 2,3-dimethyl-1,4-phenylene or 1,4-hexylene; X1 is hydrogen or methyl; and q is 2.

15. A liquid crystal composition according to any one of items 1 to 14, which comprises the first component in a range of 5-95 wt % and the second component in a range of 5-95 wt %, with respect to the total weight of the liquid crystal composition.

16. A liquid crystal composition according to any one of items 1 to 14, which further comprises an optically active compound as a third component.

17. A liquid crystal composition according to item 16, wherein the optically active compound is any compound represented by the following formula (3-1) or (3-2):

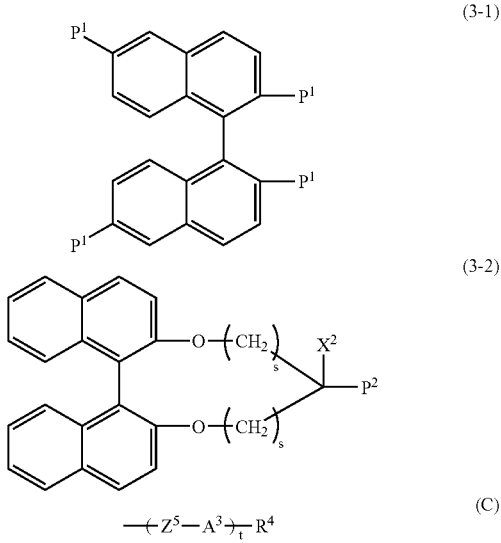

wherein $P^l$ is independently hydrogen, a halogen or (C), provided that at least two $P^1$ groups are (C); $P^2$ is (C); $R^4$ is independently a halogen, —CN, C2-30 alkenyl or C1-30 alkyl, wherein any —CH$_2$— in the alkenyl or alkyl may be replaced with —O— or —S—, any hydrogen in the alkenyl or alkyl may be replaced with a halogen, and one hydrogen in the alkenyl or alkyl may be replaced with an epoxy or oxetane group; $Z^5$ is independently a single bond, —O—, —COO—, —OCO—, —OCF$_2$— or —(CH$_2$)$_r$—, wherein one —CH$_2$— of the —(CH$_2$)$_r$— group may be replaced with —O—; $X^2$ is independently hydrogen, a halogen or C1-10 alkyl, wherein any hydrogen of the alkyl may be replaced with a halogen; $A^3$ is independently 1,4-cyclohexylene, 1,4-phenylene or 1,4-phenylene with at least one hydrogen replaced with a halogen; r is an integer of 1-20; s is 0 or 1 and t is an integer of 1-3.

18. A liquid crystal composition according to item 17, in formulas (3-1) and (C), $P^1$ is independently hydrogen or a group represented by formula (C); $Z^5$ is a single bond, —OCO— or —O— (CH$_2$)$_r$—O—; $A^3$ is 1,4-phenylene of 1,4-cyclohexylene; $R^4$ is pentyl or a group represented by the following formula (5):

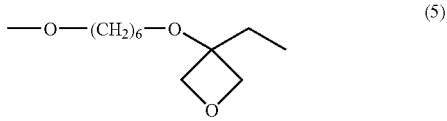

r is an integer of 1-20.

19. A liquid crystal composition according to any one of items 16 to 18, which comprises the first component in a range of 5-95 wt %, the second component in a range of 5-95 wt % and the third component in a range of 0.01-30 wt %, with respect to the total weight of the liquid crystal composition.

20. A liquid crystal composition according to any one of items 1 to 14 and 16 to 19, which comprises a non-polymerizable liquid crystal compound.

21. A liquid crystal composition according to any one of items 1 to 15 and 19, which composed solely of a polymerizable compound.

22. A polymer composition obtained from a liquid crystal composition according to item 20, which comprises a non-polymerizable liquid crystal compound.

23. A polymer obtained from a liquid crystal composition according to item 21, which composed solely of a polymerizable compound.

24. A polymer composition according to item 22, having a pitch of at least 1 μm and less than 200 μm.

25. A polymer according to item 23, having a pitch of at least 1 μm and less than 200 μm.

26. A polymer composition according to item 22, having a selective reflection wavelength range of at least 350 nm and less than 800 nm.

27. A polymer according to item 23, having a selective reflection wavelength range of at least 350 nm and less than 800 nm.

28. A polymer composition according to item 22, having a selective reflection wavelength range of less than 350 nm.

29. A polymer according to item 23, having a selective reflection wavelength range of less than 350 nm.

30. A film comprising a polymer composition according to any one of items 22, 24, 26 and 28, or a polymer according to any one of items 23, 25, 27 and 29.

31. An optical compensation element employing a polymer composition according to any one of items 22, 24, 26 and 28, or a polymer according to any one of items 23, 25, 27 and 29.

DETAILED DESCRIPTIONS

The terms used for description of the present invention will be explained first. The angle formed by the orientation vector with the base plane will be referred to as "tilt angle". An orientation with a uniform tilt angle of approximately zero (particularly 0-5°) from one interface to the other interface will be referred to as "homogeneous orientation". An interface is a base interface or free interface having an orientation layer. An orientation with a uniformly constant tilt angle (particularly 5-85°) from one interface to the other interface will be referred to as "tilt orientation". An orientation with an increasing tilt angle from one interface to the other interface, which is 45-90° at the other interface, will be referred to as "hybrid orientation". An orientation with a uniform tilt angle of 85-90° from one interface to the other interface will be referred to as "homeotropic orientation". An orientation wherein the orientation vector is a twisted structure and the helical axis is approximately orthogonal to the interface will be referred to as "twist orientation".

The usage of terms throughout the present specification will now be explained. The major component of the liquid crystal composition is a photopolymerizable liquid crystal compound. The term "liquid crystal compound" is a general term for compounds having a liquid crystal phase such as a nematic phase or smectic phase, and compounds which do not have a liquid crystal phase but are useful as composition components. "Compound (1-1)" means at least one compound selected from the group consisting of compounds represented by formula (1-1). Corresponding terms will be used for compounds of the other formulas. The upper limit temperature for the nematic phase will sometimes be referred to as "the upper limit". The lower limit temperature for the nematic phase will sometimes be referred to as "the lower limit". The explanation of the properties such as optical anisotropy will refer to the values measured by the methods described in the examples. The proportions (percentages) of the components of the composition are weight percentages (wt %) based on the total weight of the composition.

The symbol $R^2$ is used in more than one compound of compounds (1-1) to (1-3). The meanings of $R^2$ in each of these compounds may be either the same or different. This rule also applies to $R^1$, $R^3$, $R^4$, $P^1$, $P^2$, $A^1$, $A^2$, $Z^1$, $Z^2$, $Z^3$, $Z^4$, $Z^5$, $X^1$, $X^2$, p, q, r, s and t.

The composition of the invention has properties common to compositions, a wide temperature range of nematic phase, compatibility with solvents used for coating, an orientation property and a rapid curing property by UV irradiation in air. Its properties after curing include suitable optical anisotropy and wavelength dispersion, transparency, heat resistance, humidity resistance and satisfactory adhesion with various base materials.

The composition of the invention will now be explained in the following order. First, the major properties of the constituent compounds, and the major effects of the compounds on the composition, will be explained. Second, preferred proportions of the constituent compounds and the reasons therefor will be explained. Third, preferred modes of the constituent compounds will be explained. Fourth, specific examples of constituent compounds will be mentioned. Fifth, methods for synthesizing the constituent compounds will be explained.

The main properties of the constituent compounds will be explained first.

Compounds (1-1) to (1-3) as the first component have, as properties before curing, a wide nematic phase range, satisfactory orientation properties and high compatibility with other liquid crystal compounds, and allow adjustment of Δn, the lower limit and the upper limit to suit the purpose, while they have as properties after curing, transparency, heat resistance, humidity resistance and excellent adhesion with various base materials, and when using a solvent for coating, exhibit excellent solubility in the solvent.

Compounds (2-1) to (2-3) as the second component have, has properties before curing, a wide nematic phase range, satisfactory orientation properties and high compatibility with other liquid crystal compounds, and allow adjustment of Δn, the lower limit and the upper limit to suit the purpose, while they have as properties after curing, transparency, heat resistance, humidity resistance and excellent adhesion with various base materials, and, when using a solvent for coating, exhibit excellent solubility in the solvent.

Compounds (3-1) and (3-2) as the third component are optically active compounds having notably high HTP (helical twist power) and satisfactory compatibility with liquid crystal compositions and solvents, and can exhibit a helical pitch suited for the purpose.

The preferred proportions of the constituent compounds and the reasons therefor will be explained second.

The following are the preferred proportions for a composition comprising compounds (1-1) to (1-3) as the first component and compounds (2-1) to (2-3) as the second component.

The preferred proportion for the first component is 5-95 wt %, in order to have a wide nematic phase range, satisfactory orientation properties, rapid curing properties under UV irradiation in air, heat resistance, humidity resistance and satisfactory adhesion with base materials. A more preferred range is 10-90 wt %. The preferred proportion for the second component is 5-95 wt %, in order to have a wide nematic phase range, satisfactory orientation properties, rapid curing properties under UV irradiation in air, heat resistance, humidity resistance and satisfactory adhesion with base materials. A more preferred range is 10-90 wt %. The proportions of the first component and second component are preferably not outside of these ranges because the rapid curing property under photoirradiation in air will be impaired, and the heat and humidity resistance will also be reduced.

When the third component is also added in addition to the first and second components to obtain an optical anisotropy film having a twisted structure around the optical axis, the preferred proportion for the third component is 0.01-30% in order to adjust the pitch to suit the purpose. A more preferred range is 0.01-20%. The proportion is preferably not less than 0.01% because it may not be possible to exhibit the prescribed pitch. It is also preferably not above 30% because the compatibility with other liquid crystal components will be compromised.

Preferred modes of the constituent compounds will now be explained third.

The preferred groups for $R^1$ are halogens, —CN, —NCS, —OCF$_3$, —OCF$_2$H, C2-10 alkenyl and C1-10 alkyl, wherein any —CH$_2$— in the alkyl or alkenyl may be replaced with —O—. The preferred group for $R^2$ is hydrogen, the preferred groups for $R^3$ are methyl and ethyl, and the preferred groups for $R^4$ are halogens, —CN, C2-10 alkenyl and C1-10 alkyl, wherein any —CH$_2$— in the alkyl or alkenyl may be replaced with —O—, any hydrogen in the alkenyl or alkyl may be replaced with a halogen, and one hydrogen in the alkenyl or alkyl group may be replaced with an epoxy or oxetane group. The preferred groups for $P^1$ are hydrogen, halogens and (C), with the proviso that at least two $P^1$ groups are (C).

Preferred alkyls are methyl, ethyl, propyl, butyl, pentyl, hexyl, heptyl and octyl. More preferred alkyls are ethyl, propyl, butyl, pentyl and heptyl.

Preferred alkenyls are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl. More preferred alkenyls are vinyl, 1-propenyl, 3-butenyl and 3-pentenyl. The preferred configuration for the —CH═CH— in these alkenyls will depend on the position of the double bond. The trans configuration is preferred for alkenyl such as 1-propenyl, 1-butenyl, 1-pentenyl, 1-hexenyl, 3-pentenyl or 3-hexenyl. The cis configuration is preferred for alkenyl such as 2-butenyl, 2-pentenyl or 2-hexenyl.

Preferred groups for $A^1$ are rings selected from the group represented by (B1) to (B15).

Preferred groups for $A^2$ are 1,4-cyclohexylene, 1,4-phenylene and 1,4-phenylene with at least one hydrogen replaced with a halogen or C1-10 alkyl, wherein any hydrogen of the alkyl may be replaced with a halogen.

The "1,4-phenylene with at least one hydrogen replaced with a halogen or C1-10 alkyl" for $A^2$ is 1,4-phenylene, 2-fluoro-1,4-phenylene, 2-methyl-1,4-phenylene, 2,3-difluoro-1,4-phenylene, 2,5-difluoro-1,4-phenylene, 2,6-difluoro-1,4-phenylene, 2,3,5-trifluoro-1,4-phenylene or 2,3,5,6-tetrafluoro-1,4-phenylene, and 1,4-phenylene with at least one hydrogen replaced with —CF$_3$ or —CF$_2$H includes 2-trifluoromethyl-1,4-phenylene, 2-difluoromethyl-1,4-phenylene and 2,3-bistrifluoromethyl-1,4-phenylene.

Preferred groups among these are 1,4-phenylene, 2-fluoro-1,4-phenylene, 2-methyl-1,4-phenylene, 2,5-difluoro-1,4-phenylene, 2-trifluoromethyl-1,4-phenylene, 2-difluoro-1,4-phenylene, 2,3-bistrifluoromethyl-1,4-phenylene and 2,6-difluoro-1,4-phenylene. The spatial configuration for 1,4-cyclohexylene is preferably trans rather than cis.

Preferred groups for $X^1$ are hydrogen, halogens and C1-10 alkyl, wherein any hydrogen of the alkyl may be replaced with a halogen. Preferred groups for $X^2$ are hydrogen, halogens and C1-10 alkyl, wherein any hydrogen of the alkyl may be replaced with a halogen.

Preferred groups for $Z^1$ are a single bond, —O—, —COO—, —OCO— and —OCOO—, and preferred groups for $Z^2$ are C1-10 alkylene, wherein any —CH$_2$— of this group may be replaced with —O—.

Preferred groups for $Z^3$ are a single bond, —CH$_2$CH$_2$—, —O—, —S—, —COO—, —OCO—, —OCOO—, —CC—, —CH=CH—, —CH$_2$O—, —OCH$_2$—, —N=N—, —N=N(O)—, —N=CH—, —CH=N—, —CO—NH—, —NH—CO—, —OCO—CH=CH—, —CH=CH—COO—, —CH=CH—CO—NH—, —NH—CO—CH=CH—, —(CH$_2$)$_q$—COO— and —OCO—(CH$_2$)$_q$—, preferred groups for $Z^4$ are a single bond, —CH$_2$CH$_2$—, —O—, —COO— and —OCO—, and preferred groups for $Z^5$ are a single bond, —O—, —COO—, —OCO—, —OCF$_2$— and —(CH$_2$)$_r$, wherein one —CH$_2$— of the —(CH$_2$)$_r$— may be replaced with —O—.

Preferred integers for p are 1-3, preferred integers for q are 1-10, preferred integers for r are 1-10, s is 0 or 1, and preferred integers for t are 1-3.

Fourth, specific examples of constituent compounds will now be mentioned.

Preferred compounds for compound (1-1) are compounds (1-1-1) to (1-1-441). Preferred compounds for (1-2) are compounds (1-2-1) to (1-2-229). Preferred compounds for (1-3) are compounds (1-3-1) to (1-3-50).

Preferred compounds for (2-1) are compounds (2-1-1) to (2-1-441). Preferred compounds for (2-2) are compounds (2-2-1) to (2-2-229). Preferred compounds for (2-3) are compounds (2-3-1) to (2-3-50).

Preferred compounds for (3-1) are compounds (3-1-1) to (3-1-14), and preferred compounds for (3-2) are compounds (3-2-1) to (3-2-4).

In the following formulas, m and n are integers of 1-20. R is C2-10 alkyl or C2-20 alkenyl. $R^3$ is methyl or ethyl. Y is independently a halogen, —CN or C2-10 alkenyl or C1-10 alkyl optionally containing oxiranyl or oxetane group, wherein any —CH$_2$— in the group may be replaced with —O—. The letter v represents an integer of 1-20.

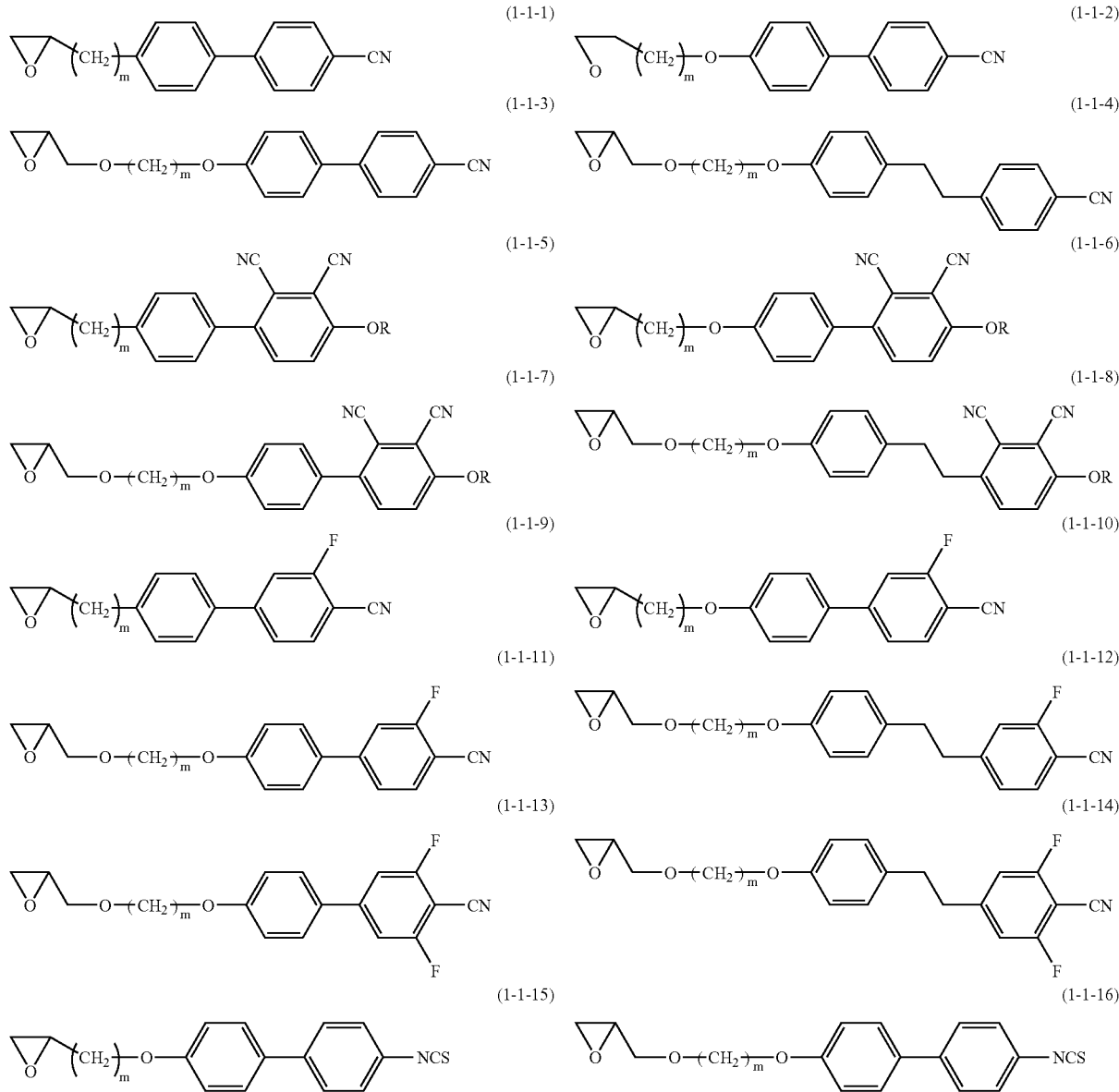

-continued
(1-1-17) 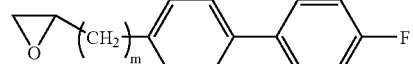
(1-1-18) 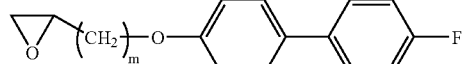
(1-1-19) 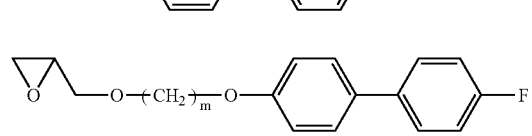
(1-1-20) 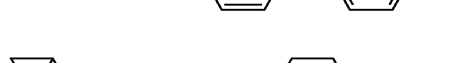
(1-1-21) 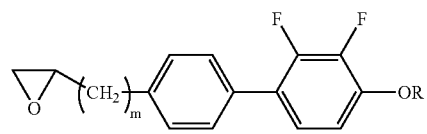
(1-1-22) 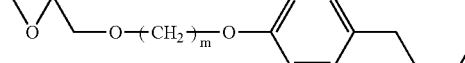
(1-1-23) 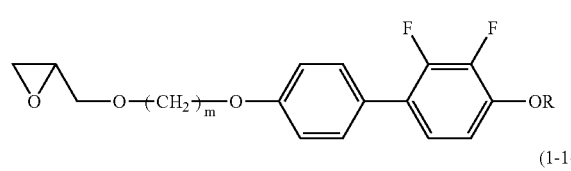
(1-1-24) 
(1-1-25) 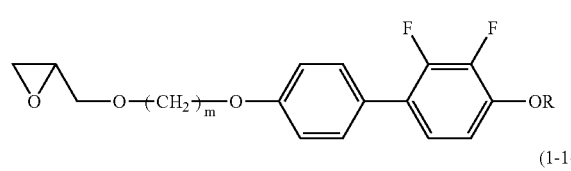
(1-1-26) 
(1-1-27) 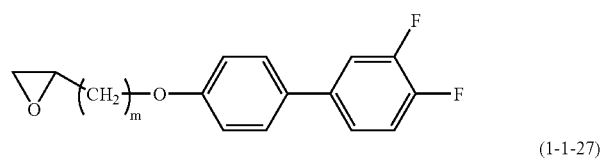
(1-1-28) 
(1-1-29) 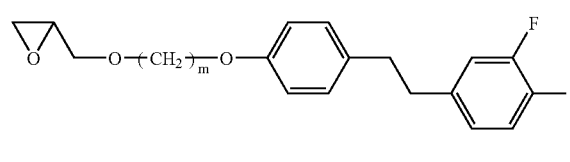
(1-1-30) 
(1-1-31) 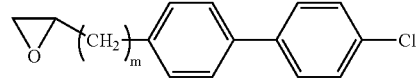
(1-1-32) 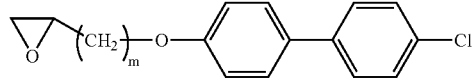
(1-1-33) 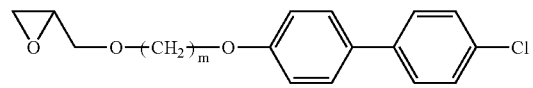
(1-1-34) 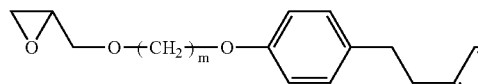
(1-1-35) 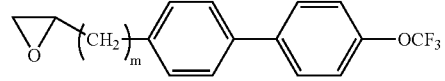
(1-1-36) 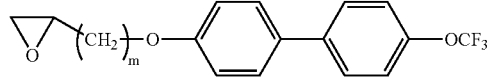
(1-1-37) 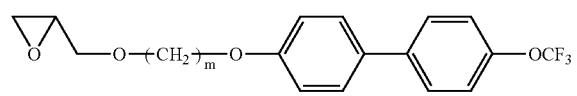
(1-1-38) 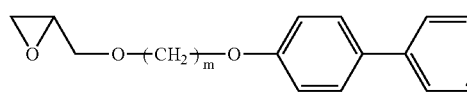
(1-1-39) 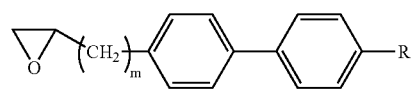
(1-1-40) 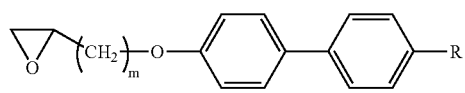
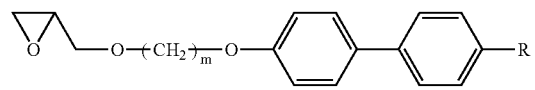
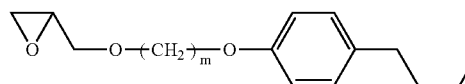

-continued
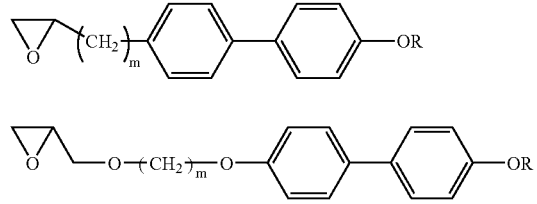
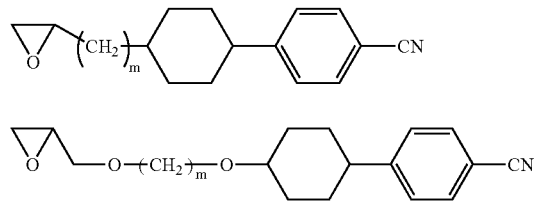
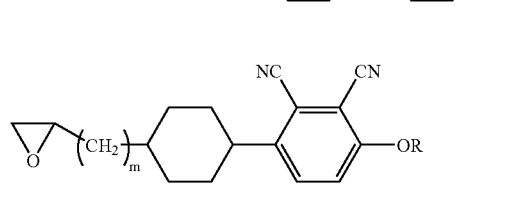
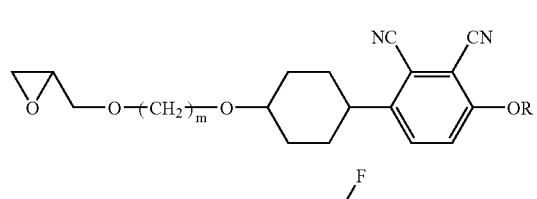
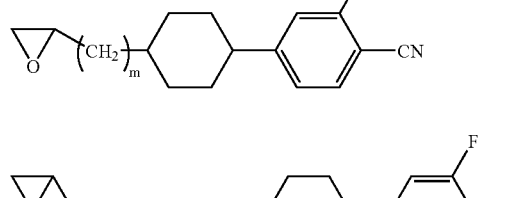
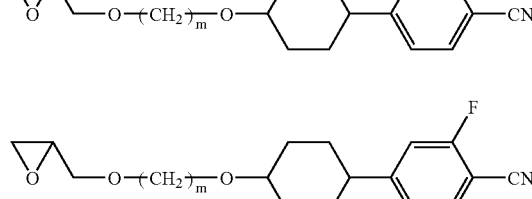
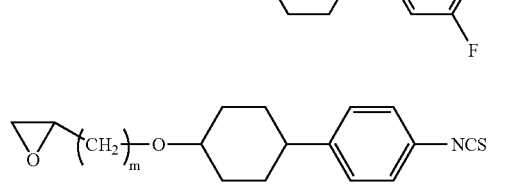
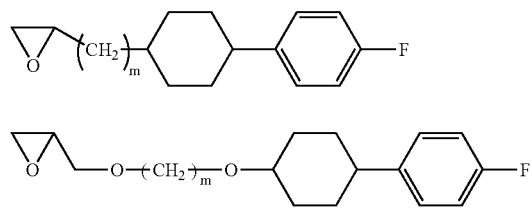

-continued
(1-1-65) 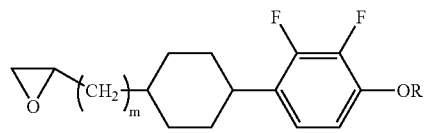
(1-1-66) 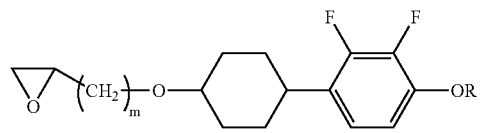
(1-1-67) 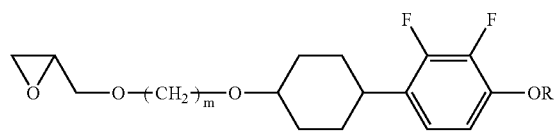
(1-1-68) 
(1-1-69) 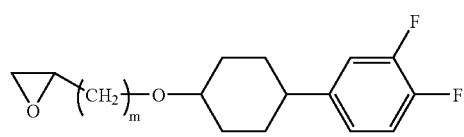
(1-1-70) 
(1-1-71) 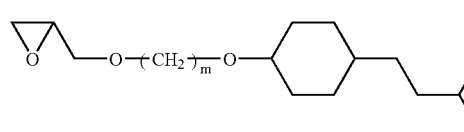
(1-1-72) 
(1-1-73) 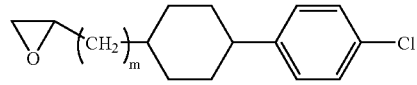
(1-1-74) 
(1-1-75) 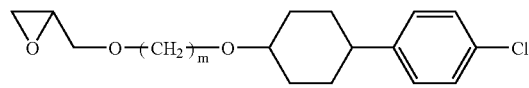
(1-1-76) 
(1-1-77) 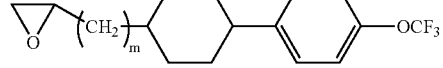
(1-1-78) 
(1-1-79) 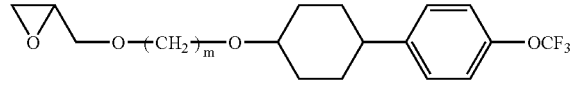
(1-1-80) 
(1-1-81) 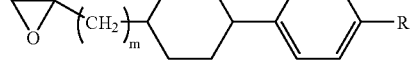
(1-1-82) 
(1-1-83) 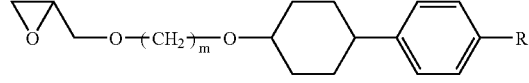
(1-1-84) 
(1-1-85) 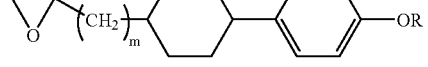
(1-1-86) 
(1-1-87) 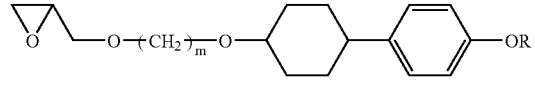
(1-1-88)

-continued
(1-1-89) 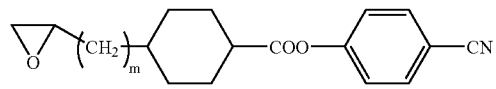
(1-1-90) 
(1-1-91) 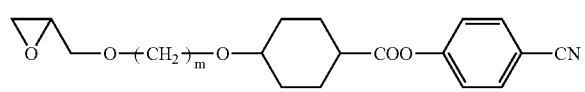
(1-1-92) 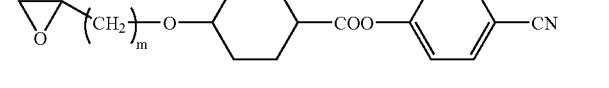
(1-1-93) 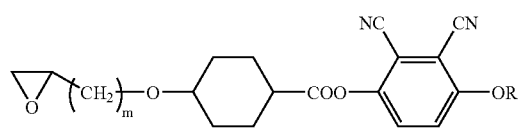
(1-1-94) 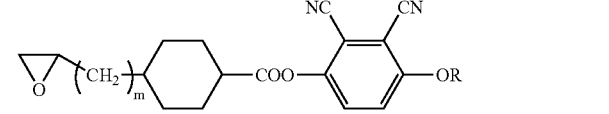
(1-1-95) 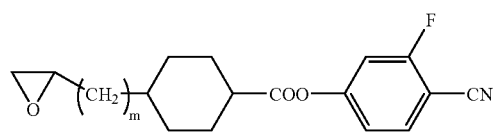
(1-1-96) 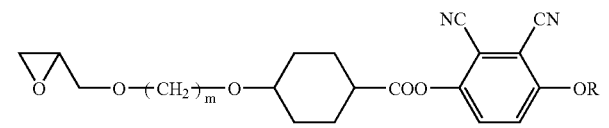
(1-1-97) 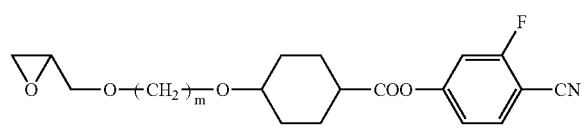
(1-1-98) 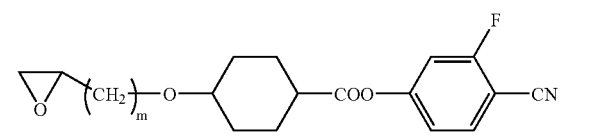
(1-1-99) 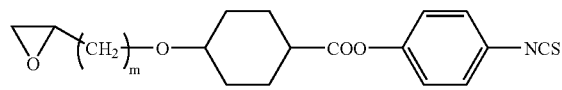
(1-1-100) 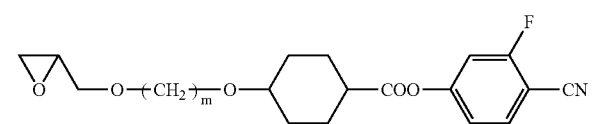
(1-1-101) 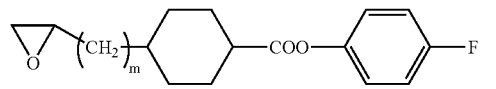
(1-1-102) 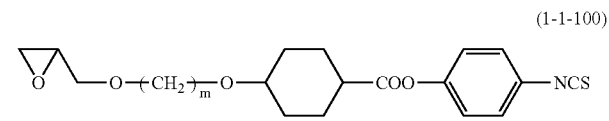
(1-1-103) 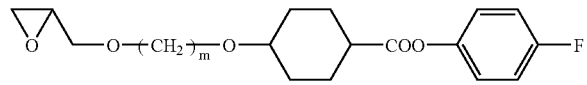
(1-1-104) 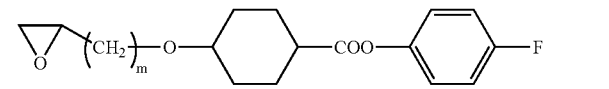
(1-1-105) 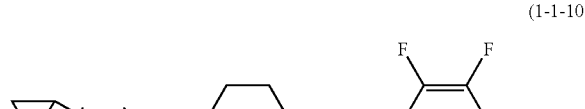
(1-1-106) 
(1-1-107) 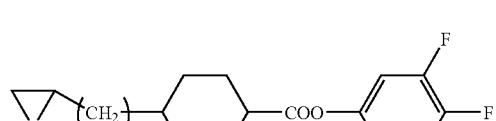
(1-1-108) 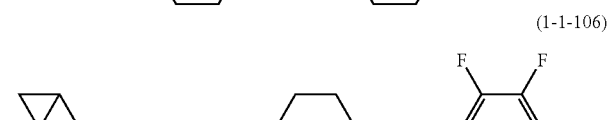
(1-1-109) 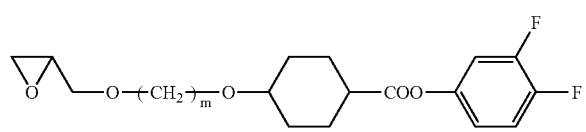
(1-1-110) 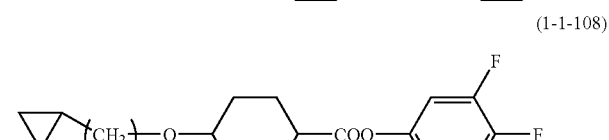
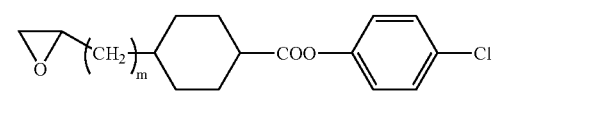

(1-1-111) 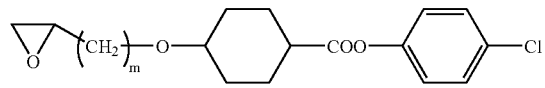
(1-1-112) 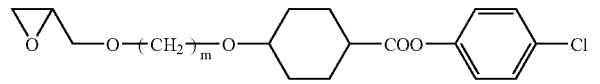
(1-1-113) 
(1-1-114) 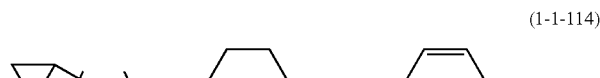
(1-1-115) 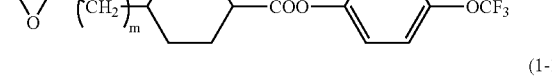
(1-1-116) 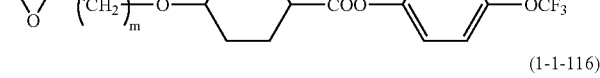
(1-1-117) 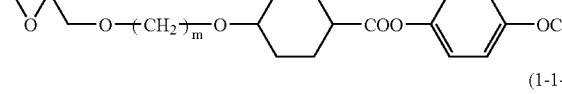
(1-1-118) 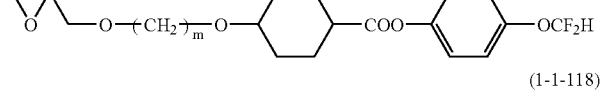
(1-1-119) 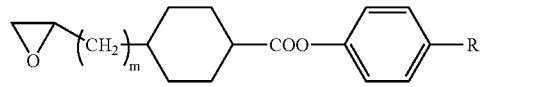
(1-1-120) 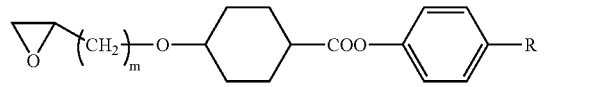
(1-1-121) 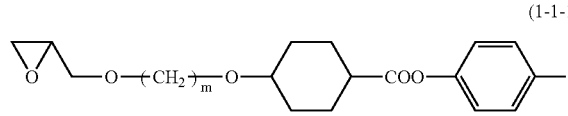
(1-1-122) 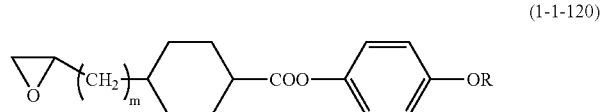
(1-1-123) 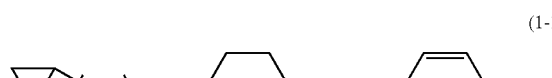
(1-1-124) 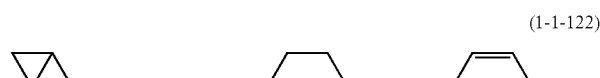
(1-1-125) 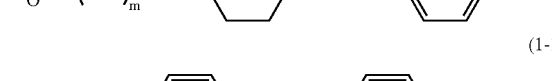
(1-1-126) 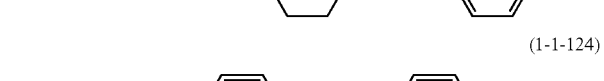
(1-1-127) 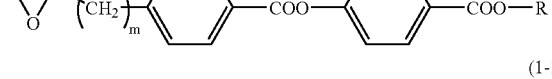
(1-1-128) 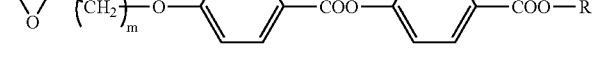
(1-1-129) 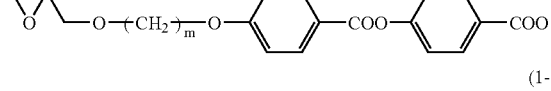
(1-1-130) 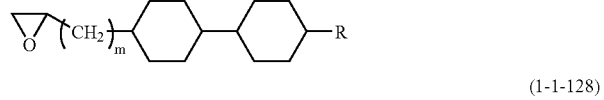
(1-1-131) 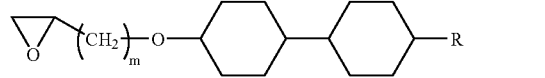
(1-1-132) 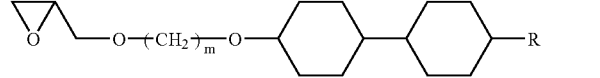
(1-1-133) 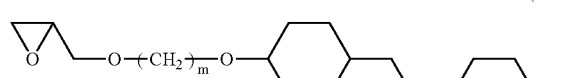
(1-1-134) 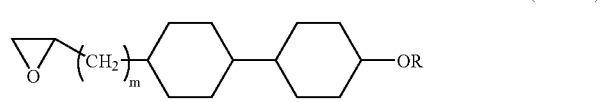
(1-1-135) 
(1-1-136) 

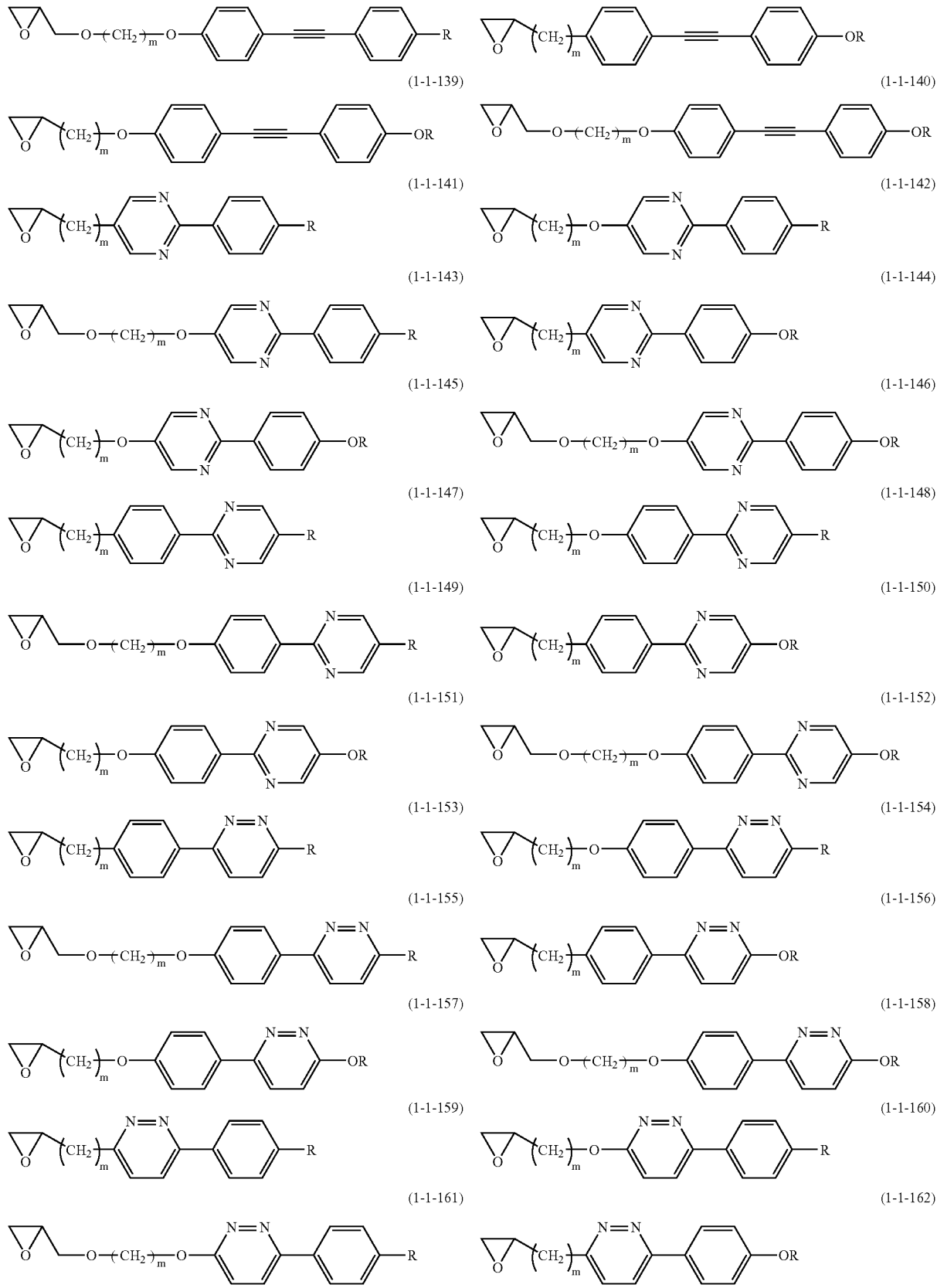

-continued
(1-1-163) 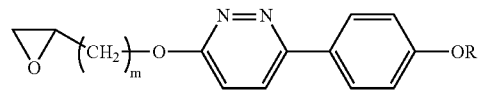
(1-1-164) 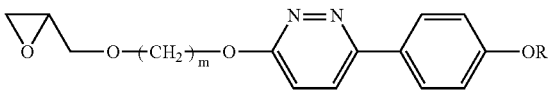
(1-1-165) 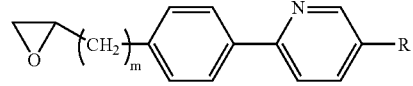
(1-1-166) 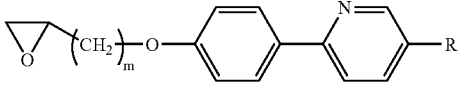
(1-1-167) 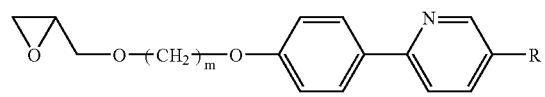
(1-1-168) 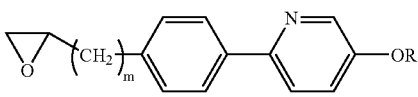
(1-1-169) 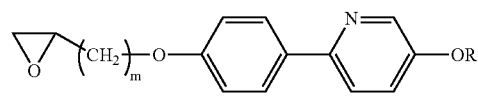
(1-1-170) 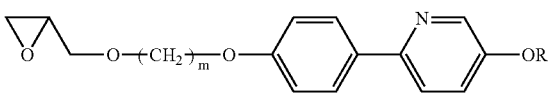
(1-1-171) 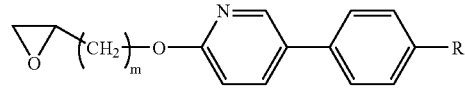
(1-1-172) 
(1-1-173) 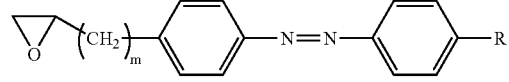
(1-1-174) 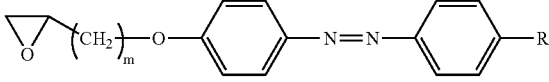
(1-1-175) 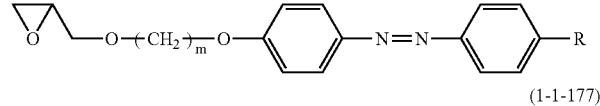
(1-1-176) 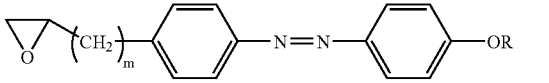
(1-1-177) 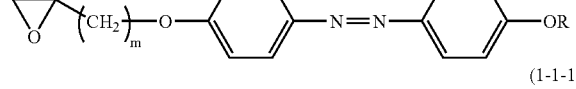
(1-1-178) 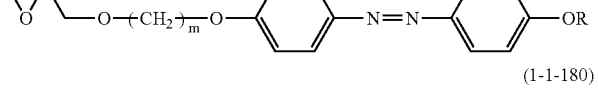
(1-1-179) 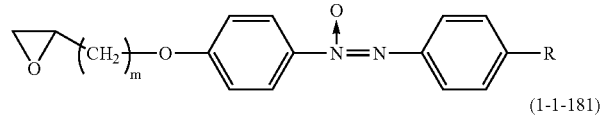
(1-1-180) 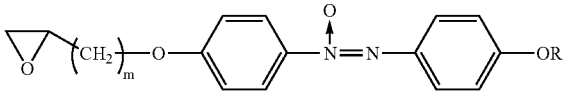
(1-1-181) 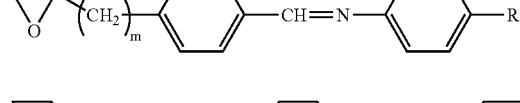
(1-1-182) 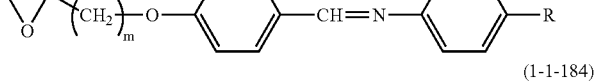
(1-1-183) 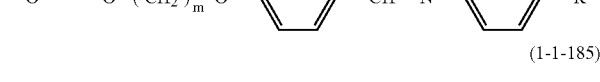
(1-1-184) 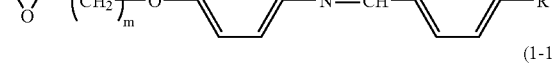
(1-1-185) 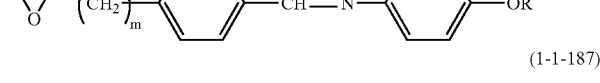
(1-1-186) 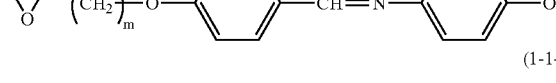
(1-1-187) 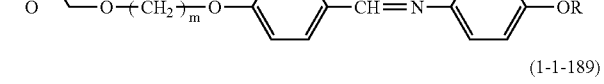
(1-1-188) 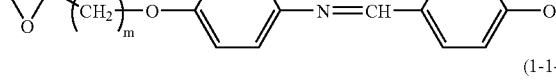
(1-1-189) 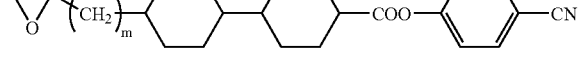
(1-1-190) 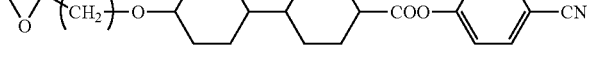

-continued
(1-1-191)
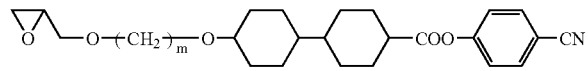
(1-1-192)
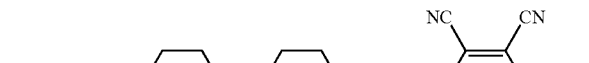
(1-1-193)
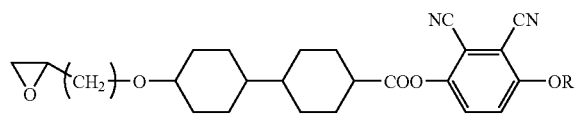
(1-1-194)
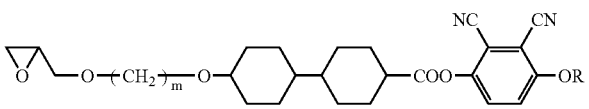
(1-1-195)
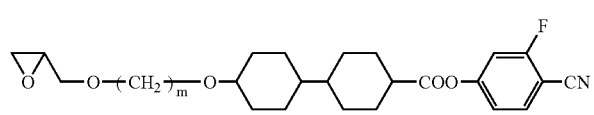
(1-1-196)
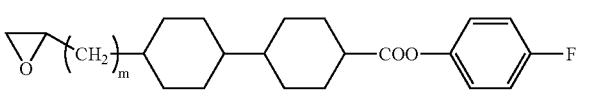
(1-1-197)
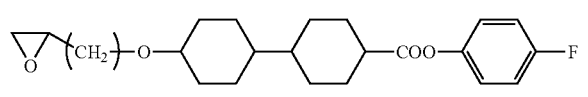
(1-1-198)
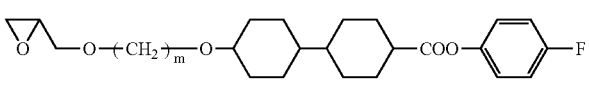
(1-1-199)
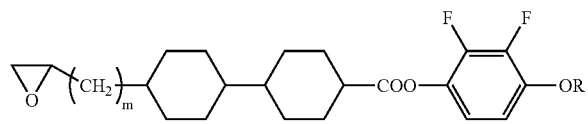
(1-1-200)
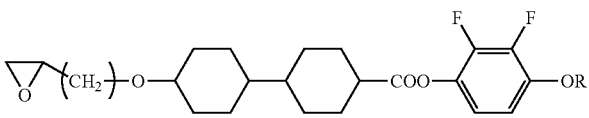
(1-1-201)
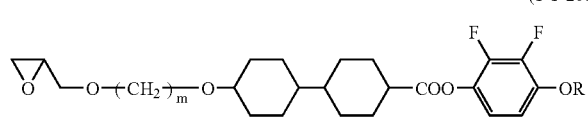
(1-1-202)
(1-1-203)
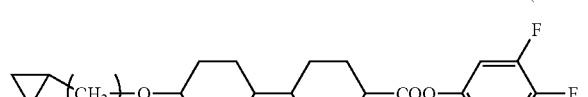
(1-1-204)
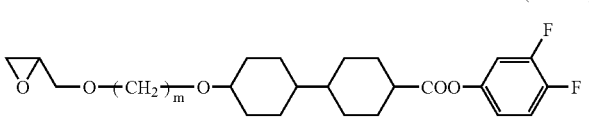
(1-1-205)
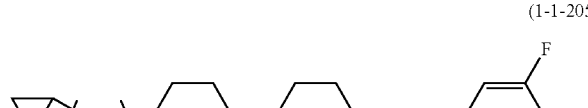
(1-1-206)
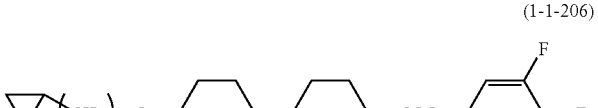
(1-1-207)
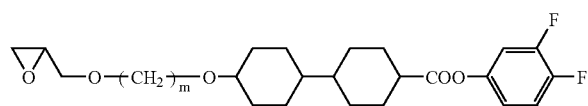
(1-1-208)
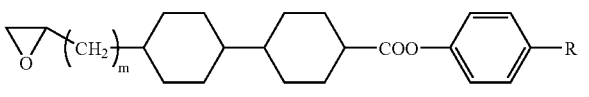
(1-1-209)
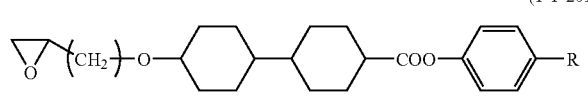
(1-1-210)
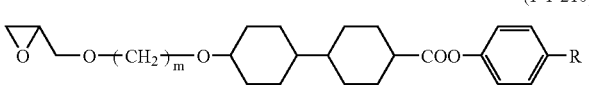
(1-1-211)
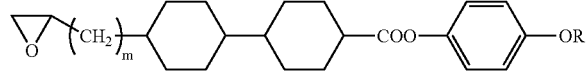
(1-1-212)
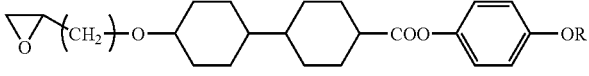

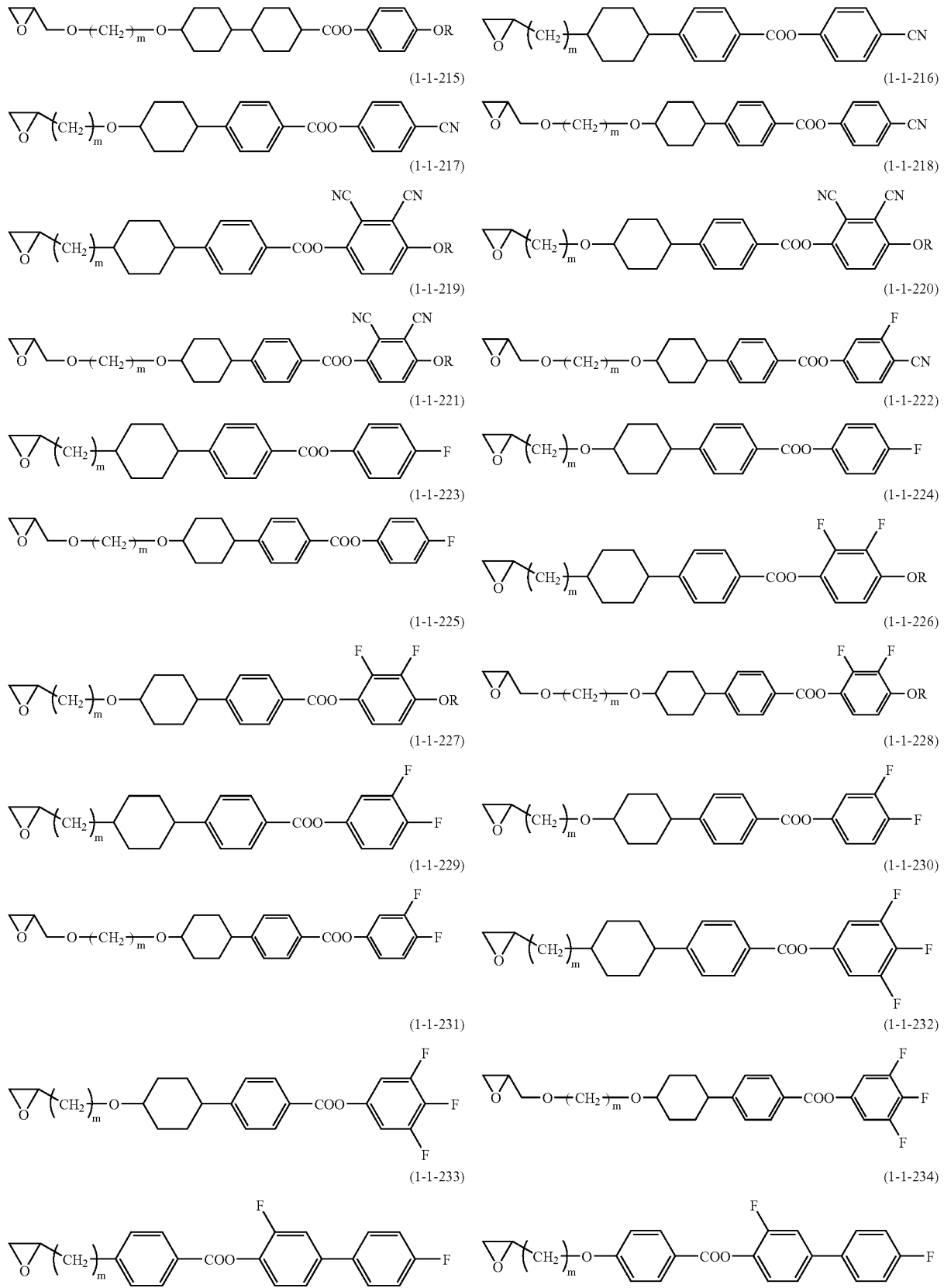

-continued
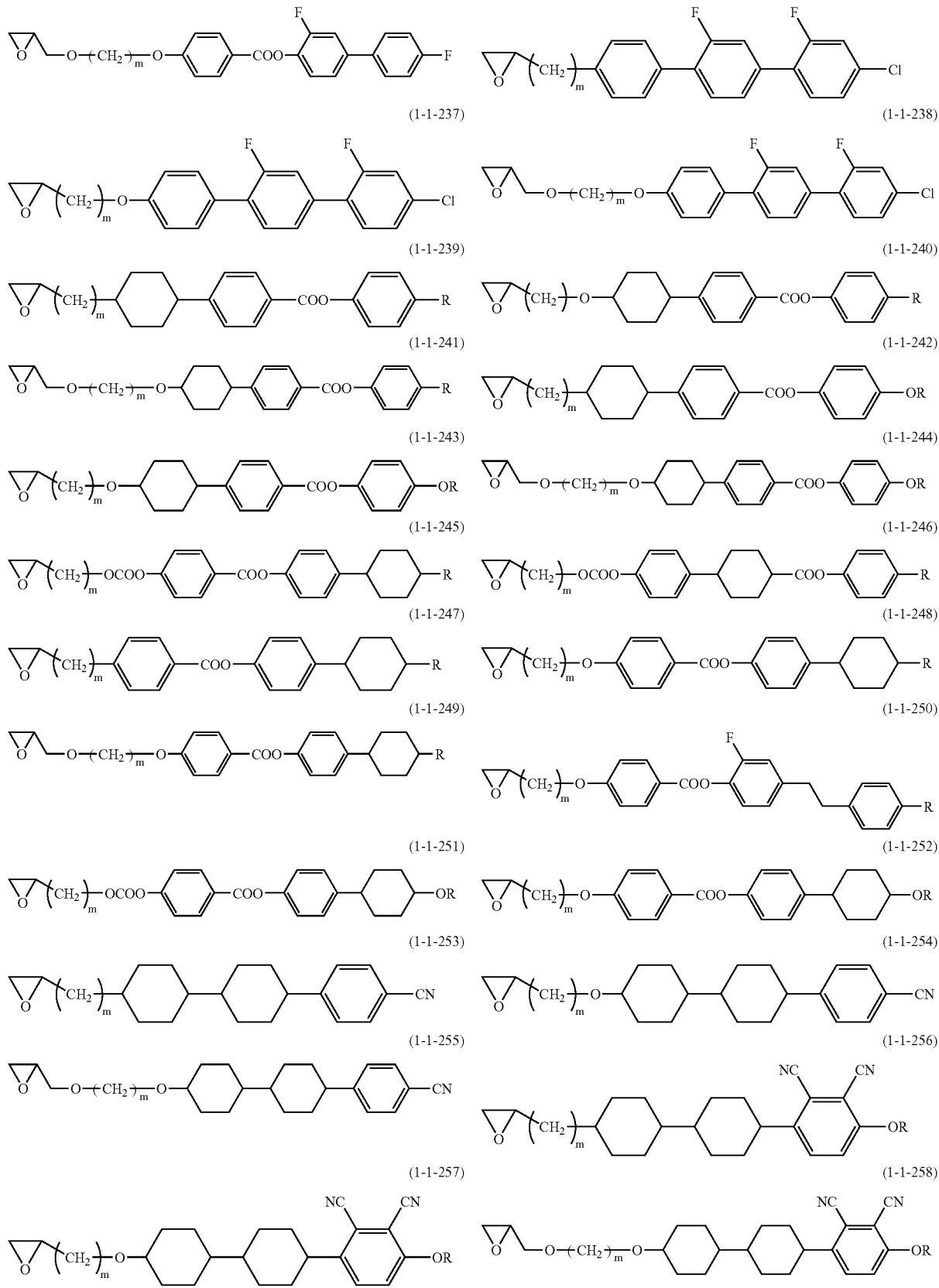

-continued
(1-1-259)
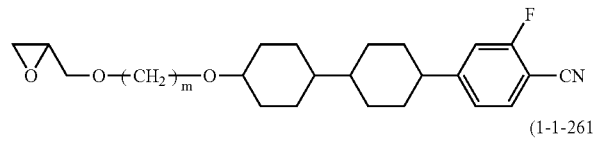
(1-1-260)
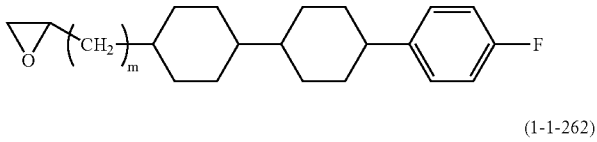
(1-1-261)
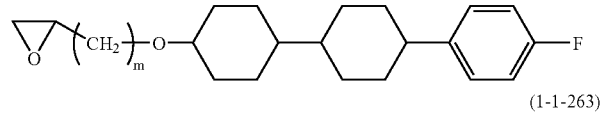
(1-1-262)
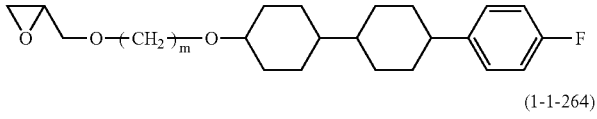
(1-1-263)
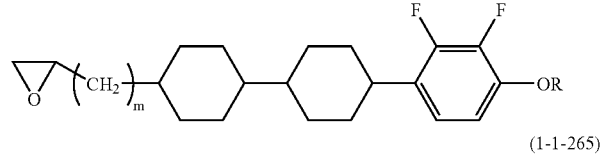
(1-1-264)
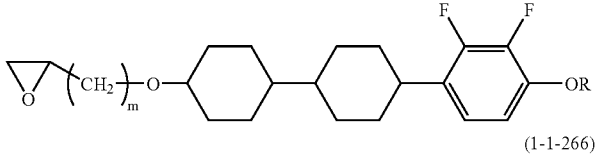
(1-1-265)
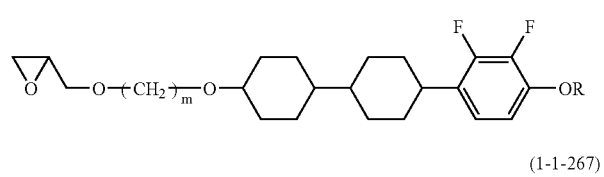
(1-1-266)
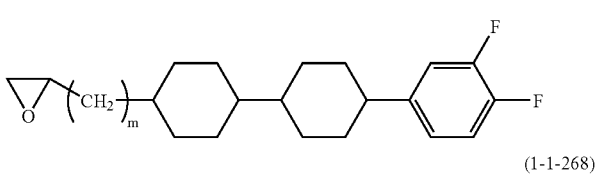
(1-1-267)
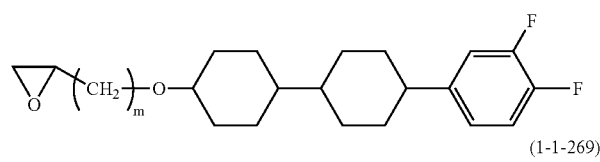
(1-1-268)
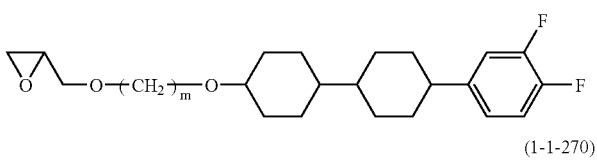
(1-1-269)
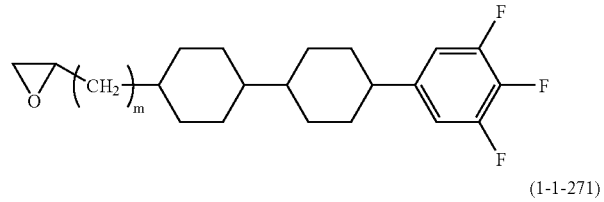
(1-1-270)
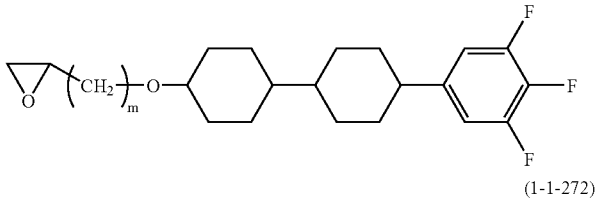
(1-1-271)
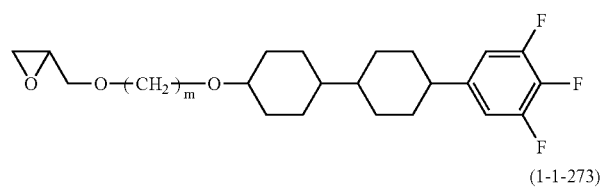
(1-1-272)
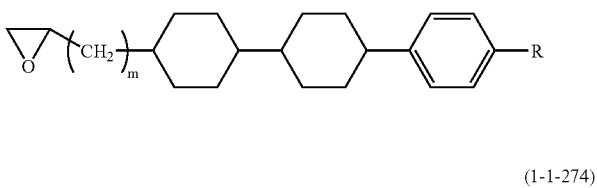
(1-1-273)
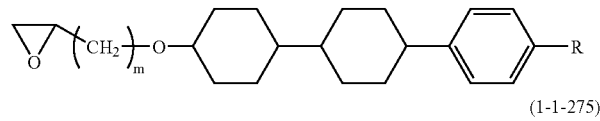
(1-1-274)
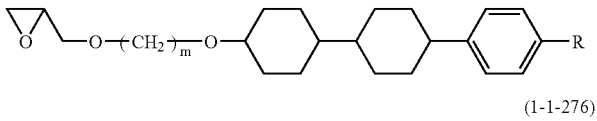
(1-1-275)
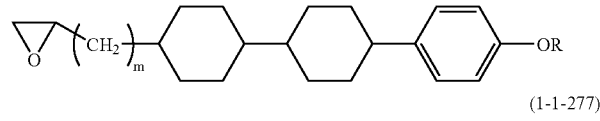
(1-1-276)
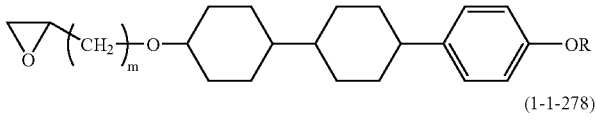
(1-1-277)
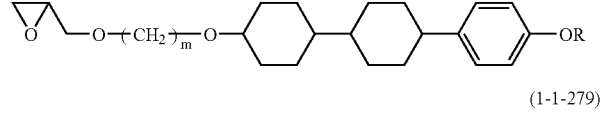
(1-1-278)
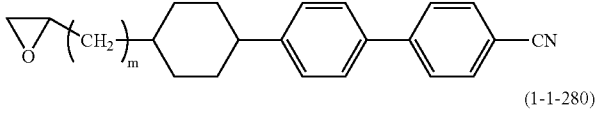
(1-1-279)
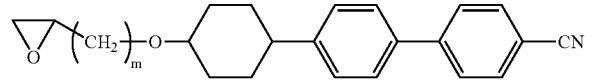
(1-1-280)
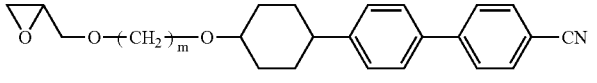

-continued
(1-1-281)
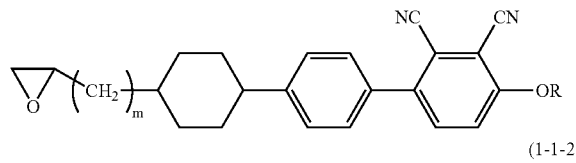
(1-1-282)
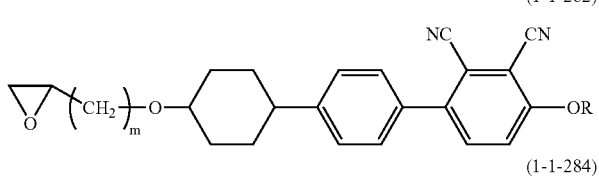
(1-1-283)
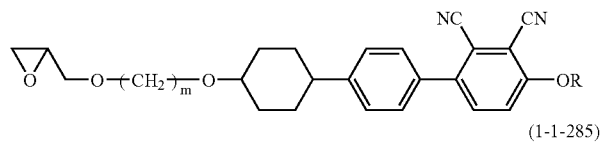
(1-1-284)
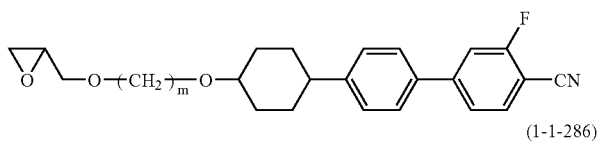
(1-1-285)
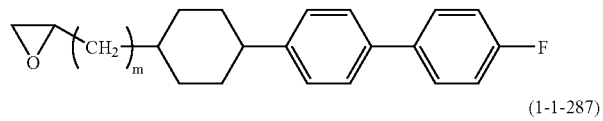
(1-1-286)
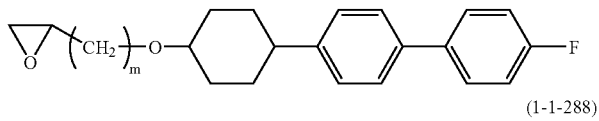
(1-1-287)
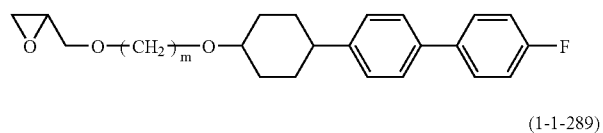
(1-1-288)
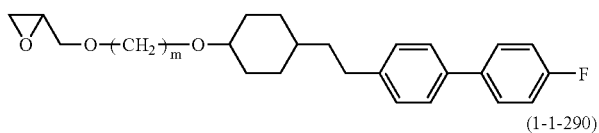
(1-1-289)
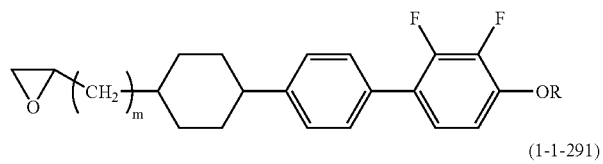
(1-1-290)
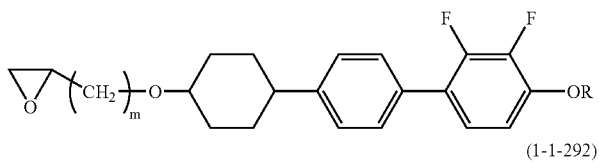
(1-1-291)
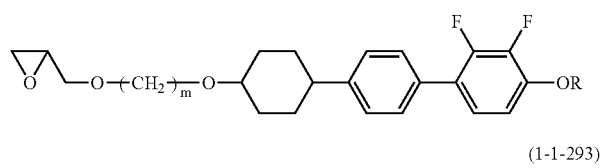
(1-1-292)
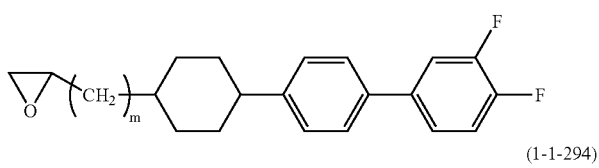
(1-1-293)
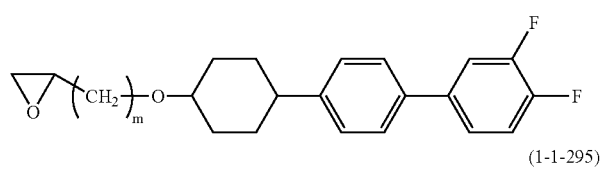
(1-1-294)
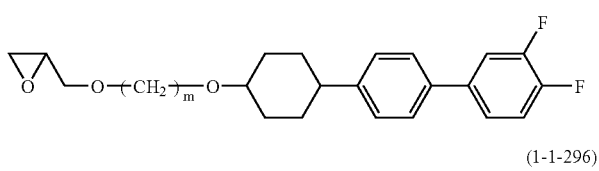
(1-1-295)
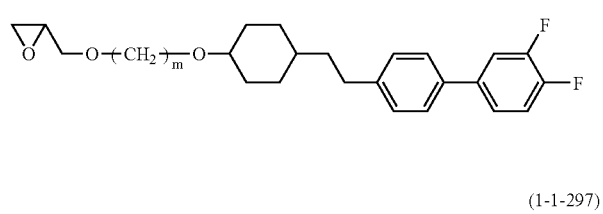
(1-1-296)
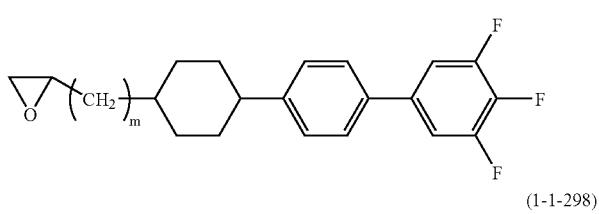
(1-1-297)
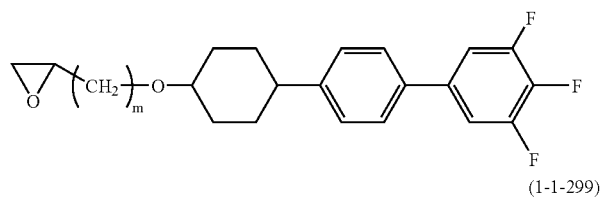
(1-1-298)
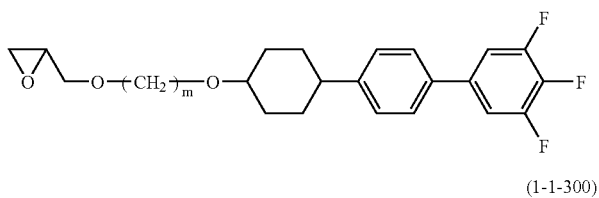
(1-1-299)
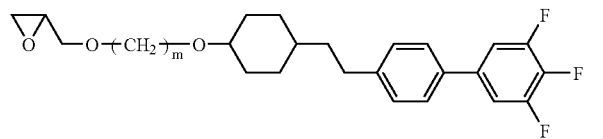
(1-1-300)
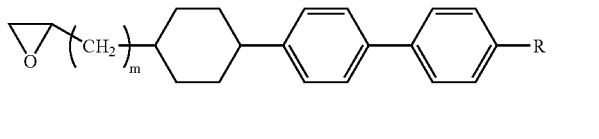

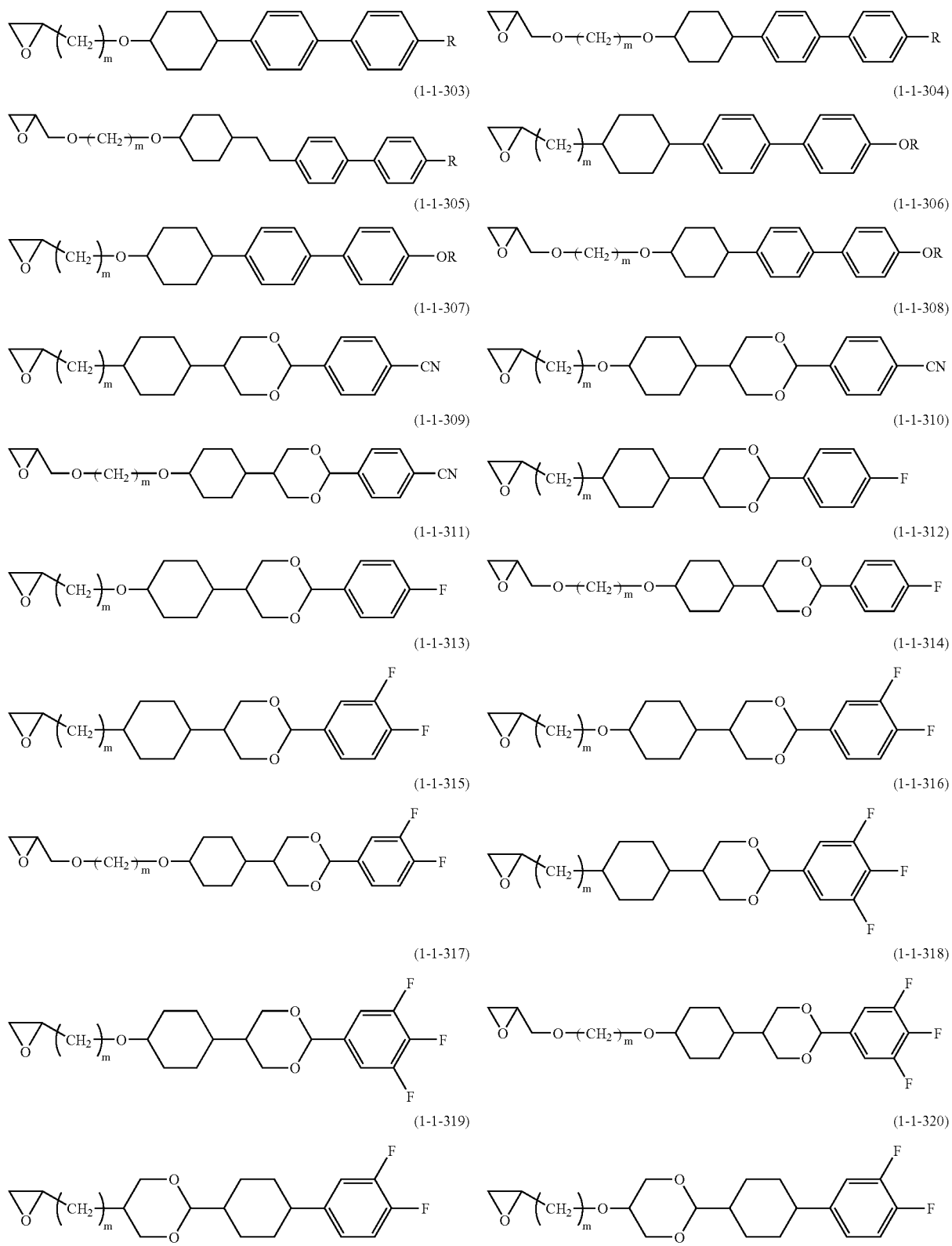

-continued
(1-1-321)
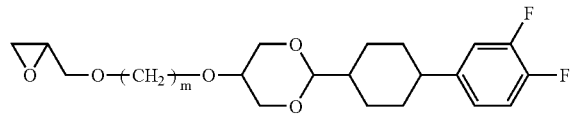
(1-1-322)
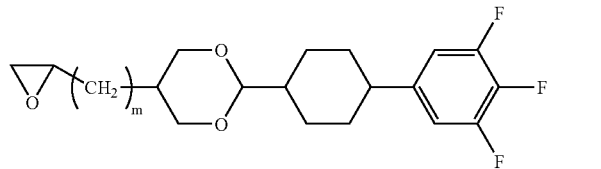
(1-1-323)
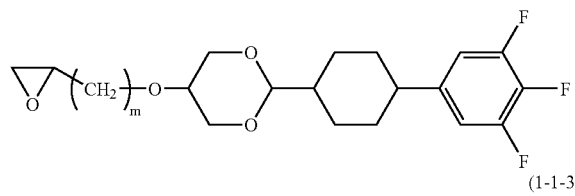
(1-1-324)
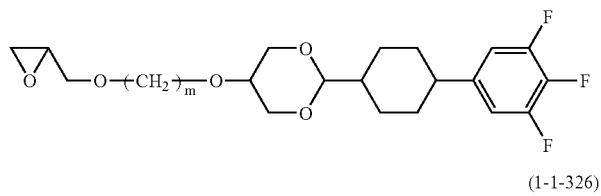
(1-1-325)
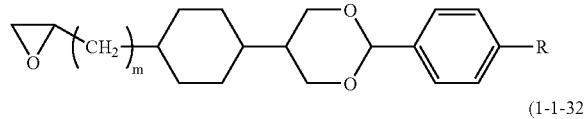
(1-1-326)
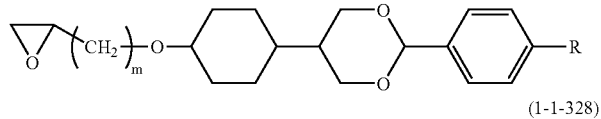
(1-1-327)
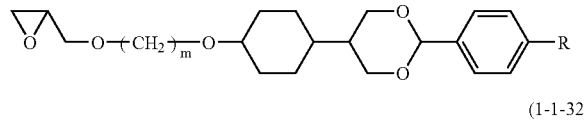
(1-1-328)
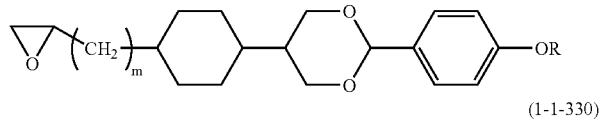
(1-1-329)
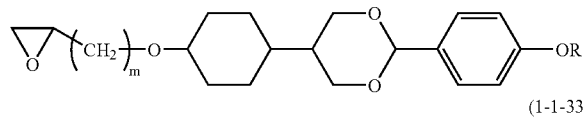
(1-1-330)
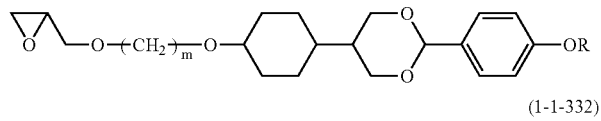
(1-1-331)
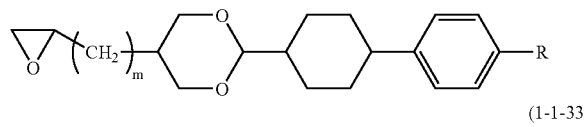
(1-1-332)
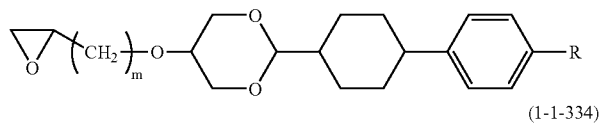
(1-1-333)
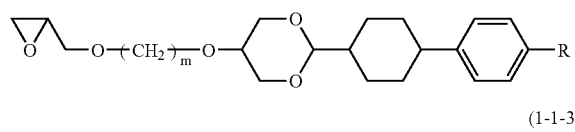
(1-1-334)
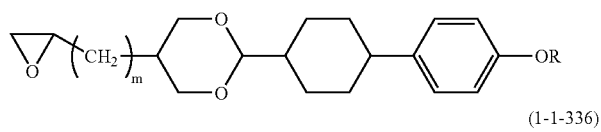
(1-1-335)
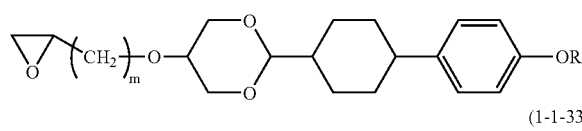
(1-1-336)
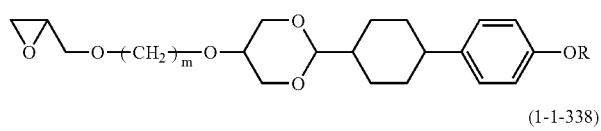
(1-1-337)
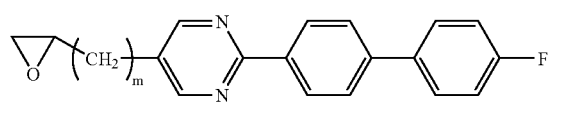
(1-1-338)
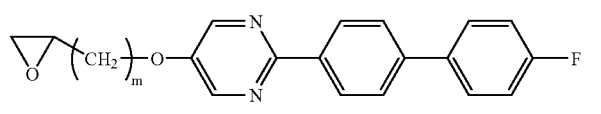
(1-1-339)
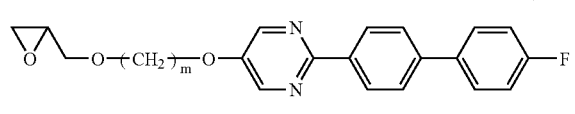
(1-1-340)
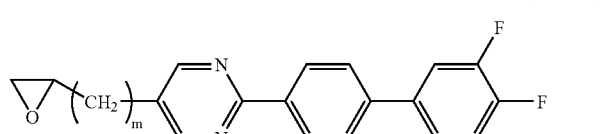
(1-1-341)
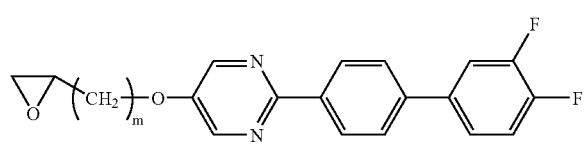
(1-1-342)
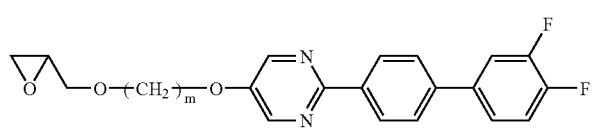

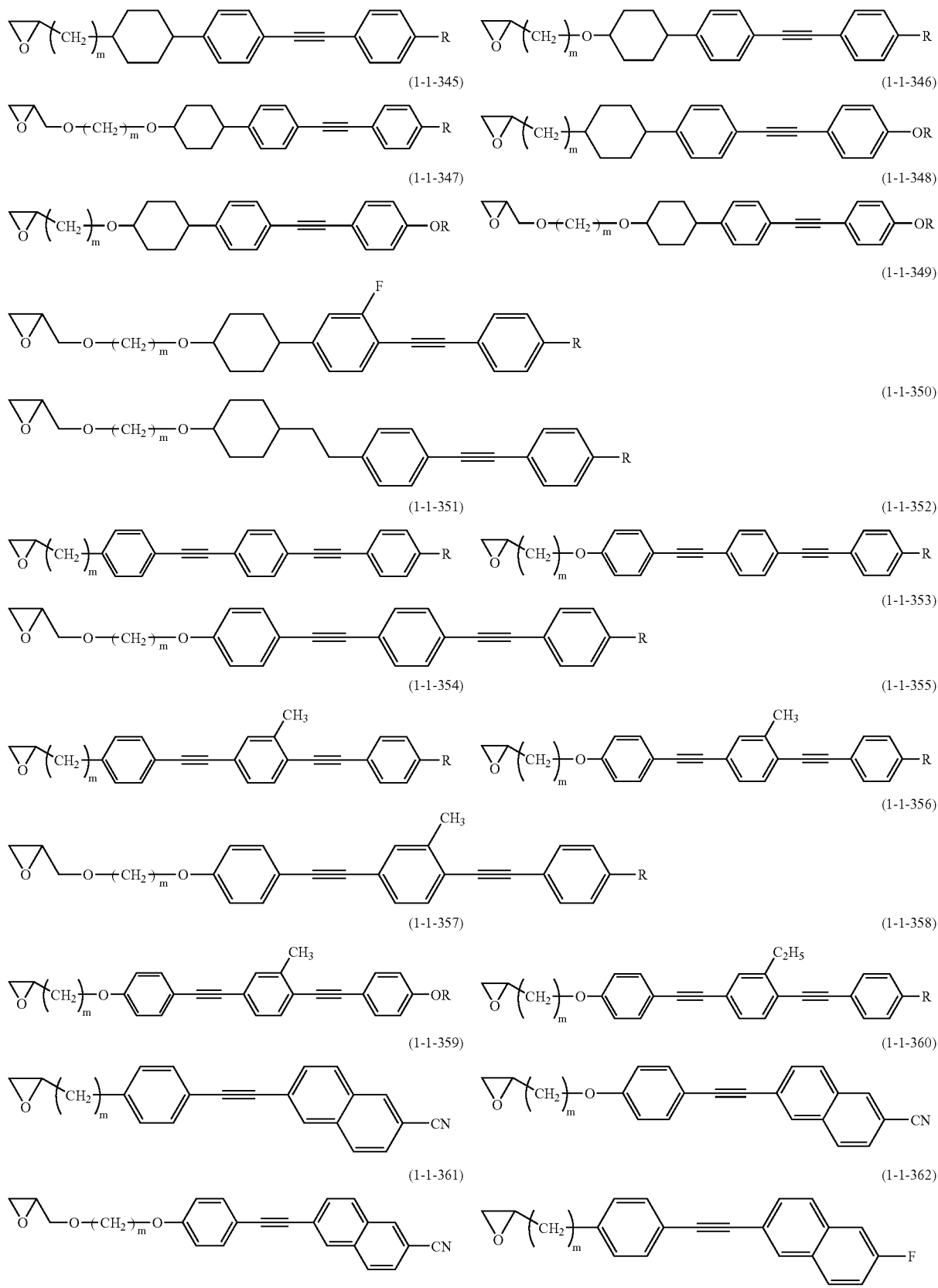

-continued
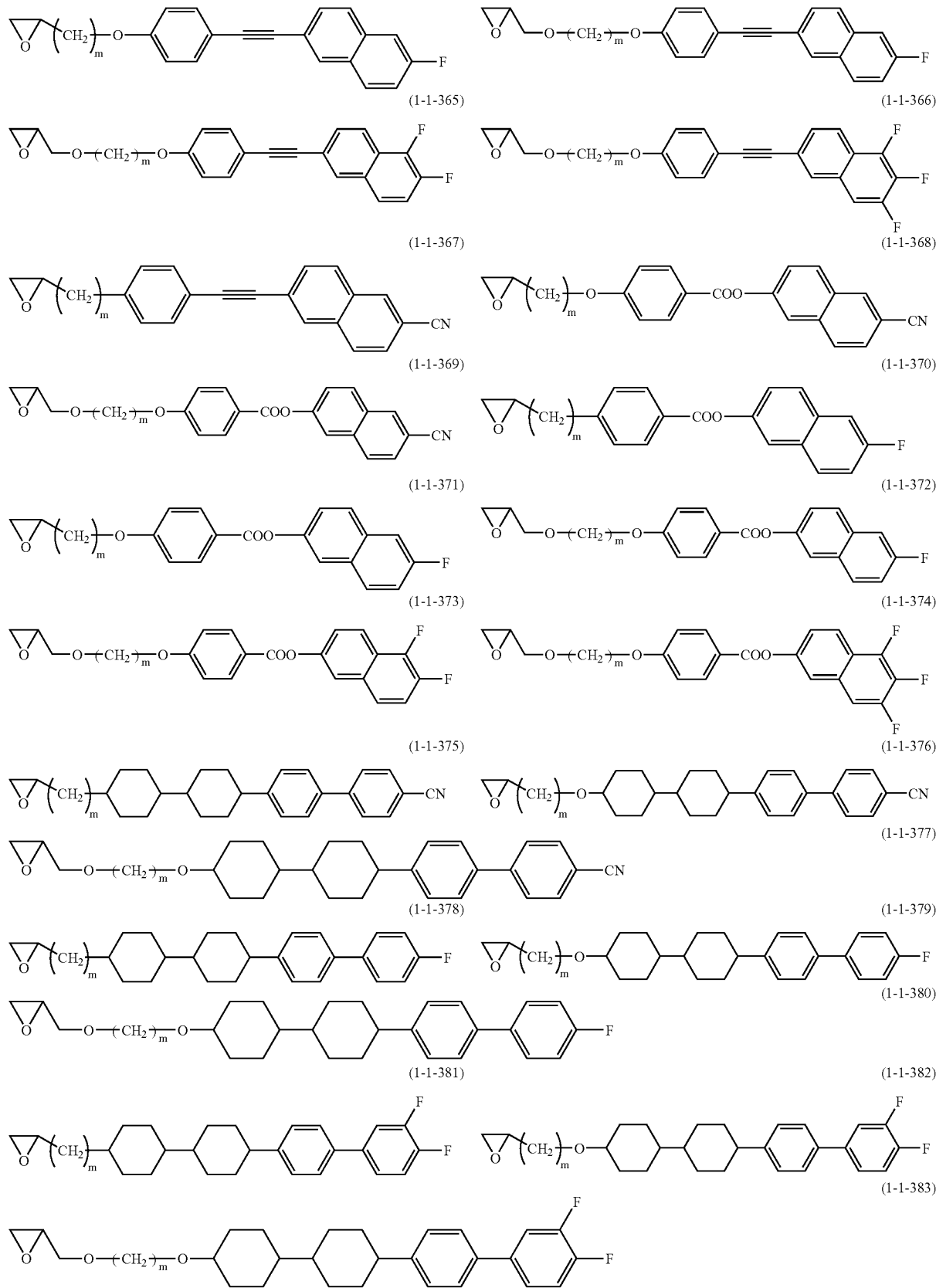

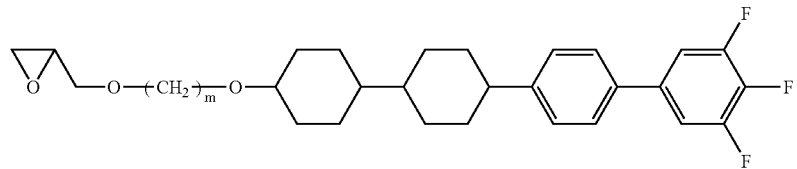
(1-1-384)
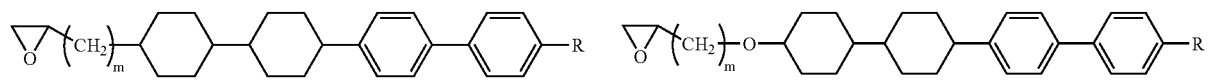
(1-1-385) (1-1-386)
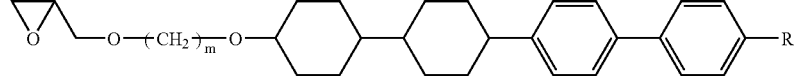
(1-1-387)
(1-1-388) (1-1-389)
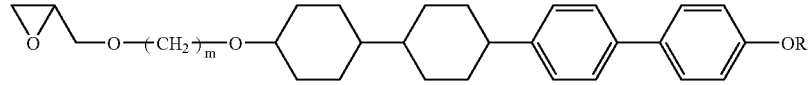
(1-1-390)
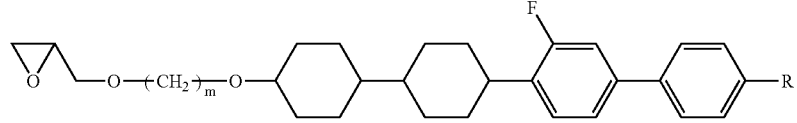
(1-1-391)
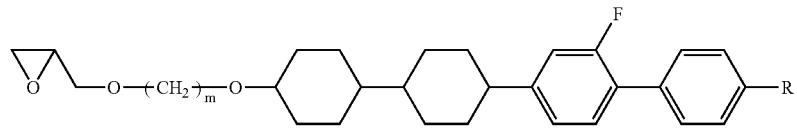
(1-1-392)
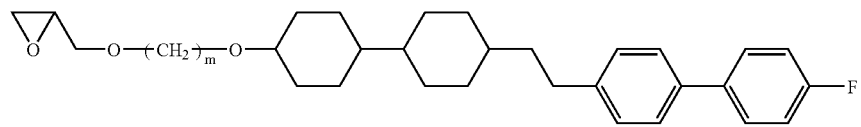
(1-1-393)
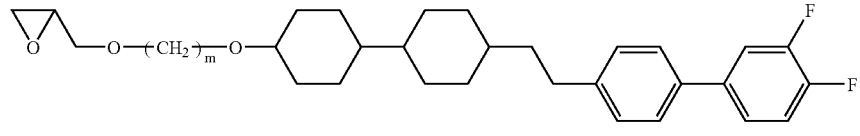
(1-1-394)
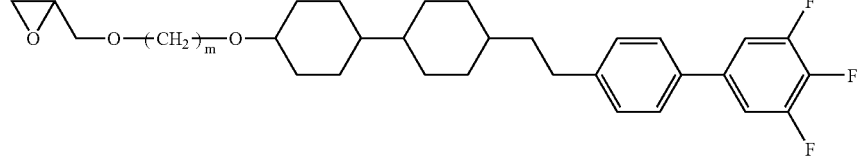
(1-1-395)
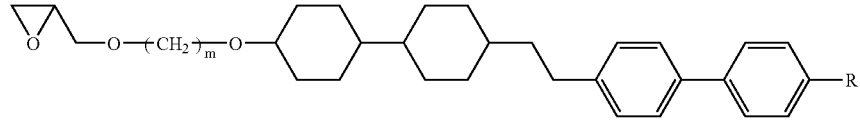
(1-1-396)
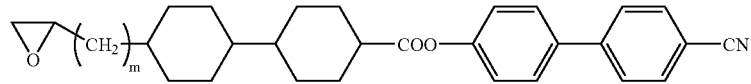
(1-1-397)

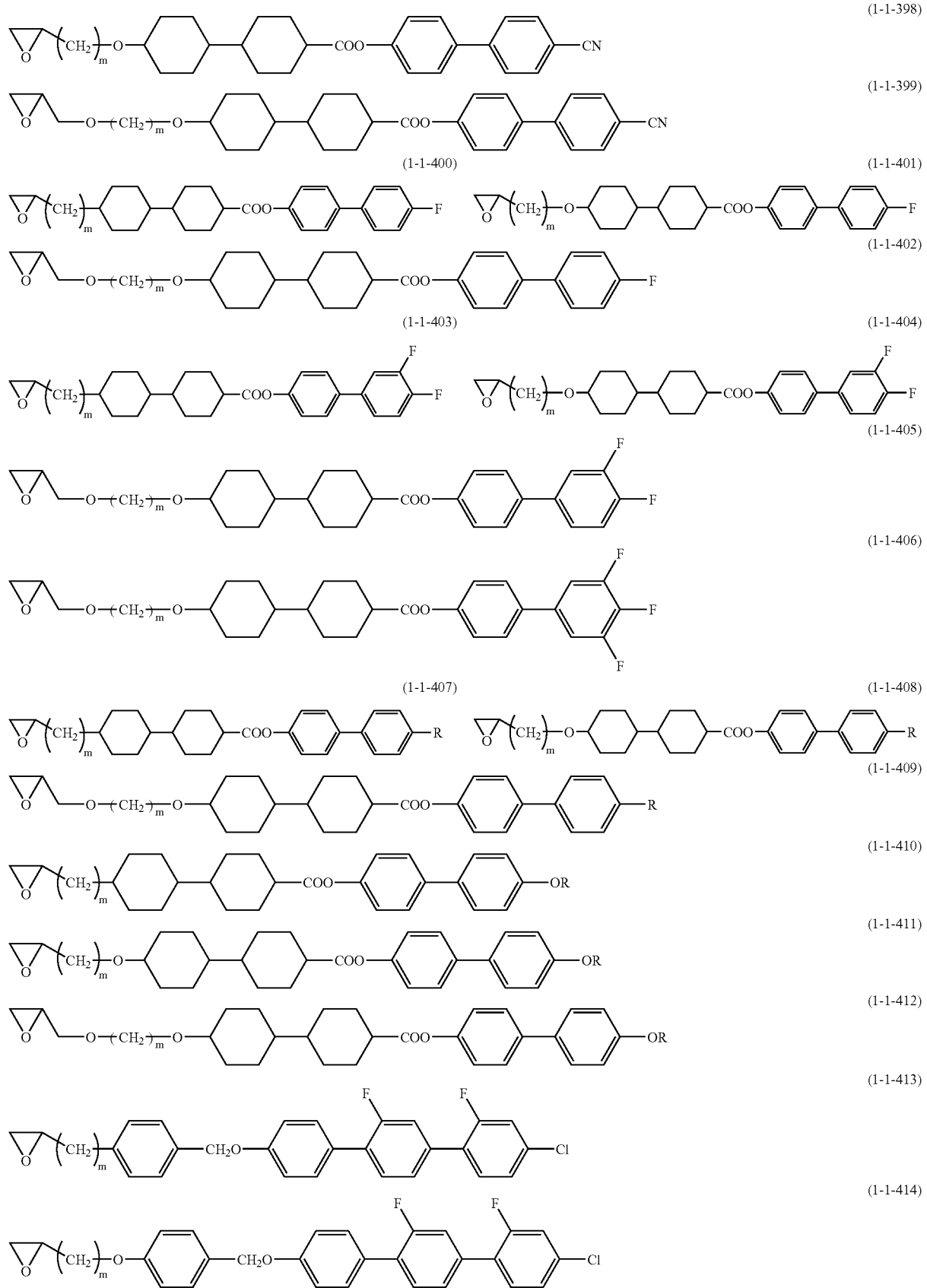

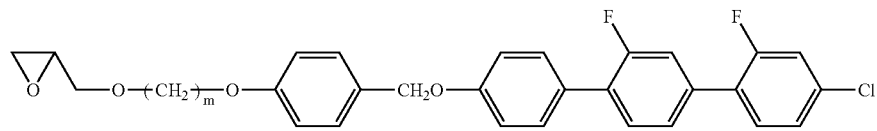
(1-1-415)
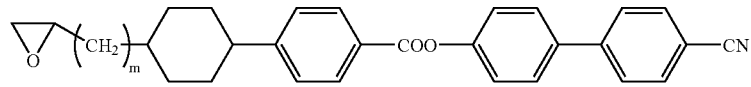
(1-1-416)
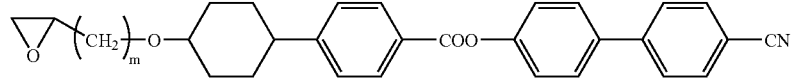
(1-1-417)
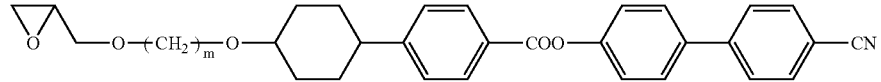
(1-1-418)
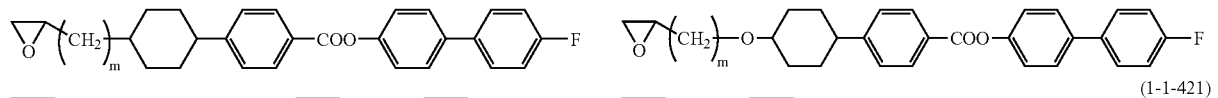
(1-1-419) (1-1-420)
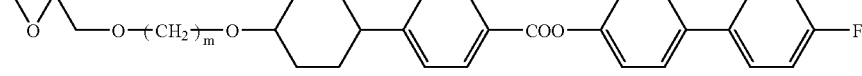
(1-1-421)
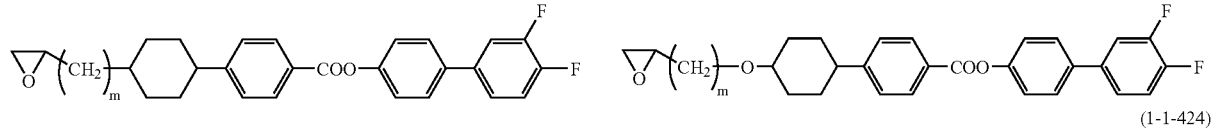
(1-1-422) (1-1-423)
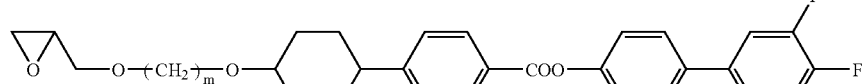
(1-1-424)
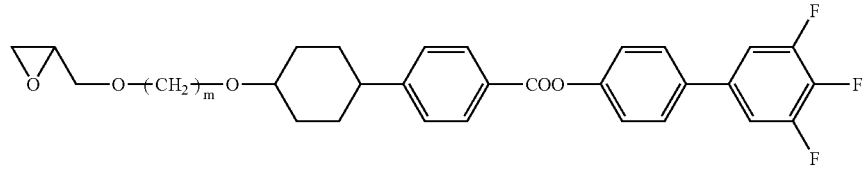
(1-1-425)
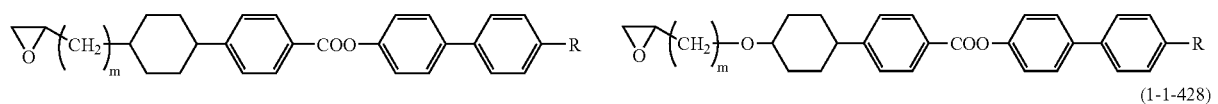
(1-1-426) (1-1-427)
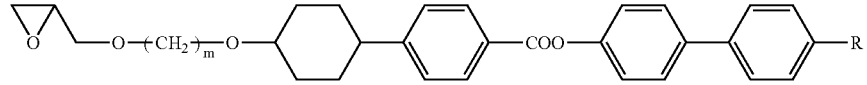
(1-1-428)
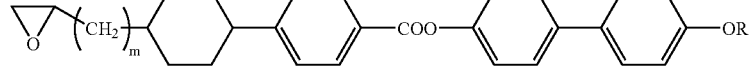
(1-1-429)
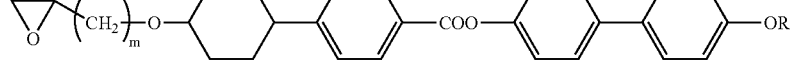
(1-1-430)
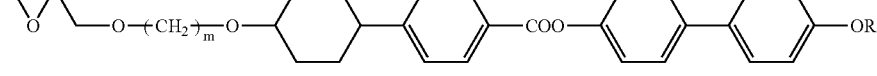
(1-1-431)

-continued
(1-1-432)
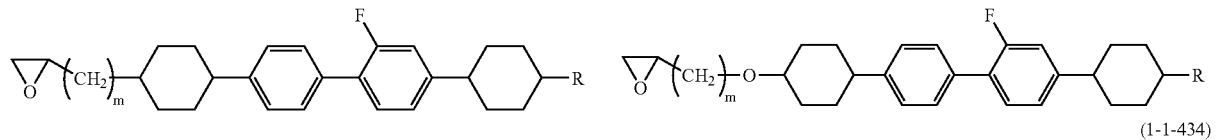
(1-1-433)
(1-1-434)
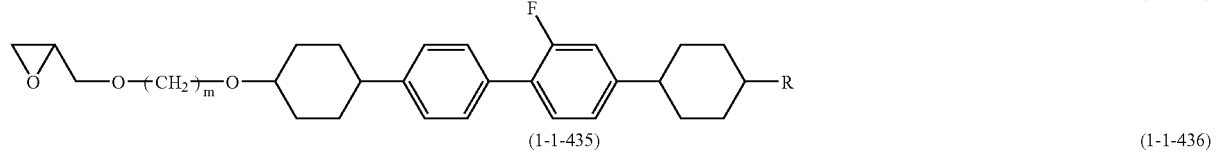
(1-1-435)
(1-1-436)
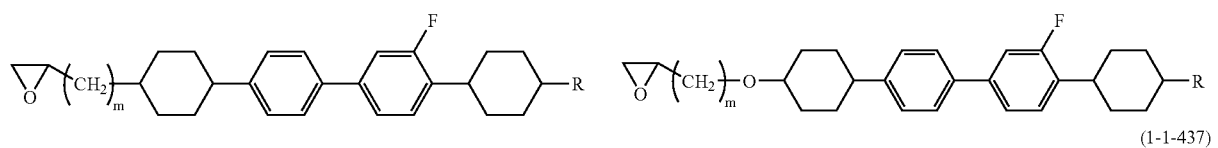
(1-1-437)
(1-1-438)
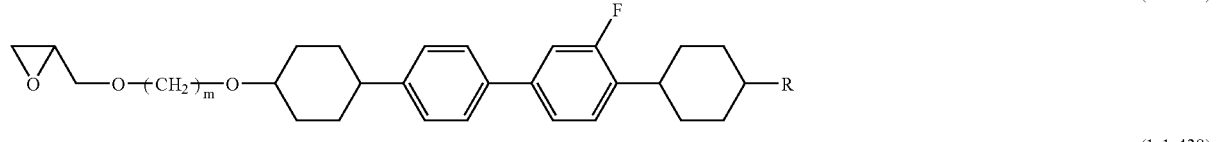
(1-1-439)
(1-1-440)
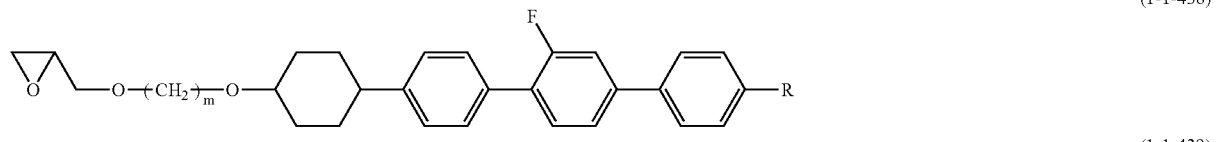
(1-1-441)
(1-2-1)
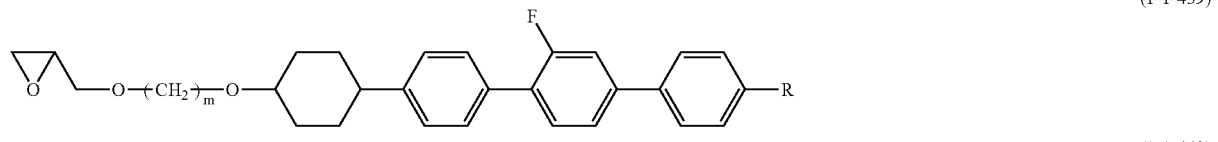
(1-2-2)
(1-2-3)
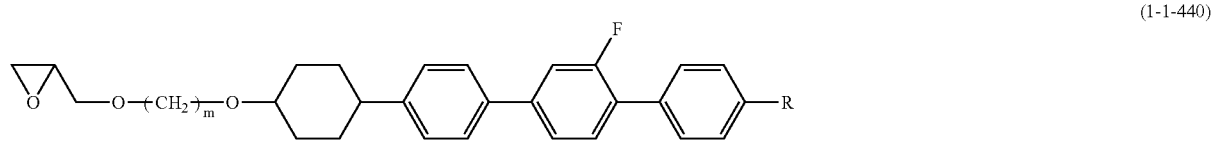
(1-2-4)
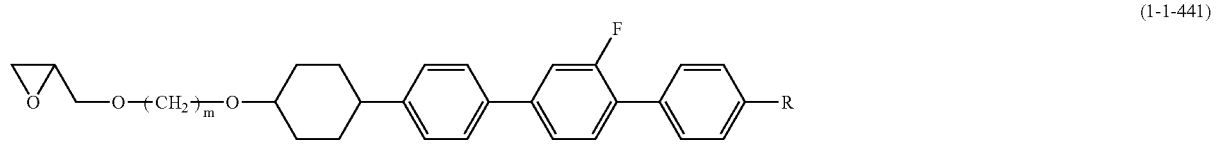
(1-2-5)
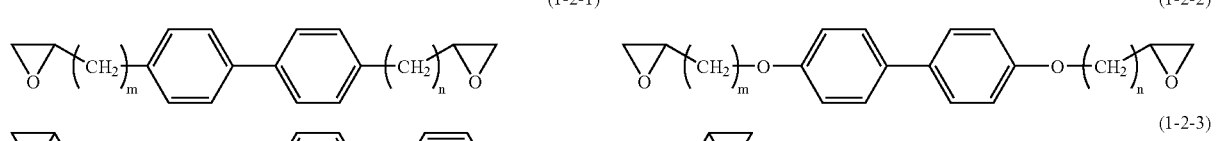
(1-2-6)
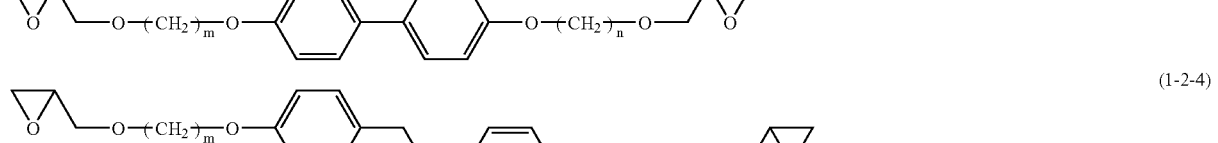
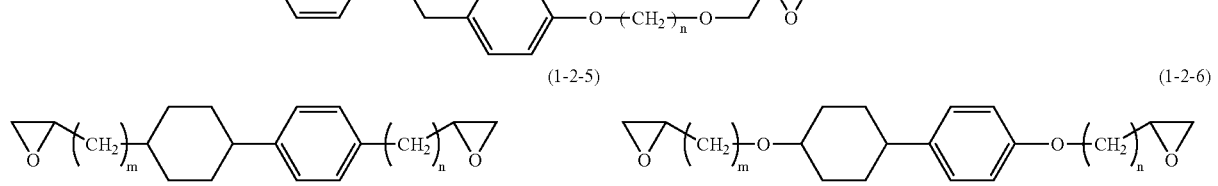

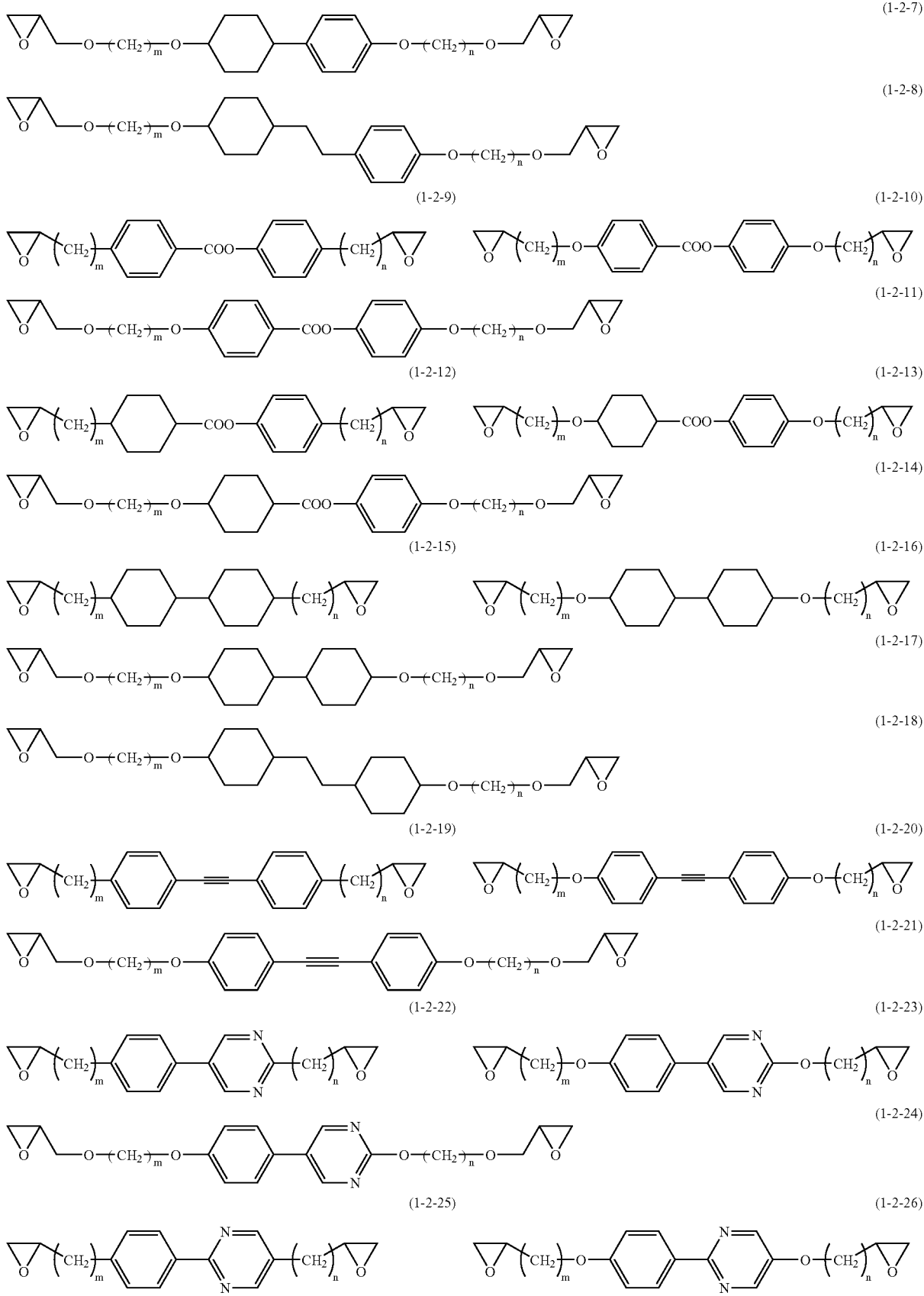

-continued
(1-2-27)
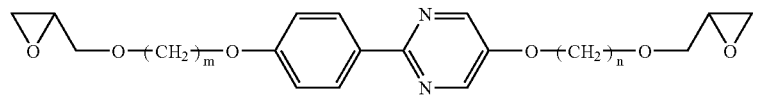
(1-2-28)
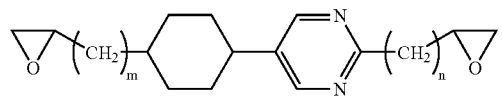
(1-2-29)
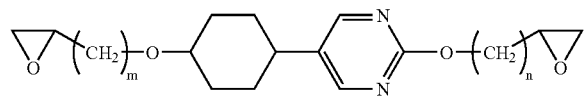
(1-2-30)
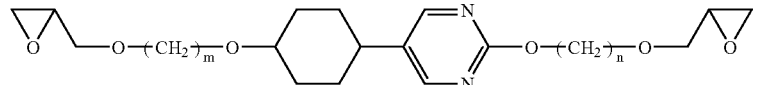
(1-2-31)
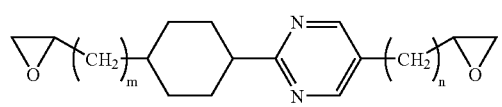
(1-2-32)
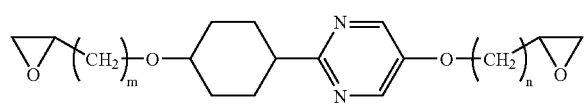
(1-2-33)
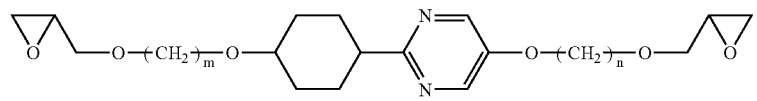
(1-2-34)
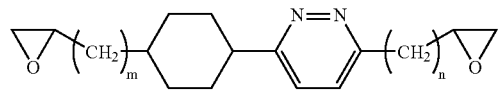
(1-2-35)
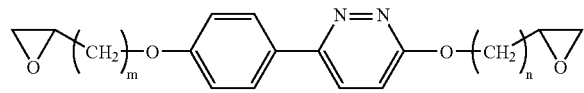
(1-2-36)
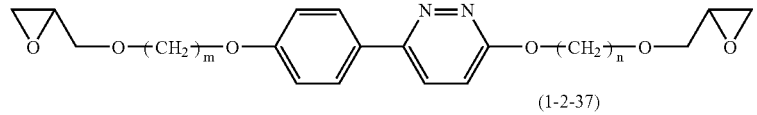
(1-2-37)
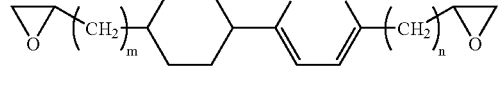
(1-2-38)
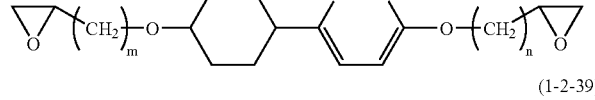
(1-2-39)
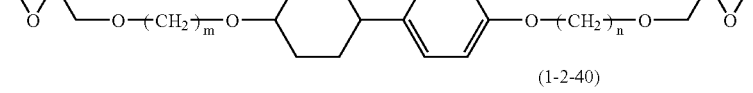
(1-2-40)
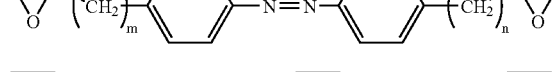
(1-2-41)
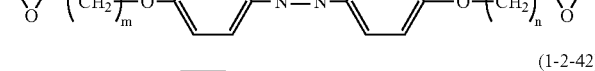
(1-2-42)
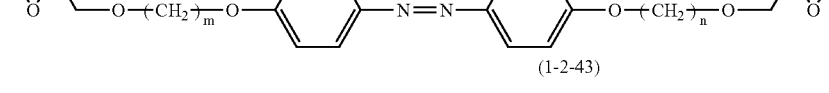
(1-2-43)
(1-2-44)
(1-2-45)
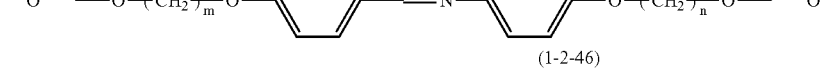
(1-2-46)
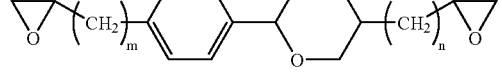
(1-2-47)
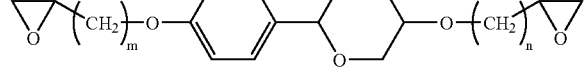

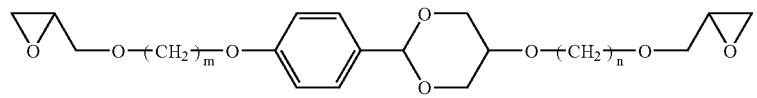
(1-2-48)
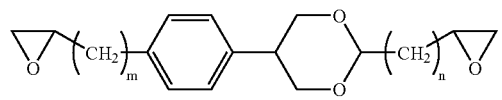
(1-2-49)
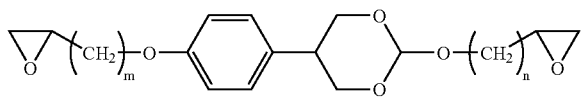
(1-2-50)
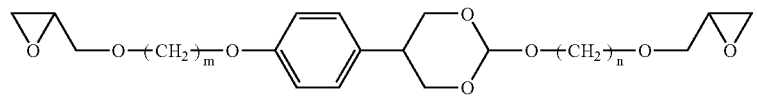
(1-2-51)
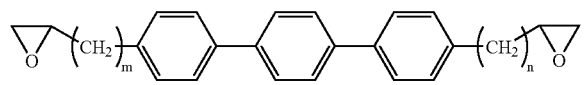
(1-2-52)
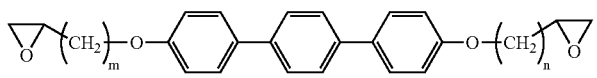
(1-2-53)
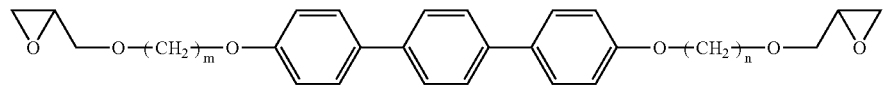
(1-2-54)
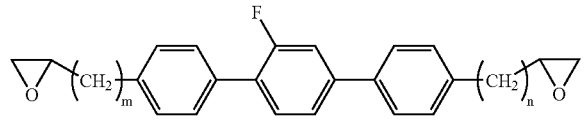
(1-2-55)
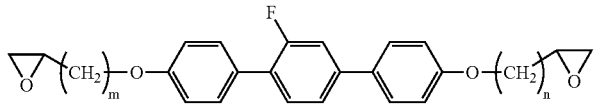
(1-2-56)
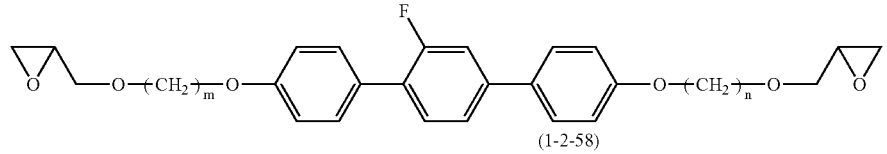
(1-2-57)
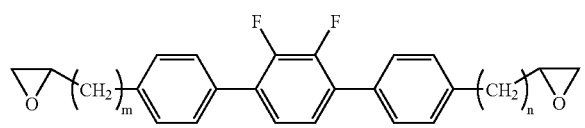
(1-2-58)
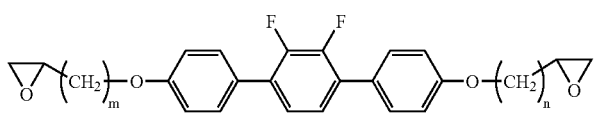
(1-2-59)
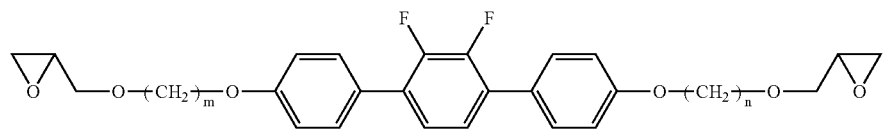
(1-2-60)
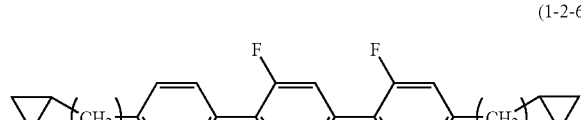
(1-2-61)
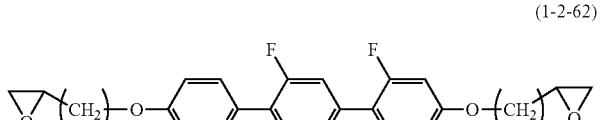
(1-2-62)
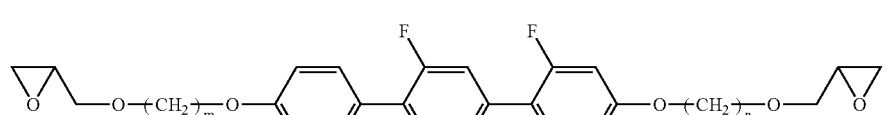
(1-2-63)
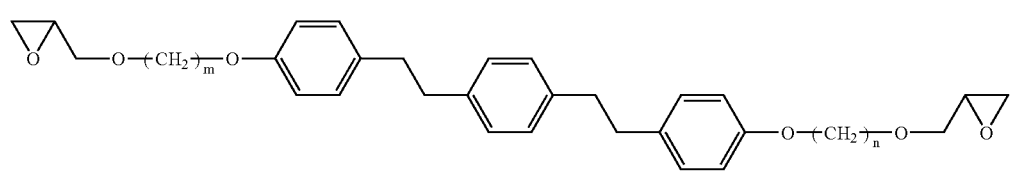
(1-2-64)

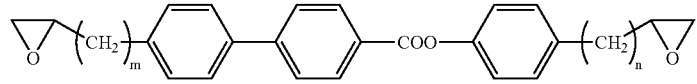 (1-2-65)
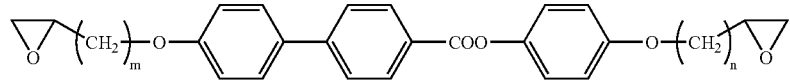 (1-2-66)
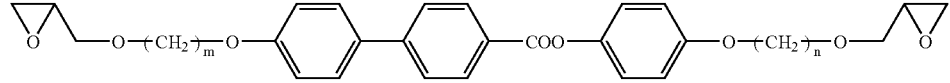 (1-2-67)
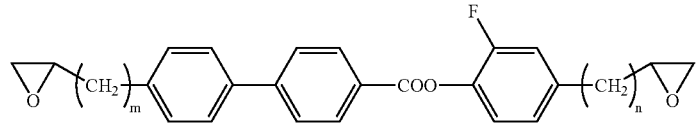 (1-2-68)
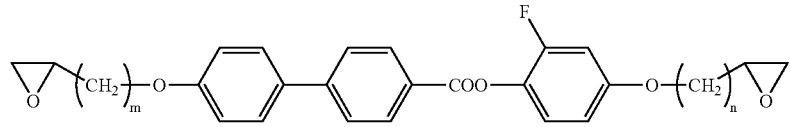 (1-2-69)
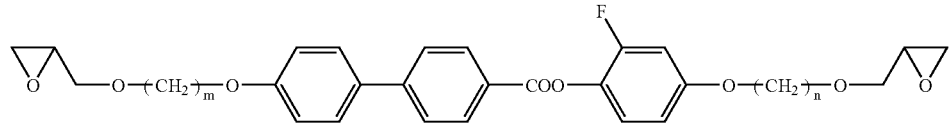 (1-2-70)
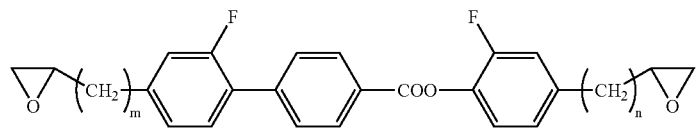 (1-2-71)
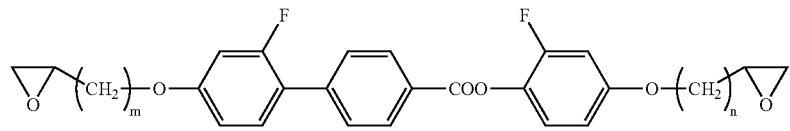 (1-2-72)
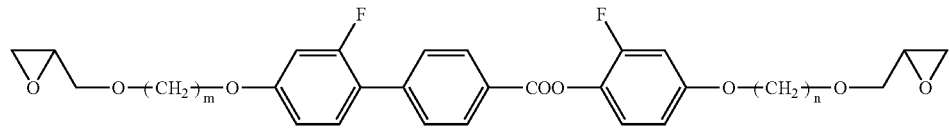 (1-2-73)
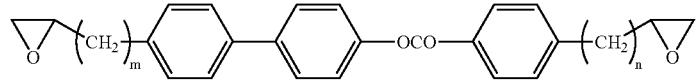 (1-2-74)
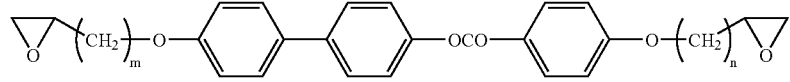 (1-2-75)
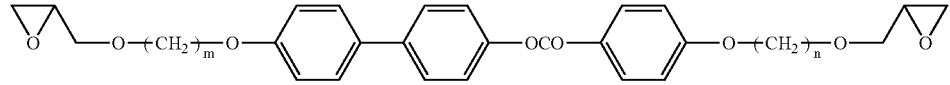 (1-2-76)
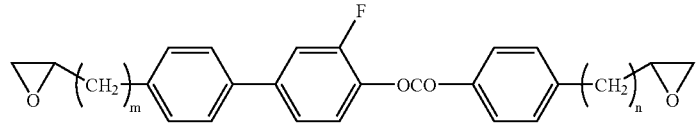 (1-2-77)

-continued
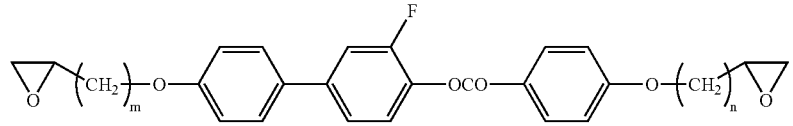
(1-2-78)
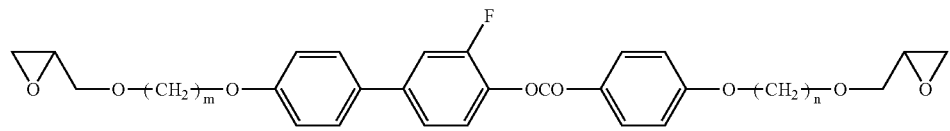
(1-2-79)
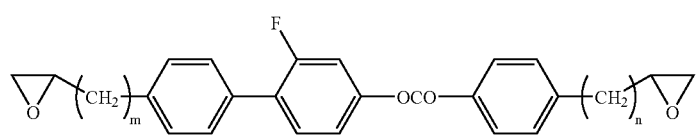
(1-2-80)
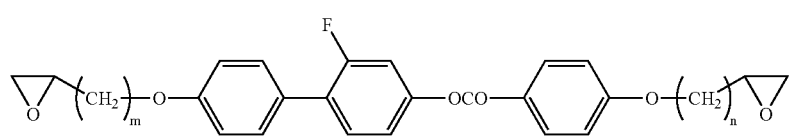
(1-2-81)
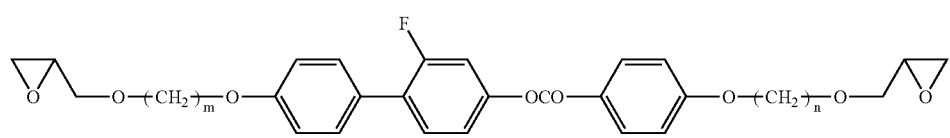
(1-2-82)
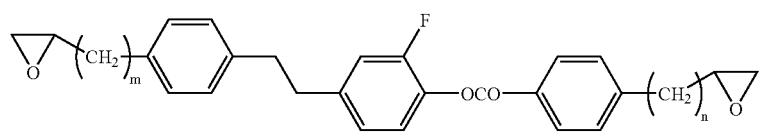
(1-2-83)
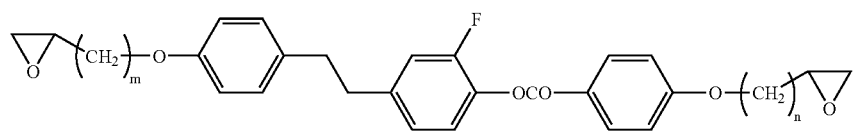
(1-2-84)
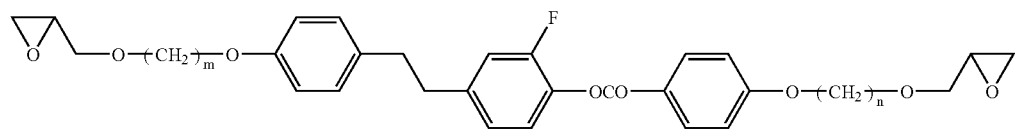
(1-2-85)
(1-2-86) (1-2-87)
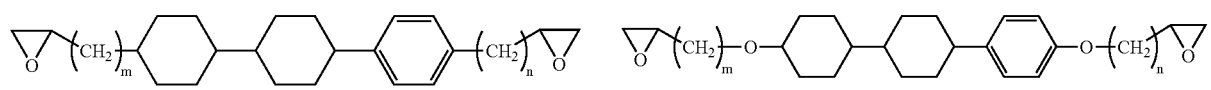
(1-2-88)
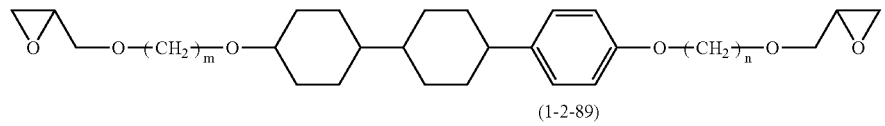
(1-2-89) (1-2-90)
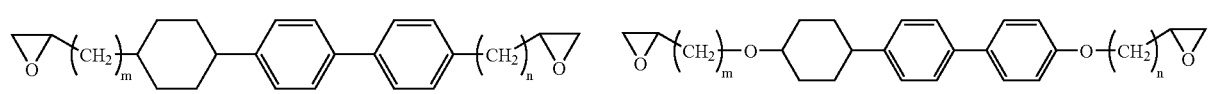
(1-2-91)

-continued
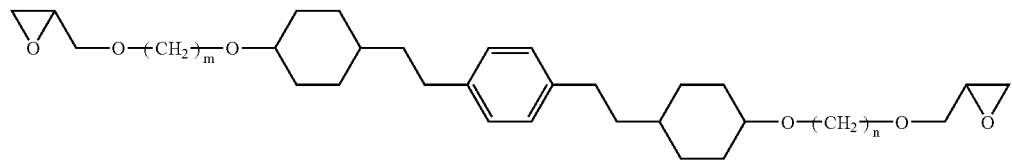
(1-2-92)
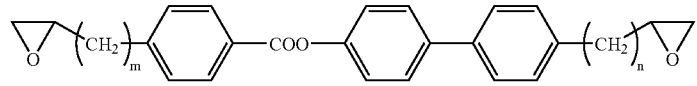
(1-2-93)
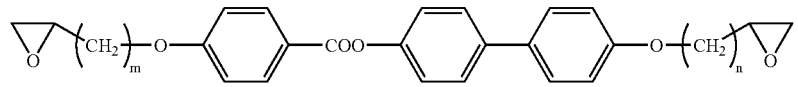
(1-2-94)
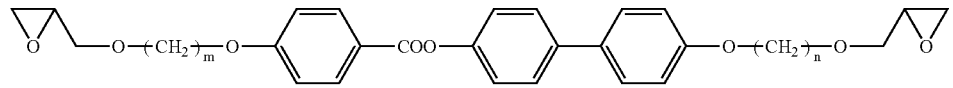
(1-2-95)
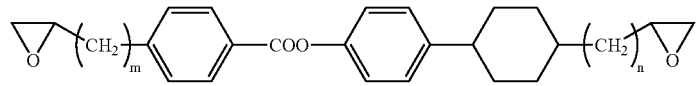
(1-2-96)
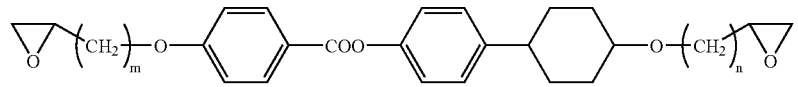
(1-2-97)
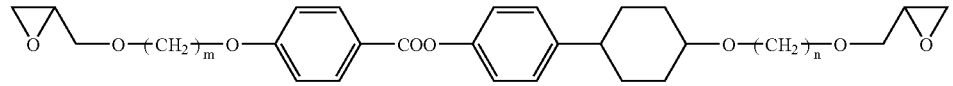
(1-2-98)
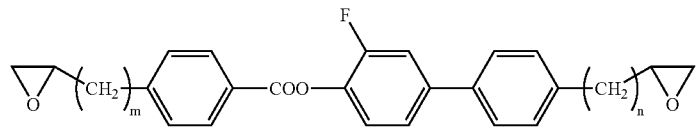
(1-2-99)
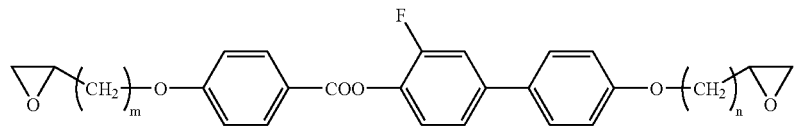
(1-2-100)
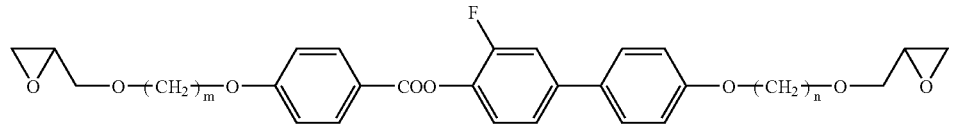
(1-2-101)
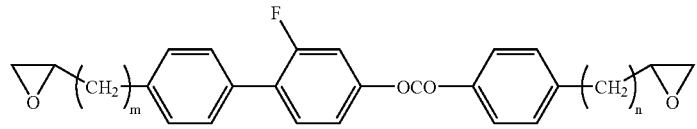
(1-2-102)
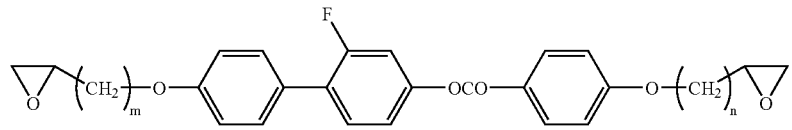
(1-2-103)
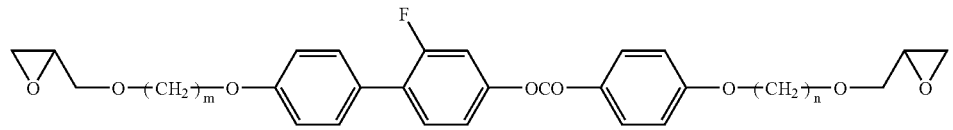
(1-2-104)

-continued
(1-2-105)
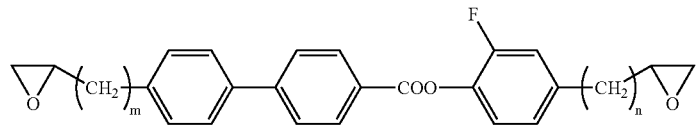
(1-2-106)
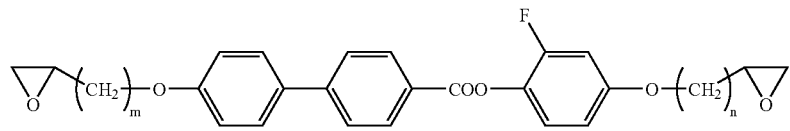
(1-2-107)
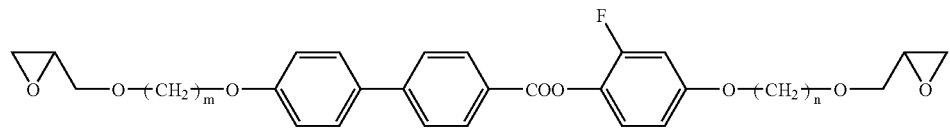
(1-2-108)
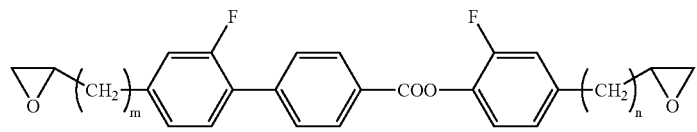
(1-2-109)
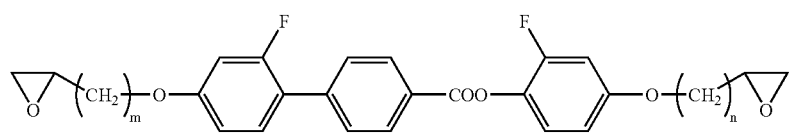
(1-2-110)
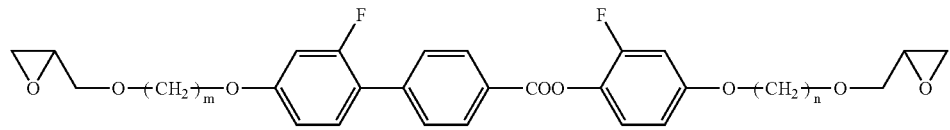
(1-2-111)
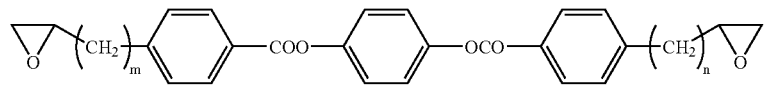
(1-2-112)
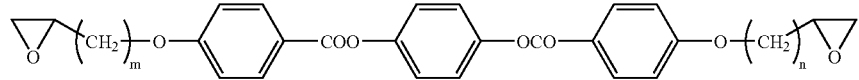
(1-2-113)
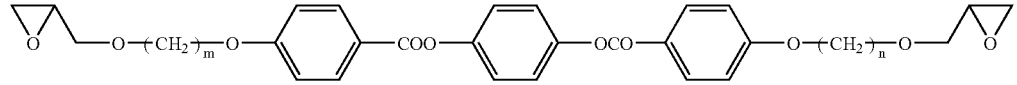
(1-2-114)
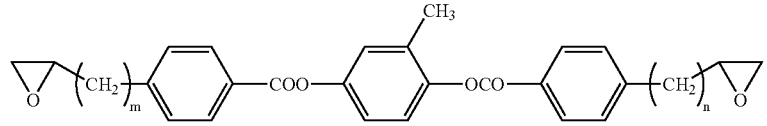
(1-2-115)
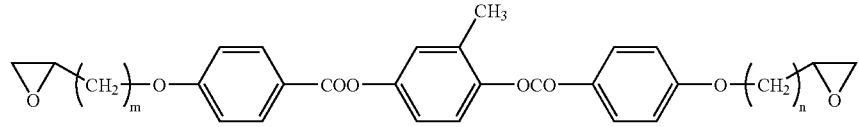
(1-2-116)
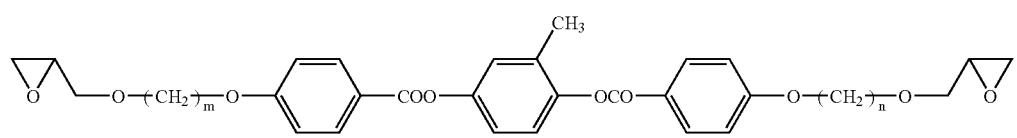

-continued
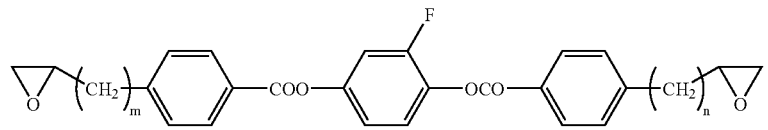
(1-2-117)
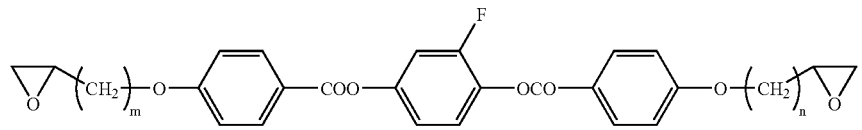
(1-2-118)
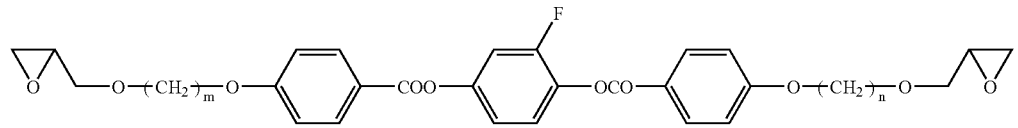
(1-2-119)
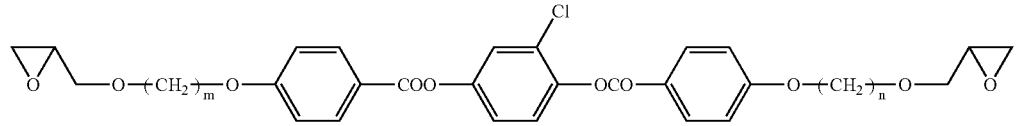
(1-2-120)
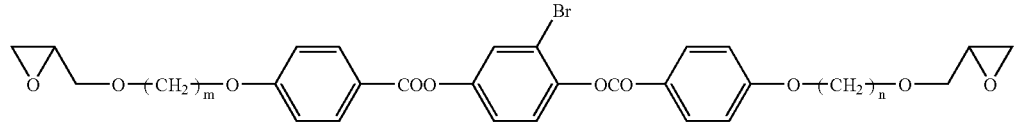
(1-2-121)
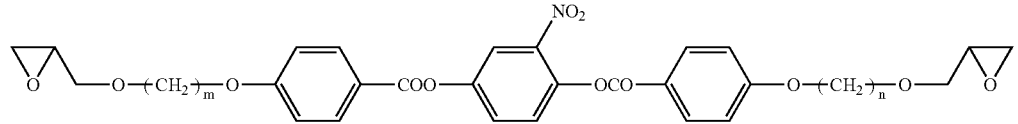
(1-2-122)
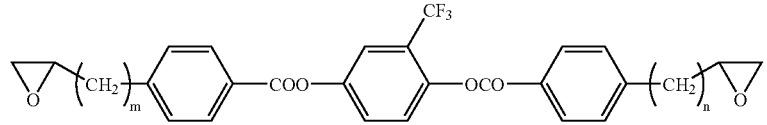
(1-2-123)
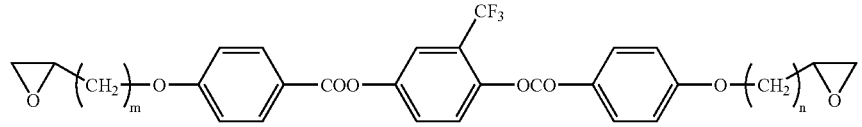
(1-2-124)
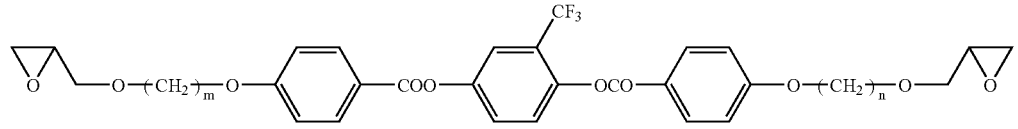
(1-2-125)
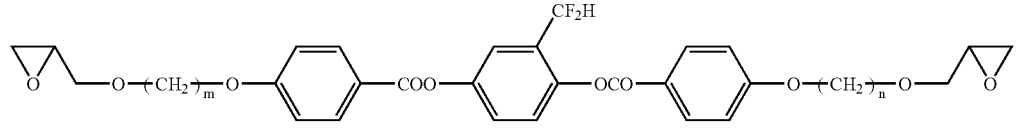
(1-2-126)
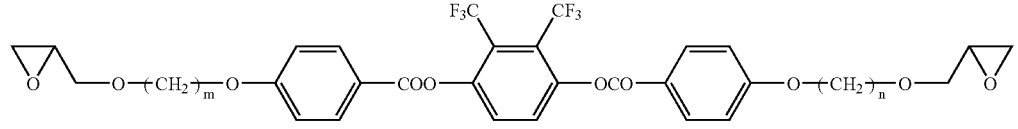
(1-2-127)

-continued
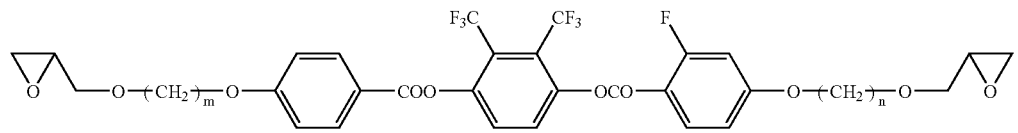
(1-2-128)
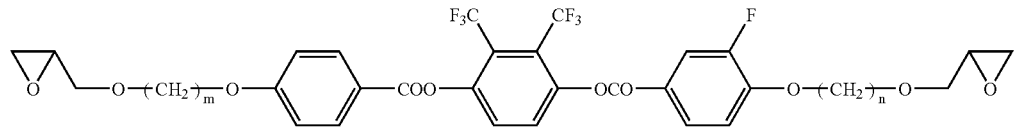
(1-2-129)
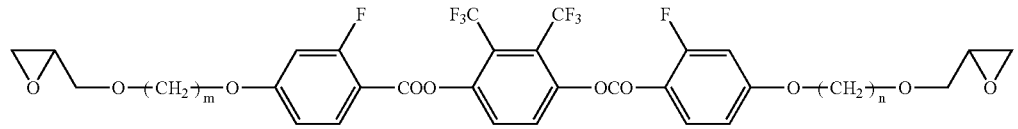
(1-2-130)
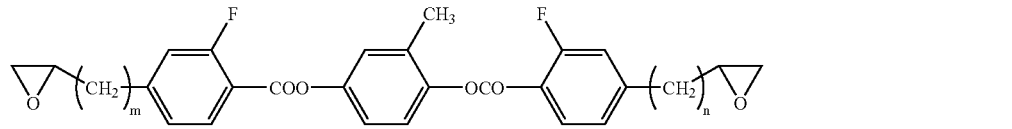
(1-2-131)
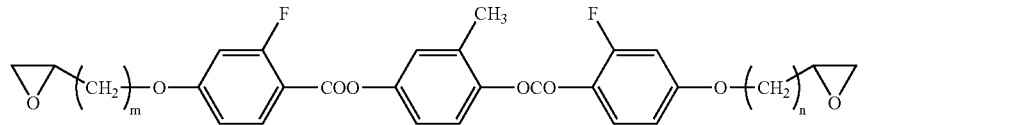
(1-2-132)
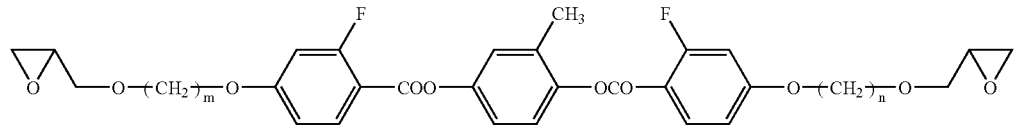
(1-2-133)
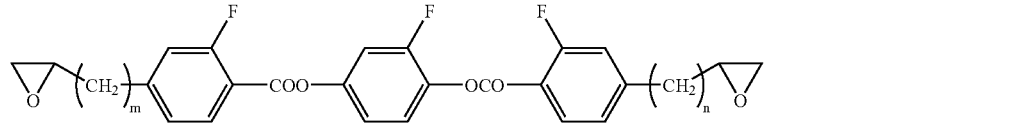
(1-2-134)
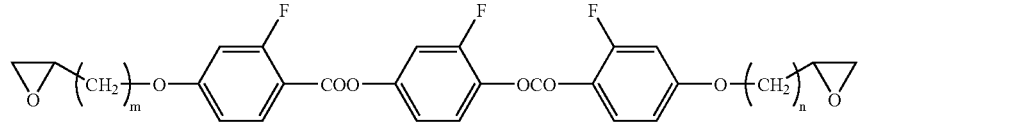
(1-2-135)
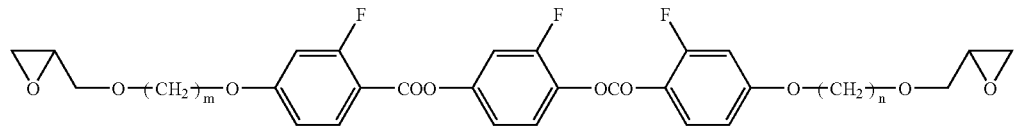
(1-2-136)
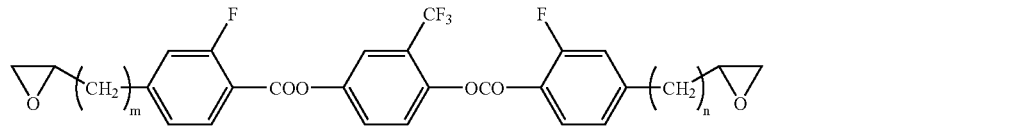
(1-2-137)
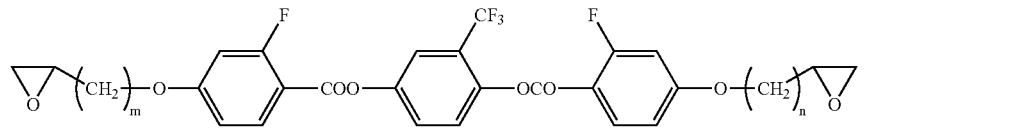
(1-2-138)

-continued
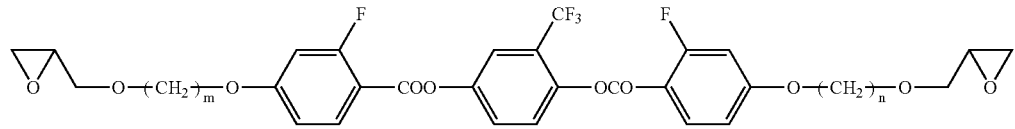
(1-2-139)
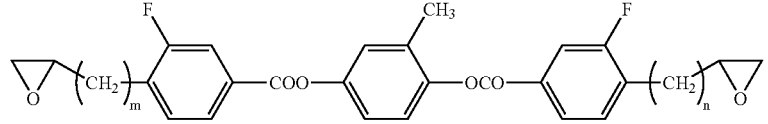
(1-2-140)
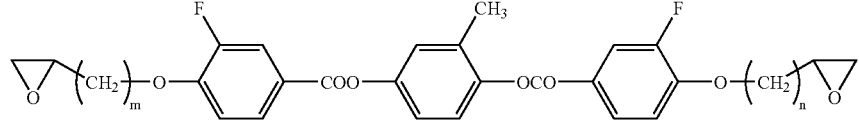
(1-2-141)
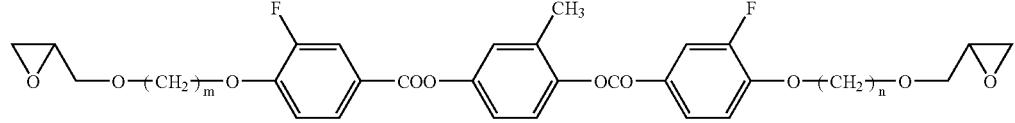
(1-2-142)
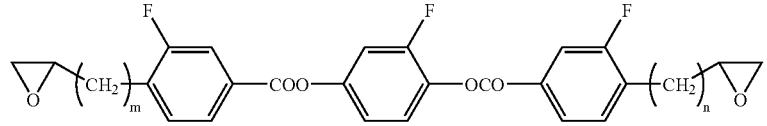
(1-2-143)
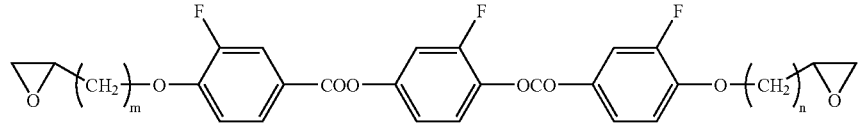
(1-2-144)
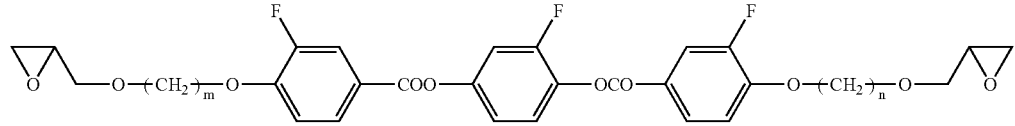
(1-2-145)
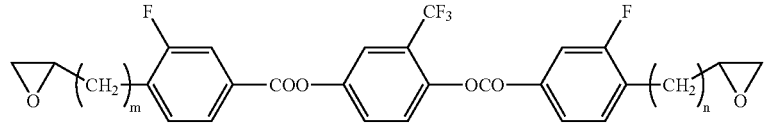
(1-2-146)
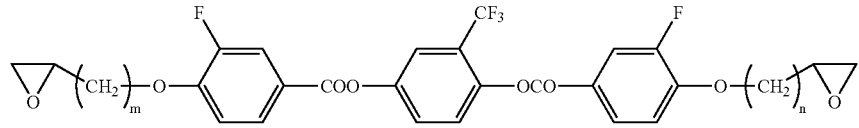
(1-2-147)
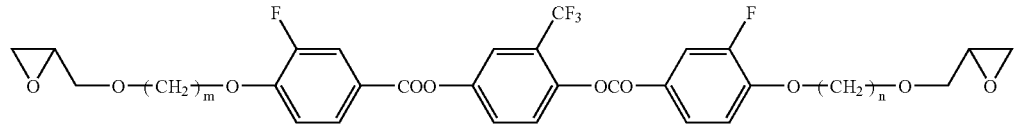
(1-2-148)
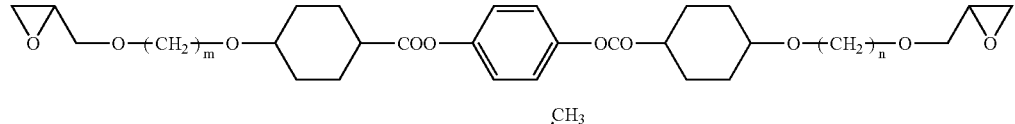
(1-2-149)
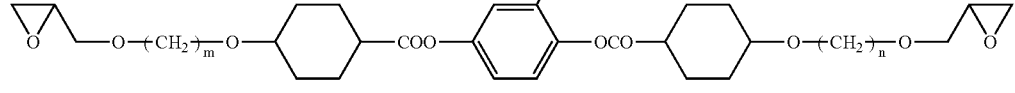
(1-2-150)

-continued
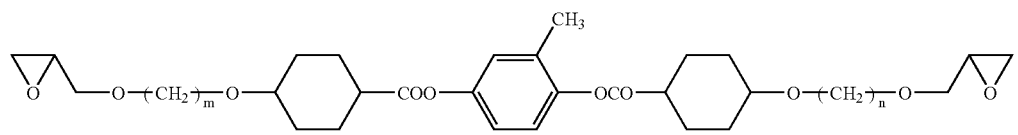
(1-2-151)
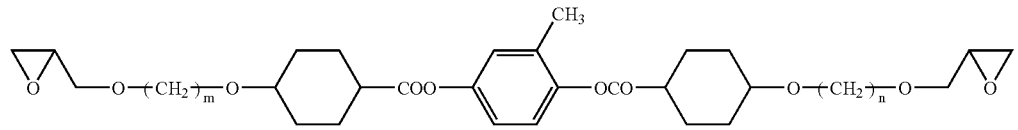
(1-2-152)
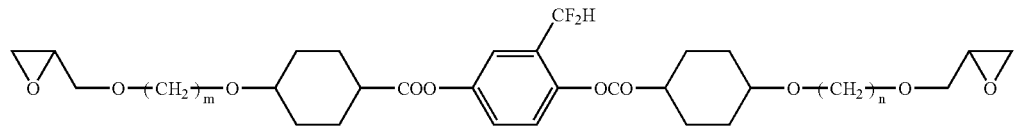
(1-2-153)
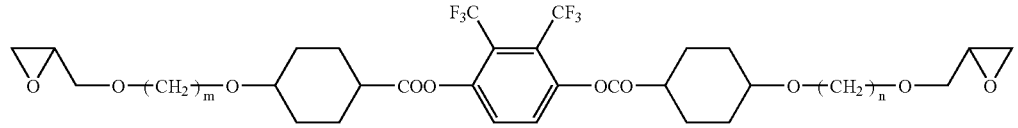
(1-2-154)
(1-2-155)
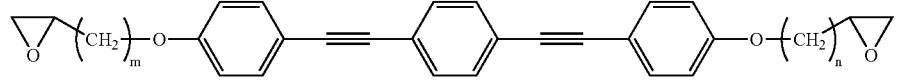
(1-2-156)
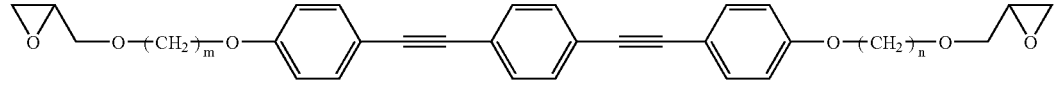
(1-2-157)
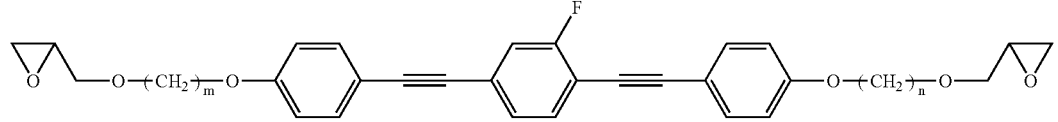
(1-2-158)
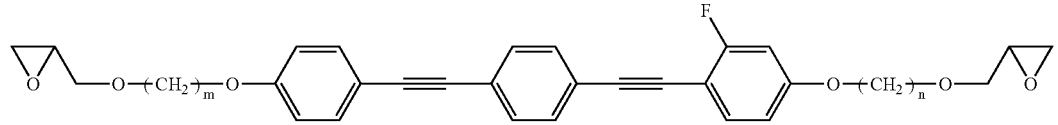
(1-2-159)
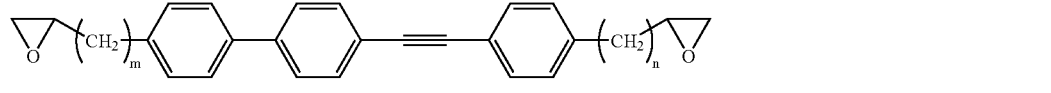
(1-2-160)
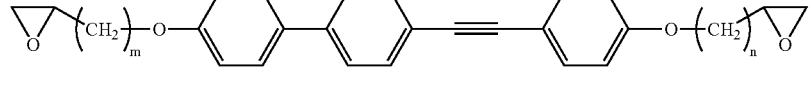
(1-2-161)
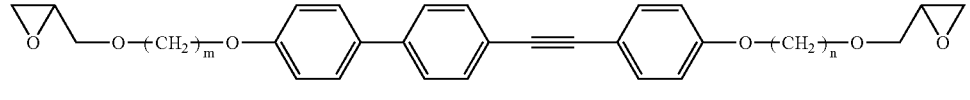
(1-2-162)
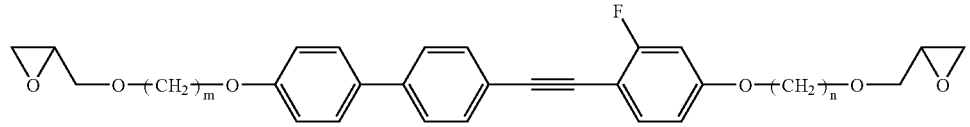
(1-2-163)

-continued
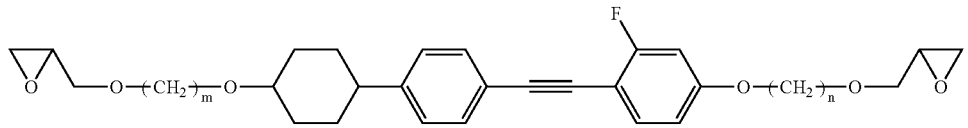
(1-2-164)
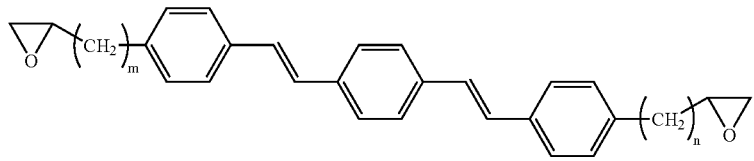
(1-2-165)
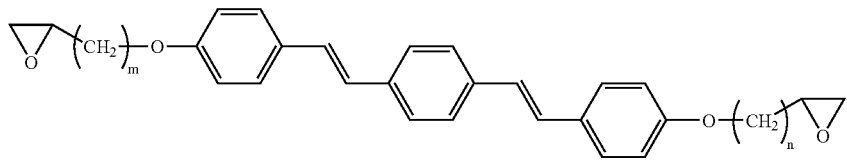
(1-2-166)
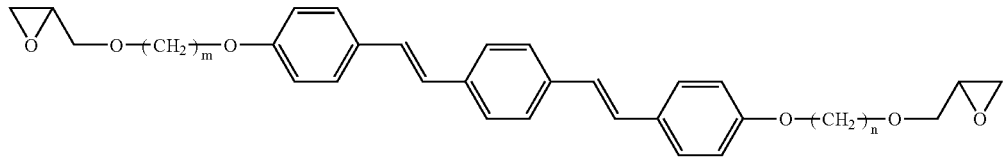
(1-2-167)
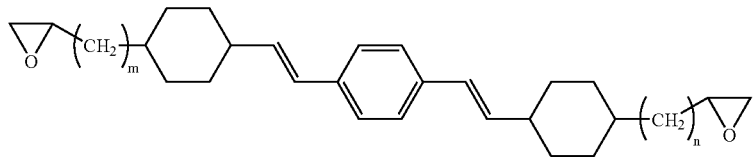
(1-2-168)
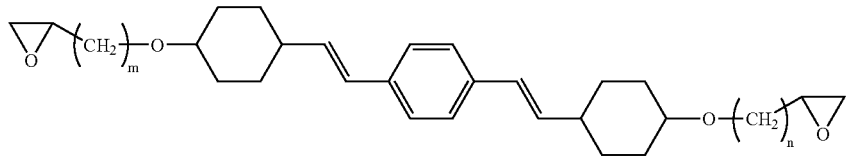
(1-2-169)
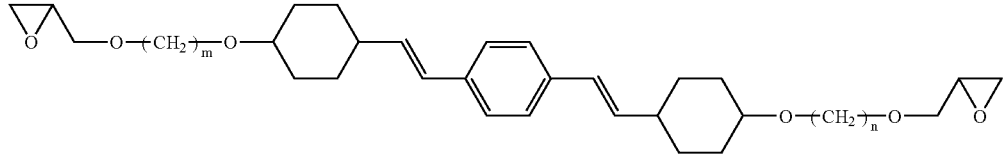
(1-2-170)
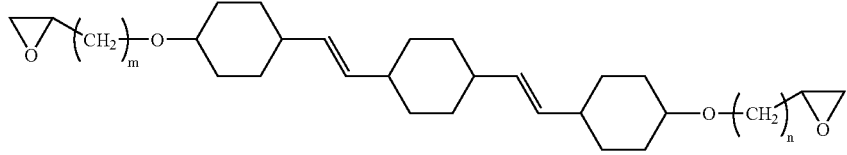
(1-2-171)
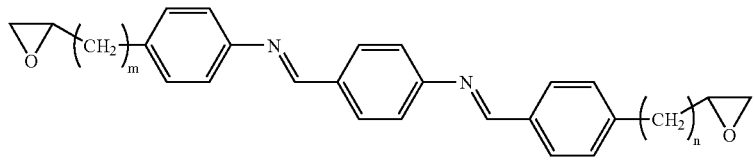
(1-2-172)

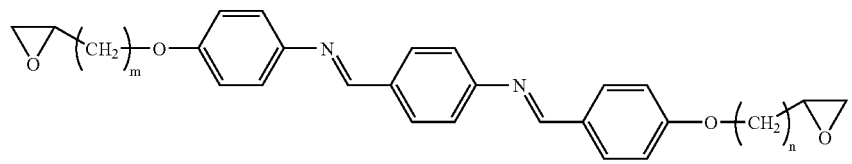
(1-2-173)
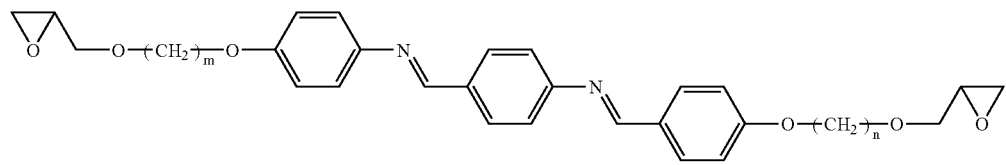
(1-2-174)
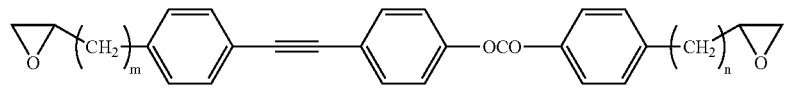
(1-2-175)
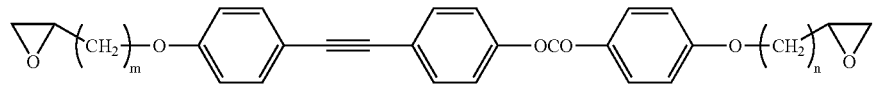
(1-2-176)
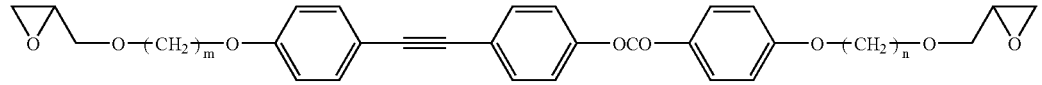
(1-2-177)
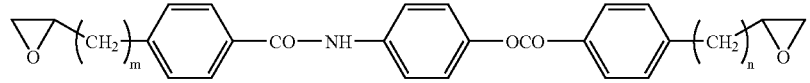
(1-2-178)
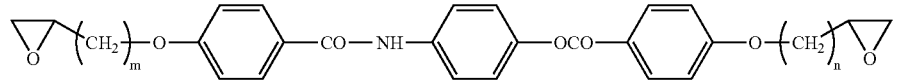
(1-2-179)
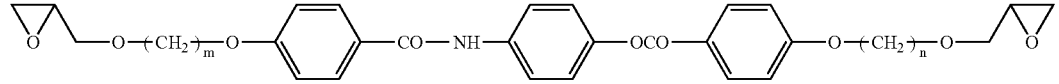
(1-2-180)
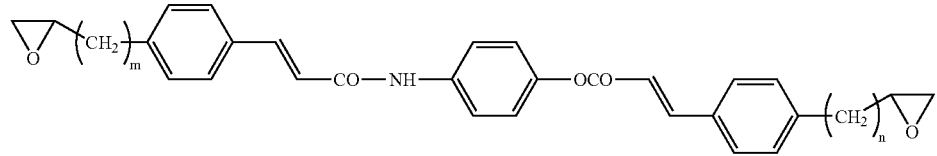
(1-2-181)
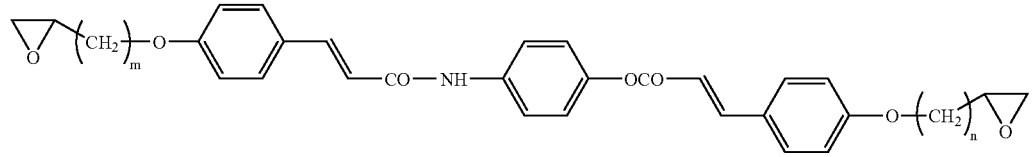
(1-2-182)
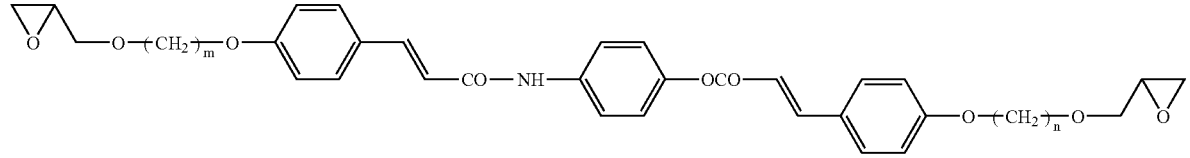
(1-2-183)
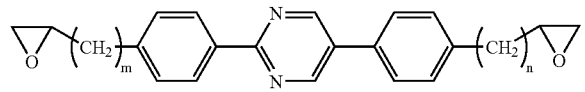
(1-2-184)
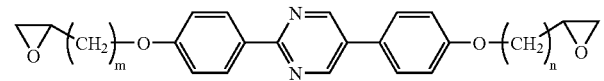
(1-2-185)

-continued
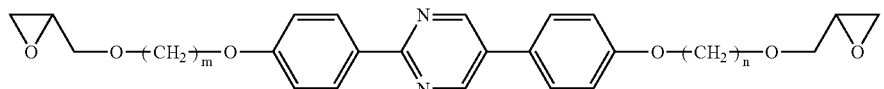
(1-2-186)
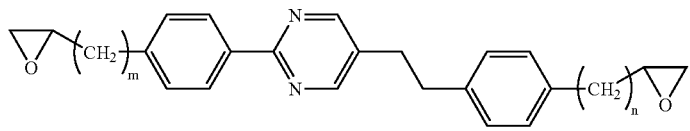
(1-2-187)
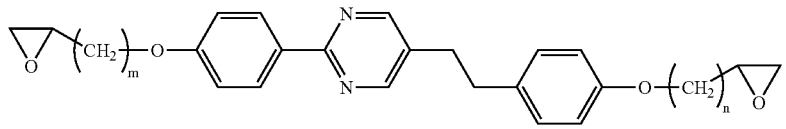
(1-2-188)
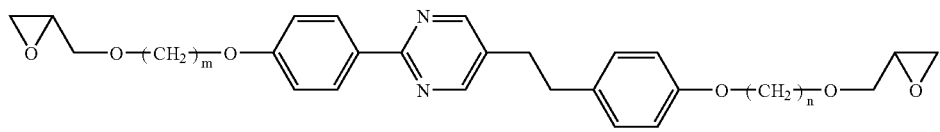
(1-2-189)
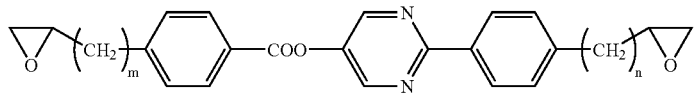
(1-2-190)
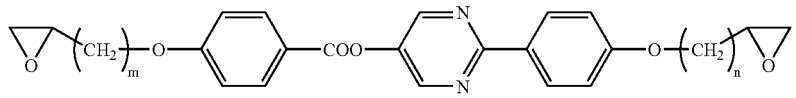
(1-2-191)
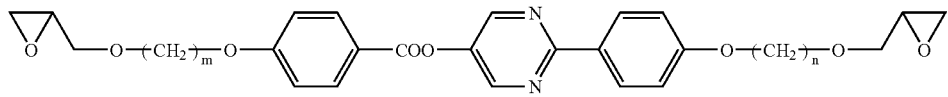
(1-2-192)
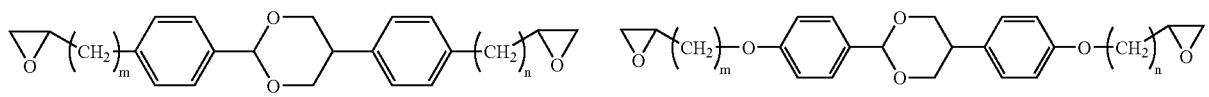
(1-2-193) (1-2-194)
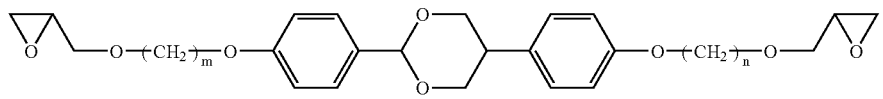
(1-2-195)
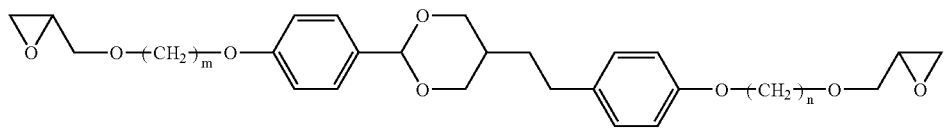
(1-2-196)
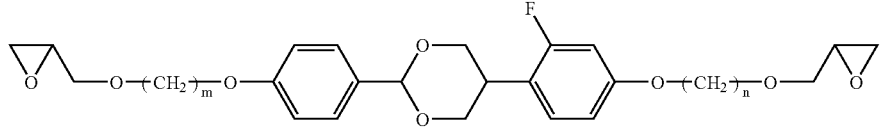
(1-2-197)
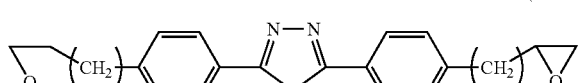
(1-2-198)
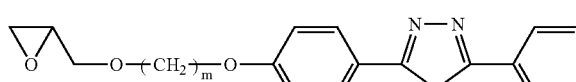
(1-2-199)
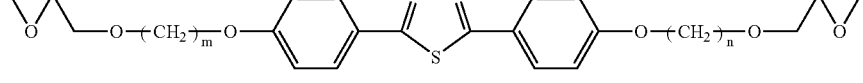
(1-2-200)

-continued
(1-2-201)
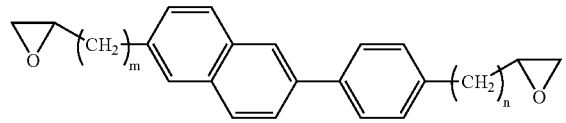
(1-2-202)
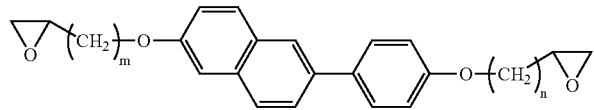
(1-2-203)
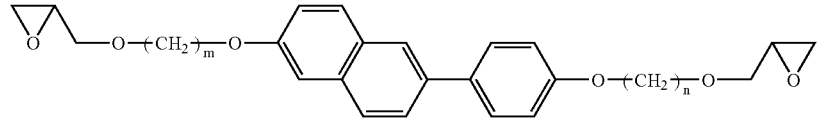
(1-2-204)
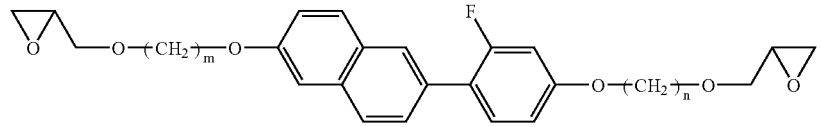
(1-2-205)
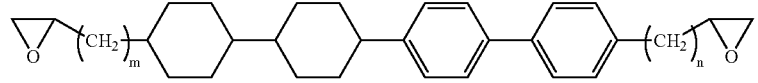
(1-2-206)
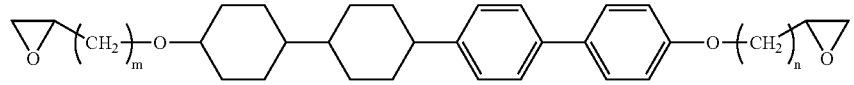
(1-2-207)
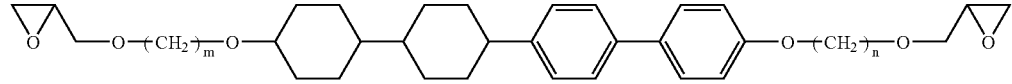
(1-2-208)
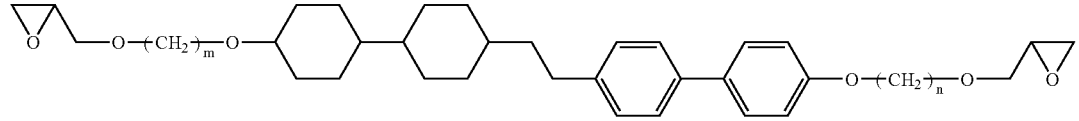
(1-2-209)
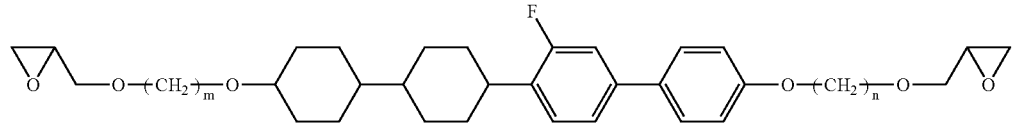
(1-2-210)
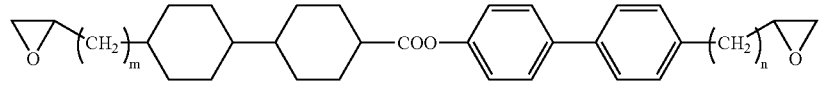
(1-2-211)
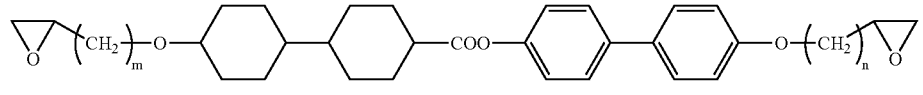
(1-2-212)
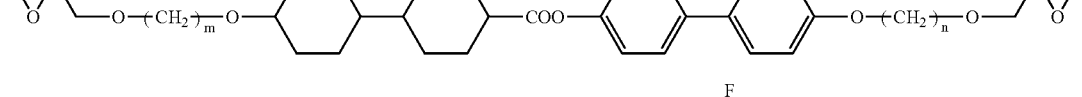
(1-2-213)
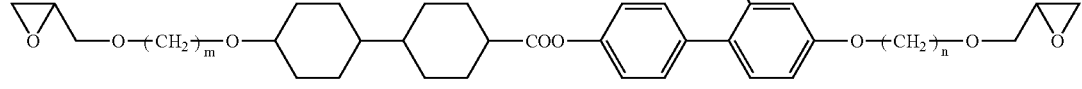
(1-2-214)
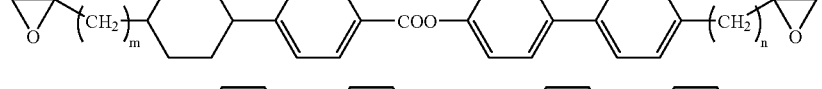
(1-2-215)
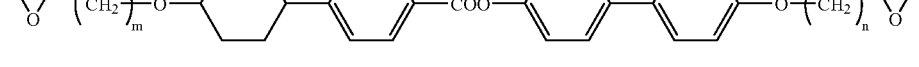

-continued
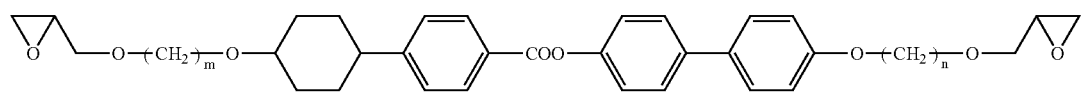
(1-2-216)
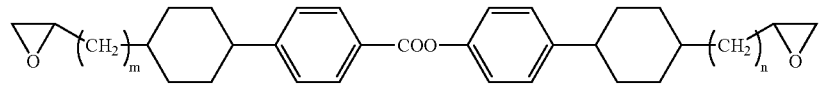
(1-2-217)
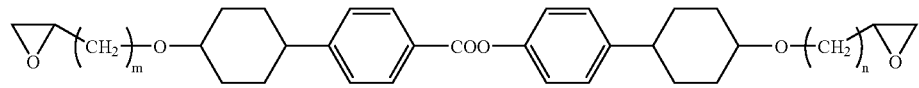
(1-2-218)
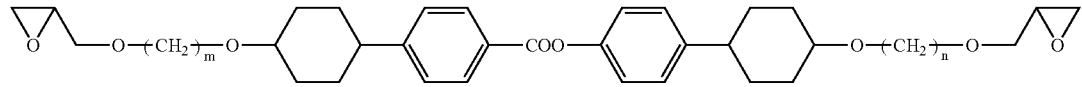
(1-2-219)
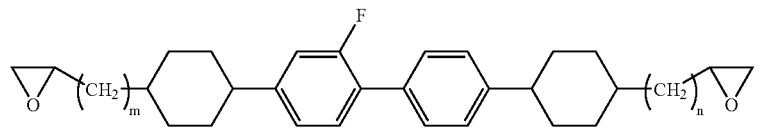
(1-2-220)
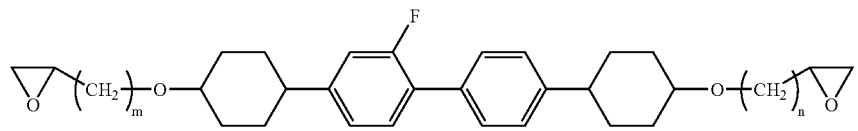
(1-2-221)
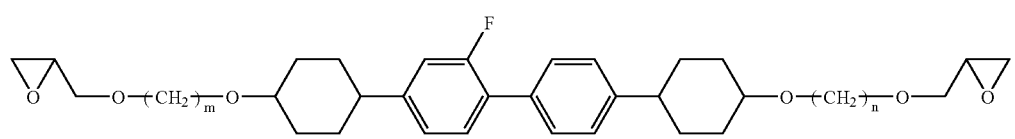
(1-2-222)
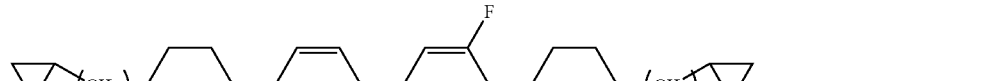
(1-2-223)
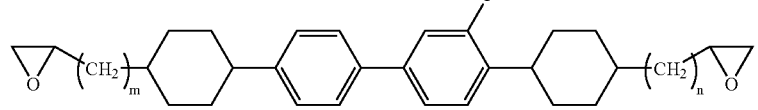
(1-2-224)
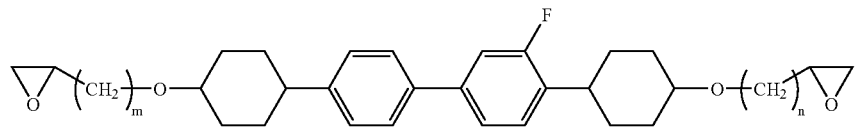
(1-2-225)
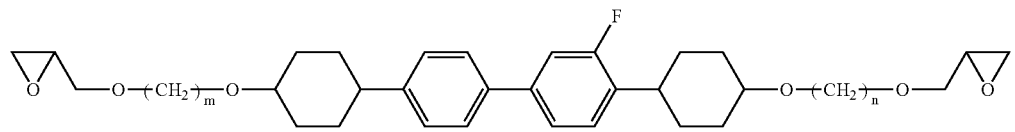
(1-2-226)
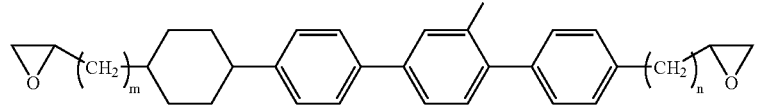
(1-2-227)
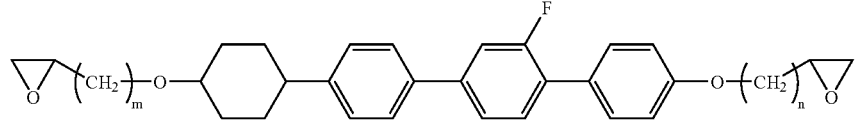
(1-2-228)
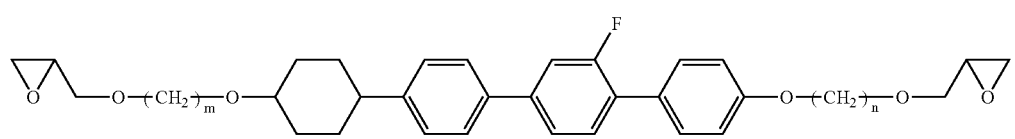

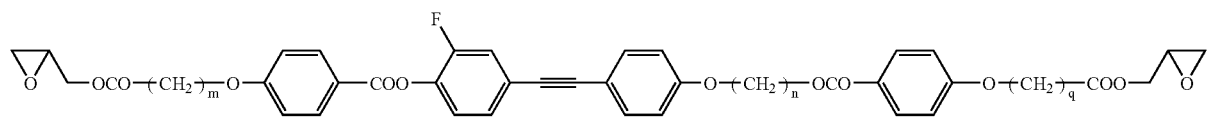
(1-2-229)
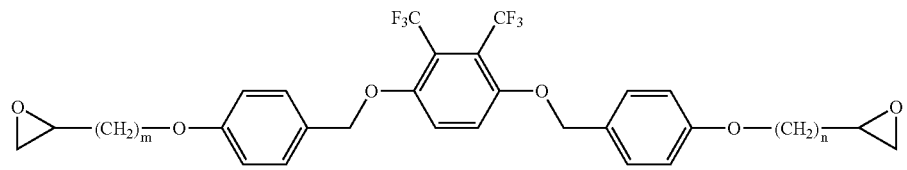
(1-2-230)
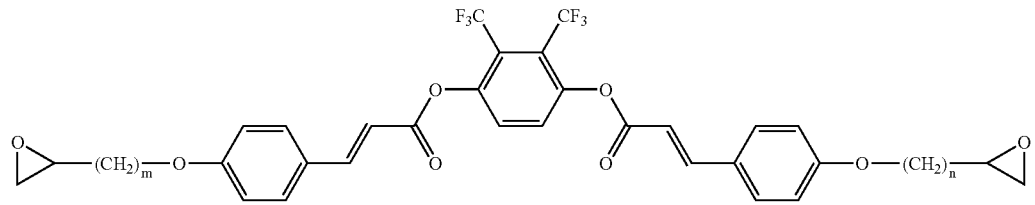
(1-2-231)
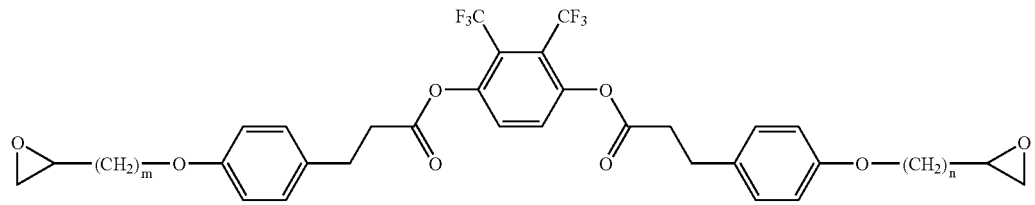
(1-2-232)
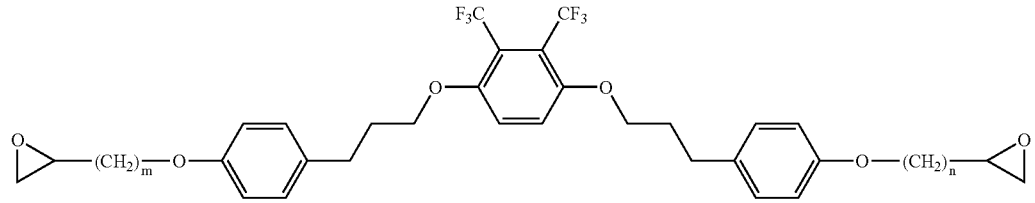
(1-2-233)
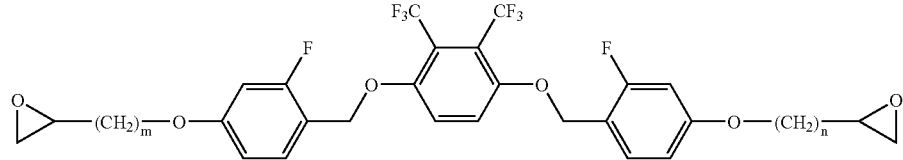
(1-2-234)
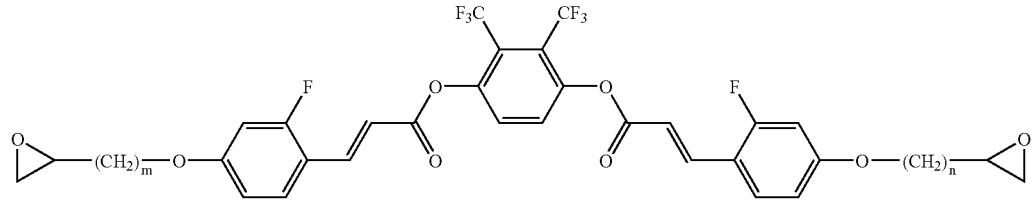
(1-2-235)
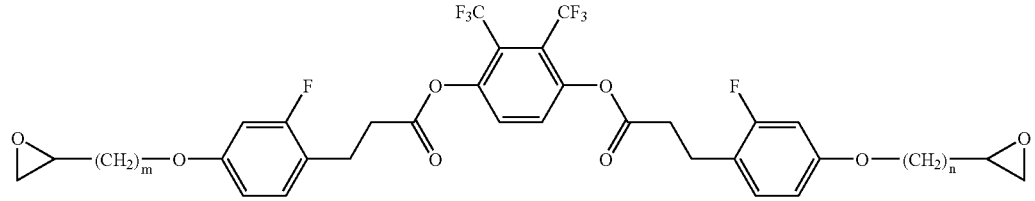
(1-2-236)

-continued
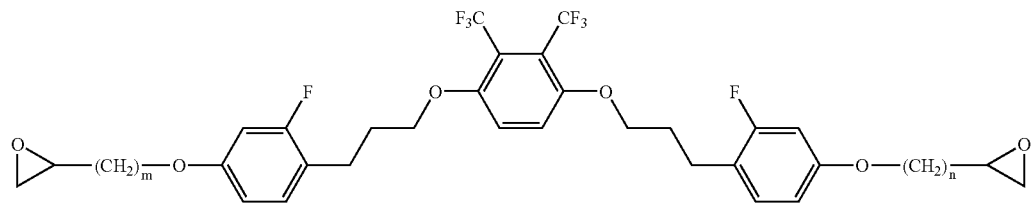 (1-2-237)
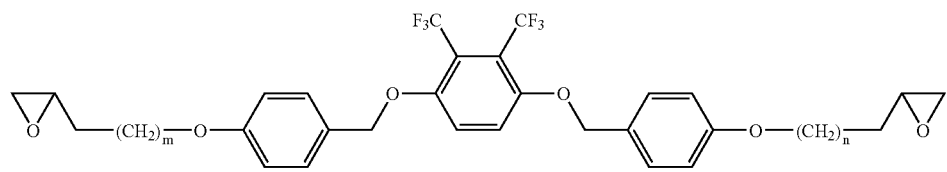 (1-2-238)
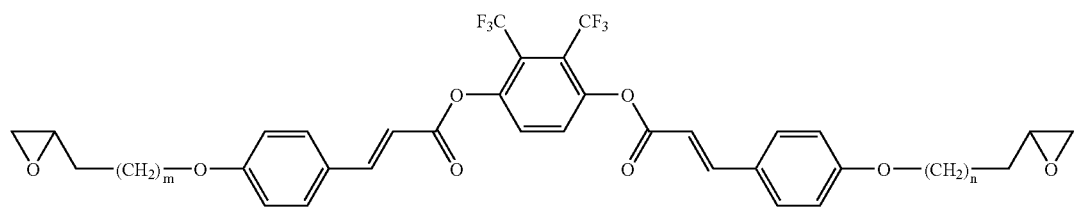 (1-2-239)
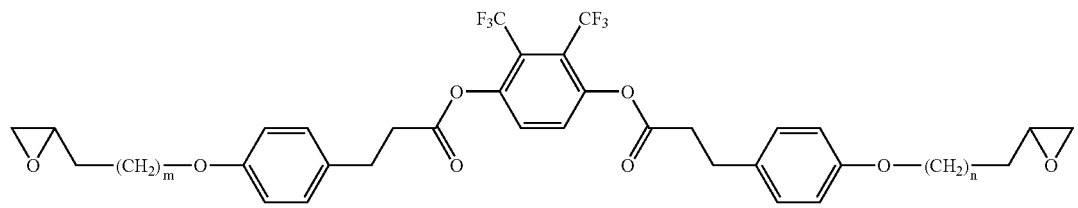 (1-2-240)
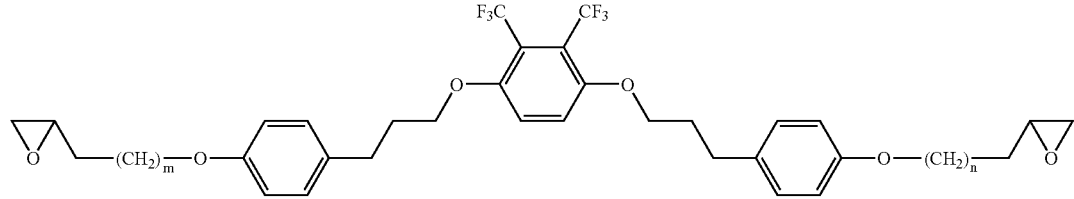 (1-2-241)
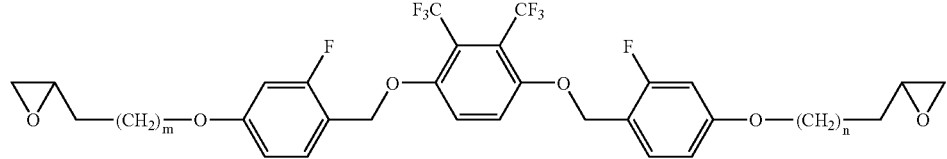 (1-2-242)
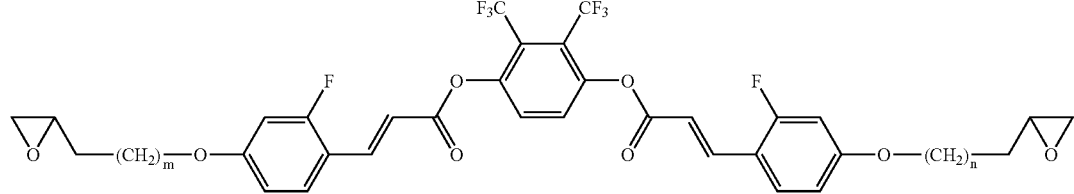 (1-2-243)
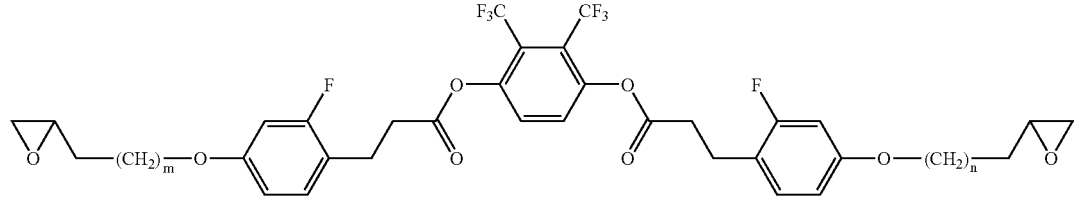 (1-2-244)

-continued
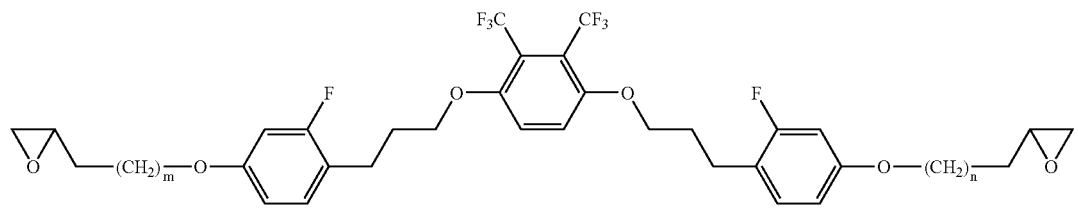
(1-2-245)
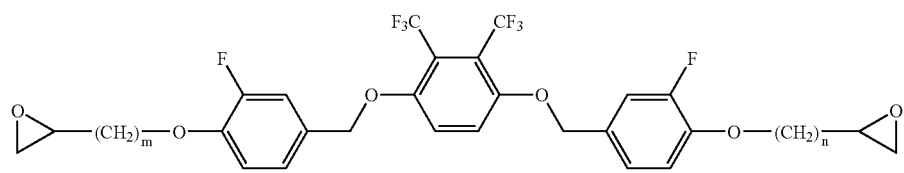
(1-2-246)
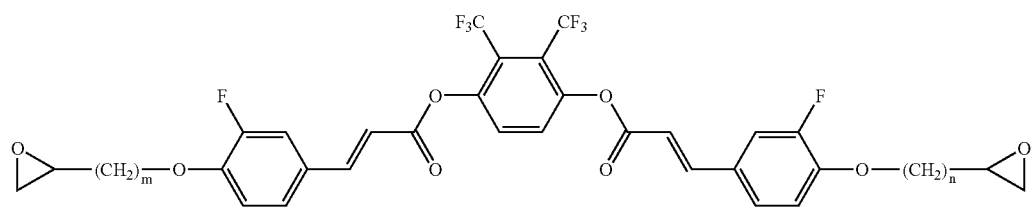
(1-2-247)
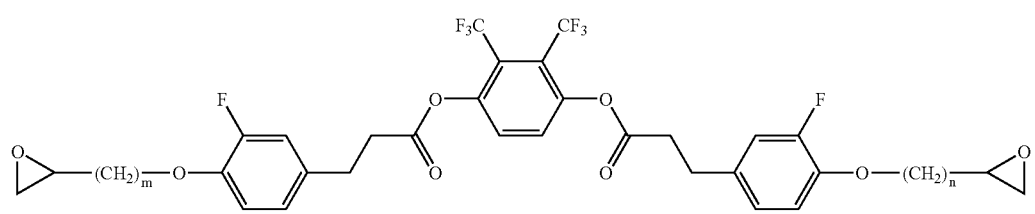
(1-2-248)
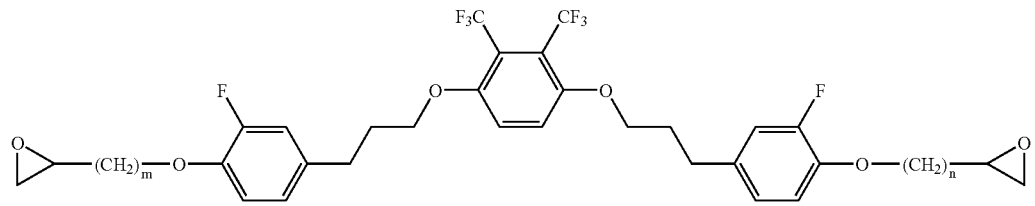
(1-2-249)
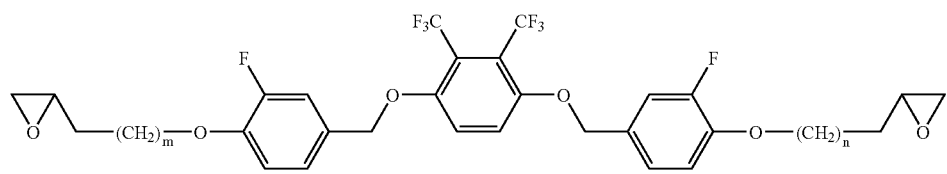
(1-2-250)
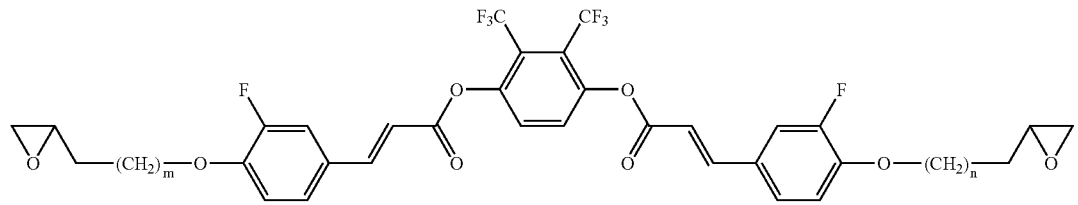
(1-2-251)
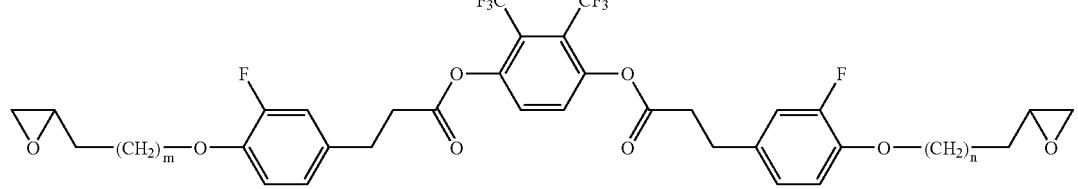
(1-2-252)

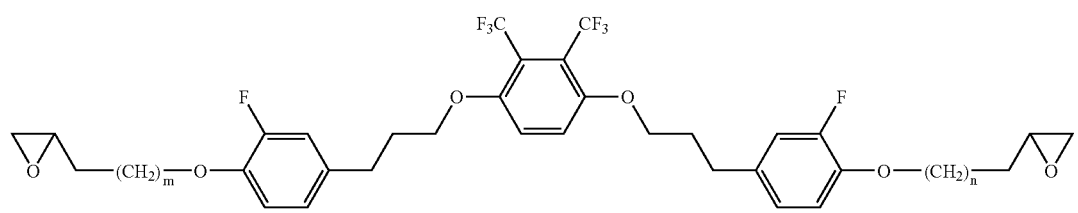
(1-2-253)
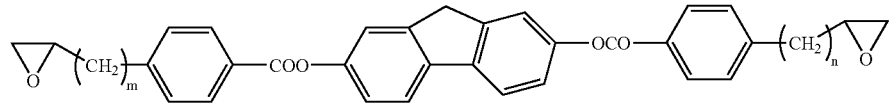
(1-3-1)
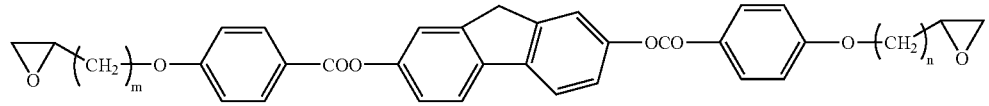
(1-3-2)
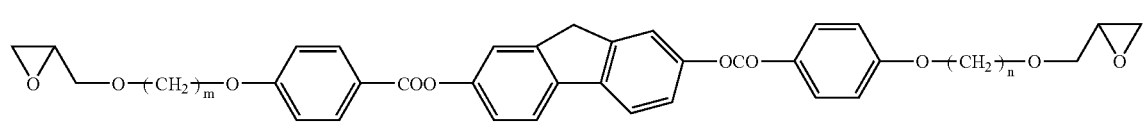
(1-3-3)
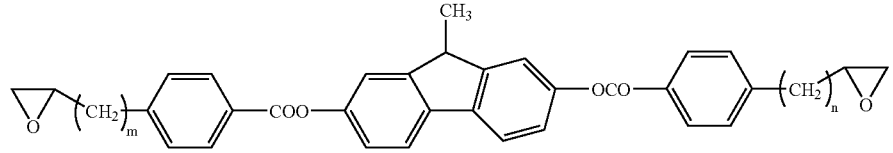
(1-3-4)
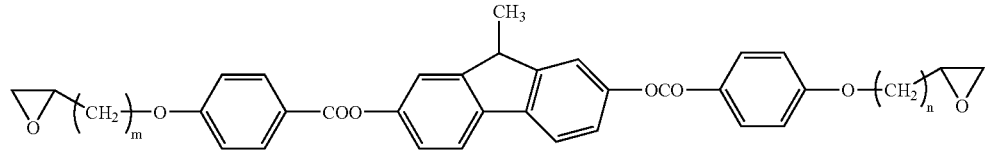
(1-3-5)
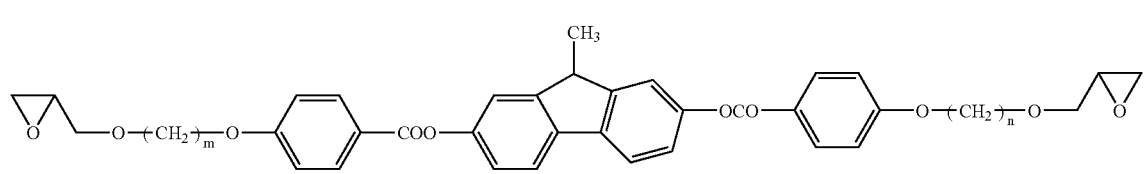
(1-3-6)
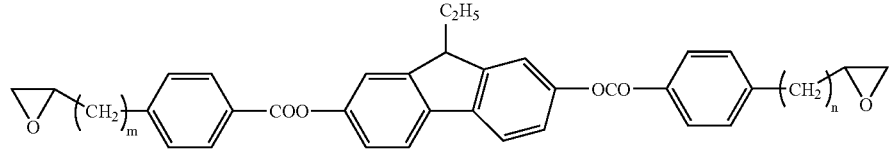
(1-3-7)
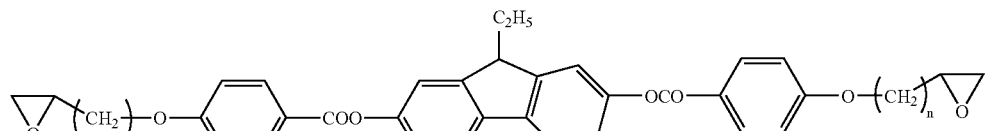
(1-3-8)
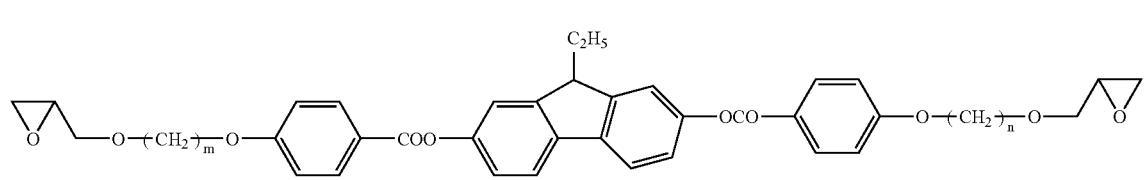
(1-3-9)

(1-3-10)
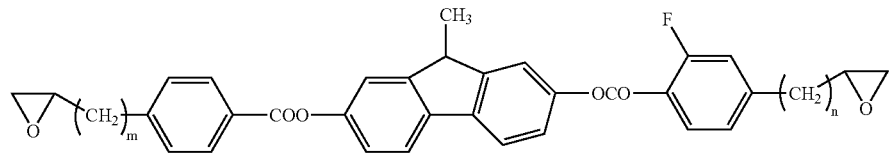
(1-3-11)
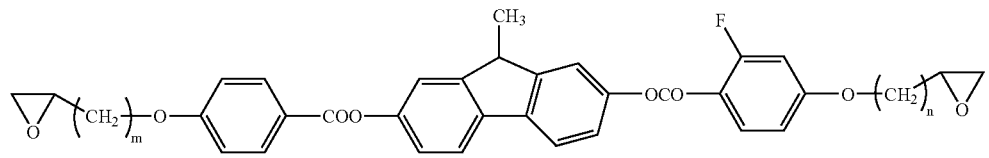
(1-3-12)
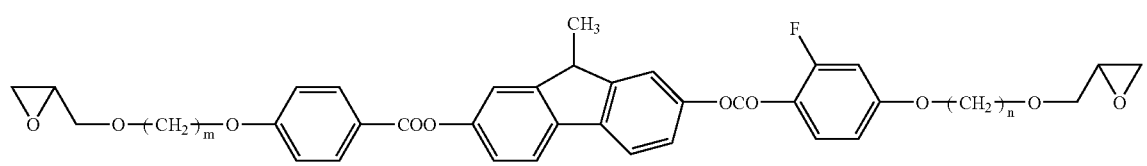
(1-3-13)
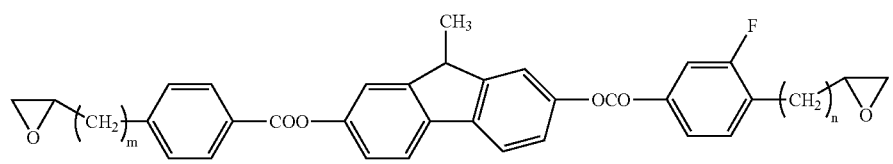
(1-3-14)
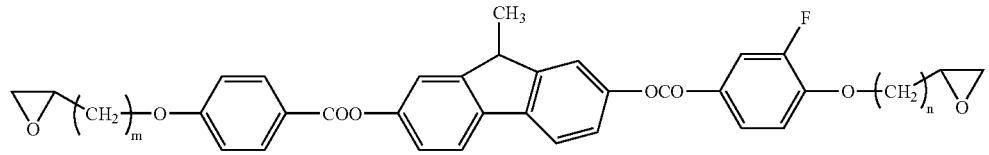
(1-3-15)
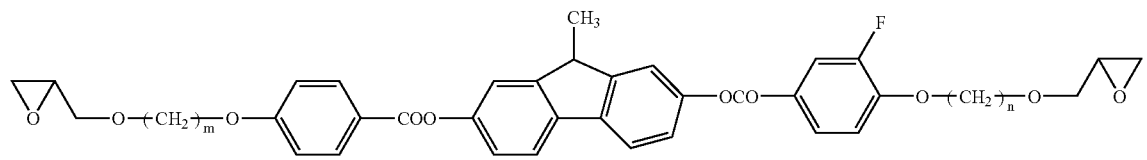
(1-3-16)
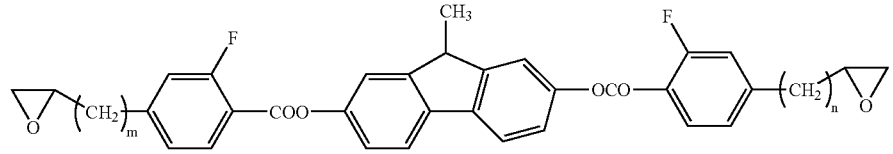
(1-3-17)
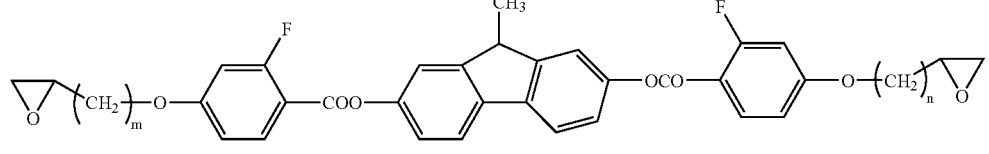
(1-3-18)
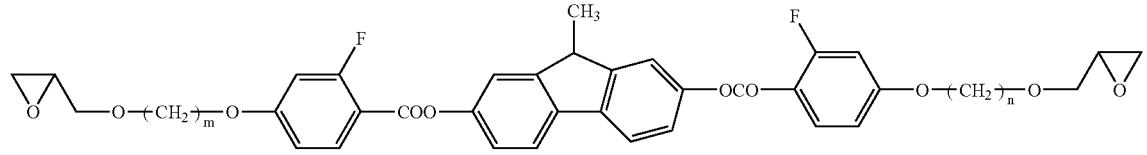

-continued
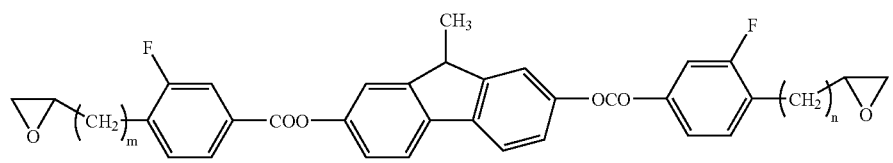
(1-3-19)
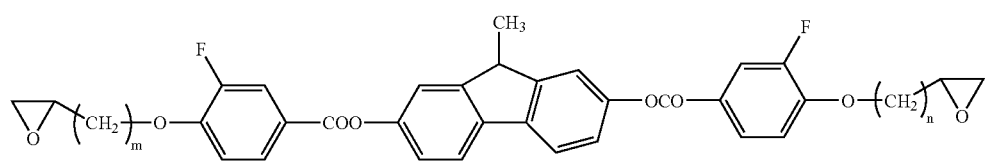
(1-3-20)
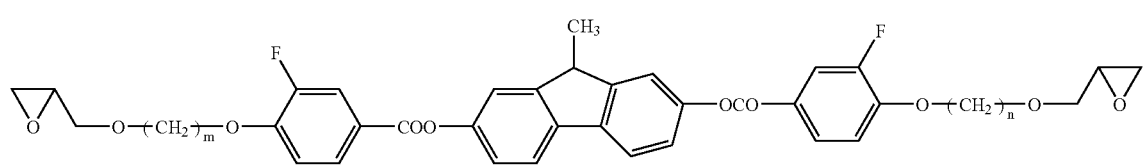
(1-3-21)
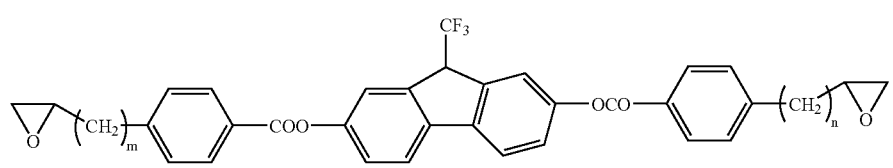
(1-3-22)
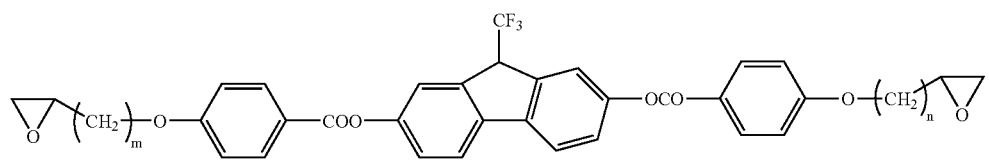
(1-3-23)
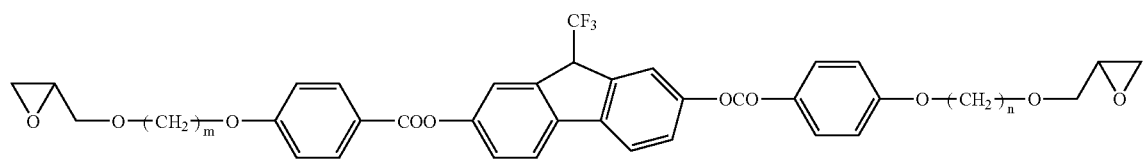
(1-3-24)
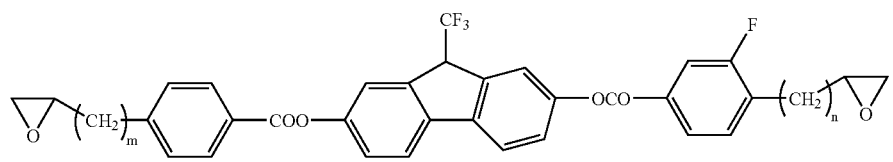
(1-3-25)
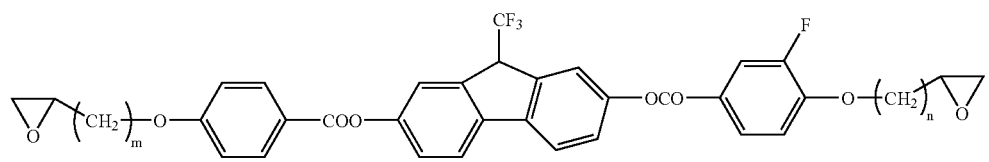
(1-3-26)
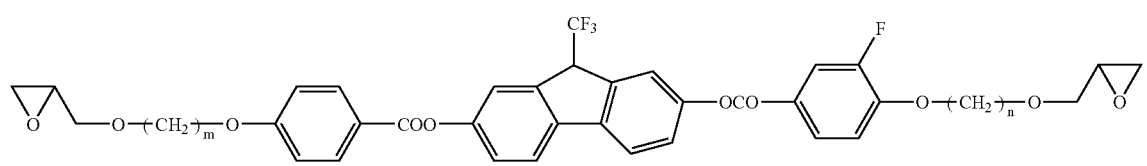
(1-3-27)

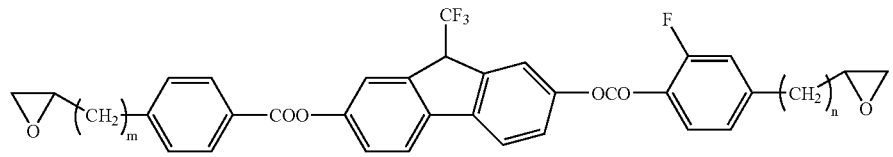
(1-3-28)
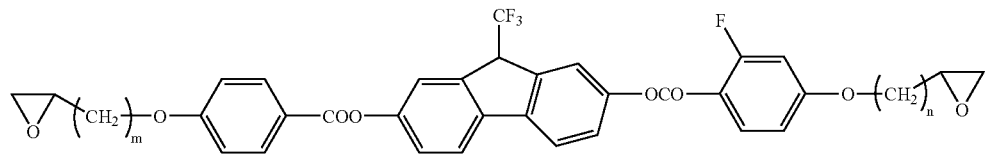
(1-3-29)
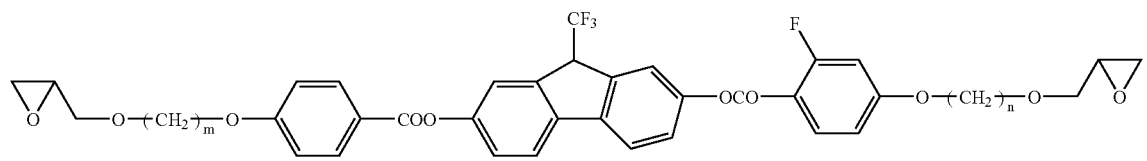
(1-3-30)
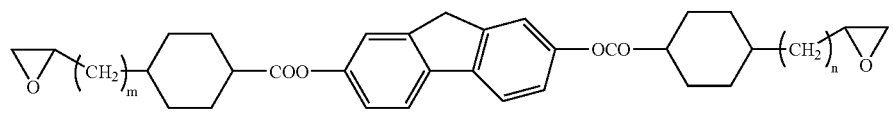
(1-3-31)
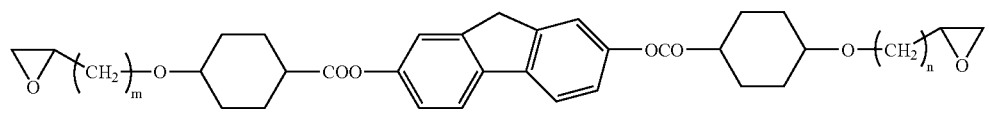
(1-3-32)
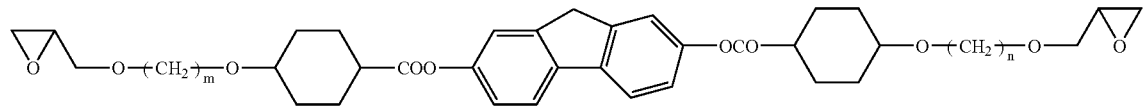
(1-3-33)
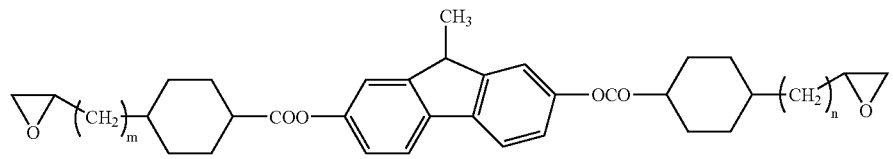
(1-3-34)
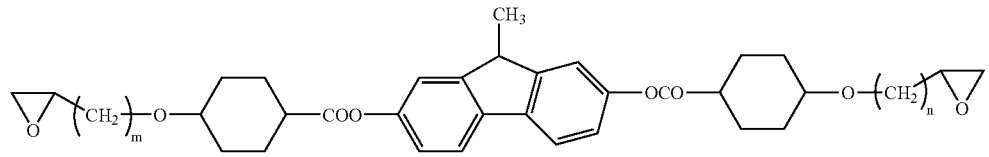
(1-3-35)
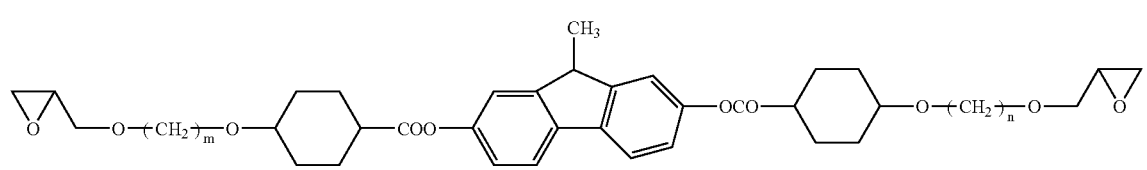
(1-3-36)
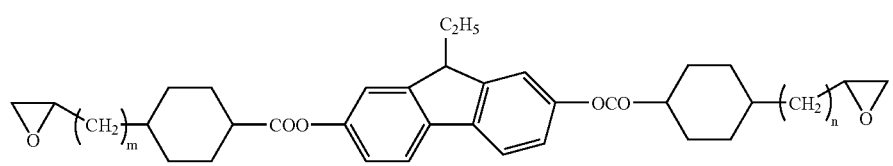
(1-3-37)

-continued
(1-3-38)
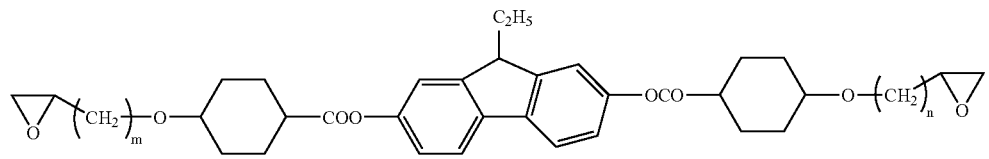
(1-3-39)
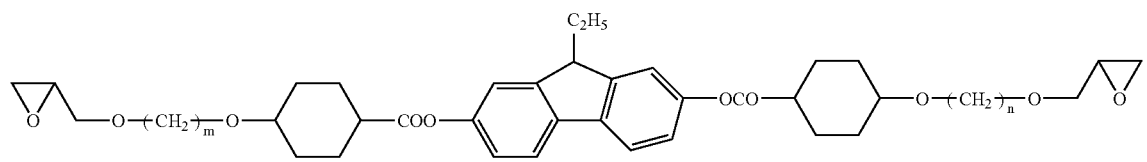
(1-3-40)
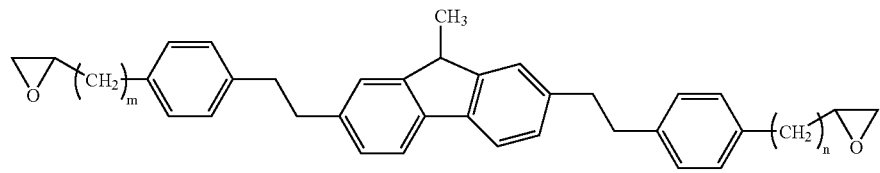
(1-3-41)
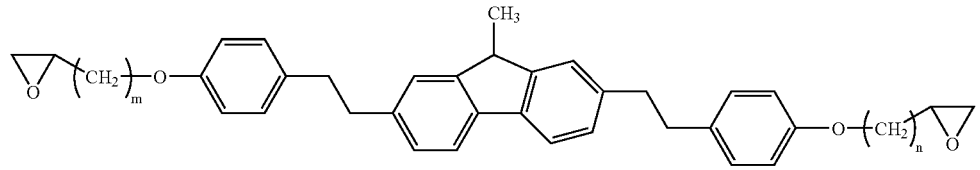
(1-3-42)
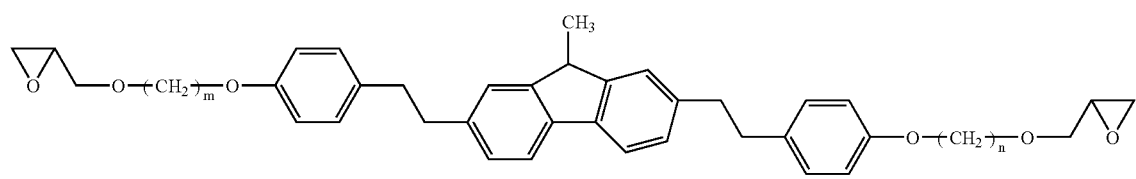
(1-3-43)
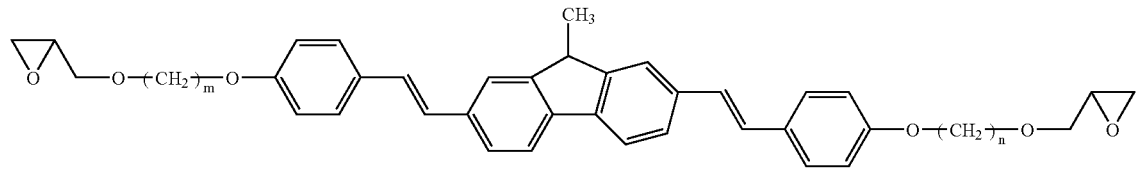
(1-3-44)
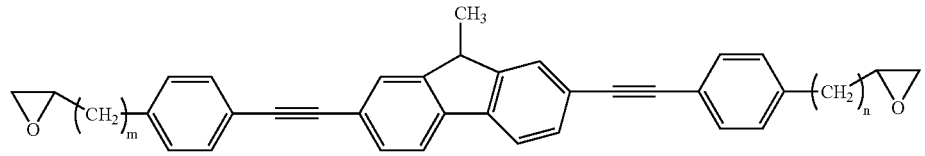
(1-3-45)
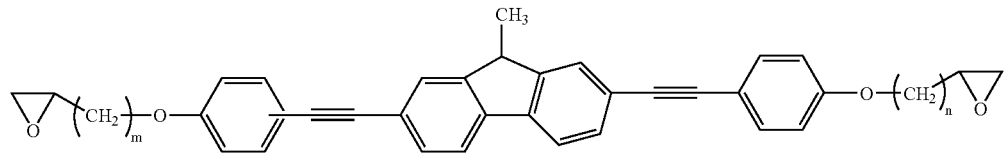
(1-3-46)
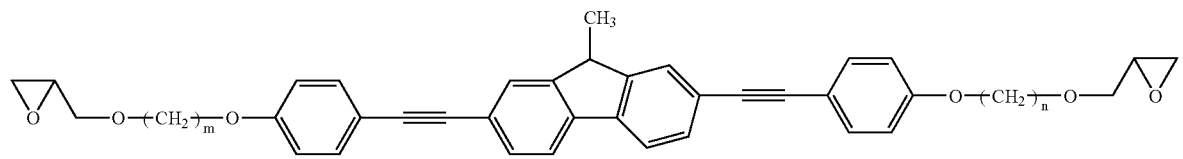

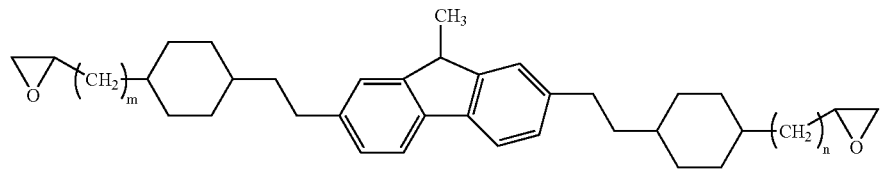
(1-3-47)
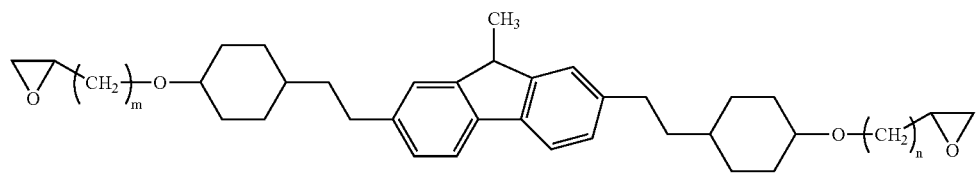
(1-3-48)
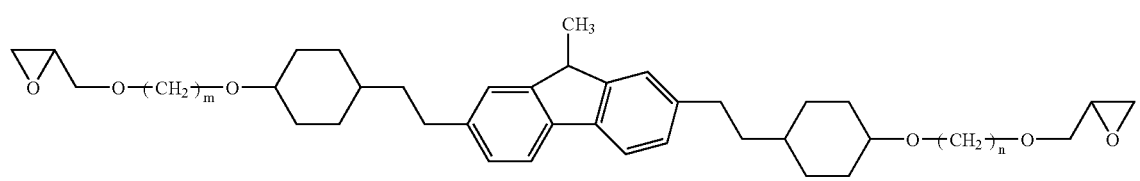
(1-3-49)
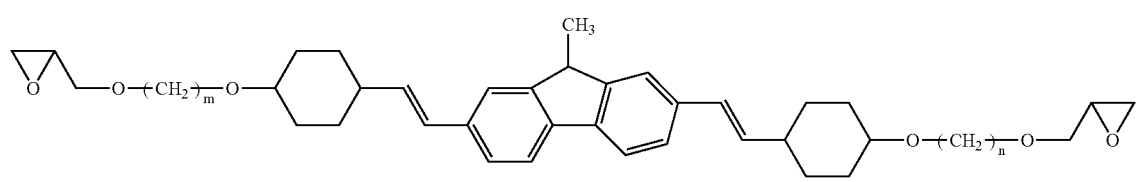
(1-3-50)
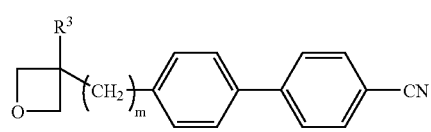
(2-1-1)
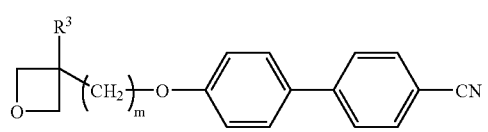
(2-1-2)
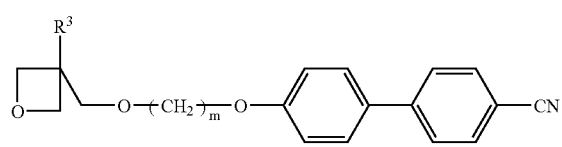
(2-1-3)
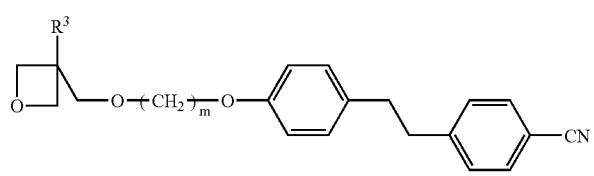
(2-1-4)
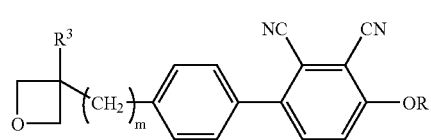
(2-1-5)
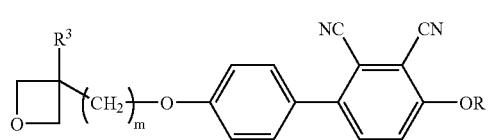
(2-1-6)
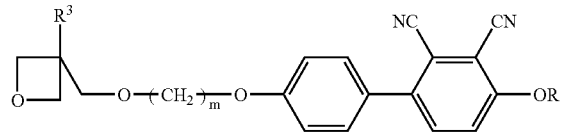
(2-1-7)
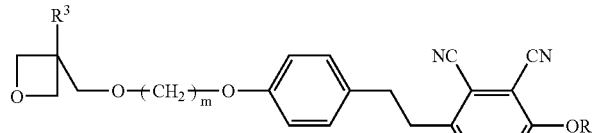
(2-1-8)
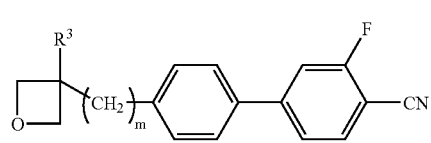
(2-1-9)
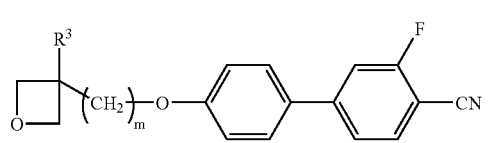
(2-1-10)

-continued
(2-1-11)
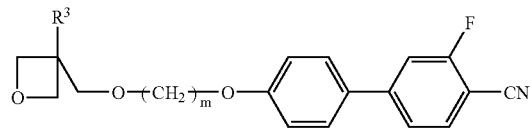
(2-1-12)
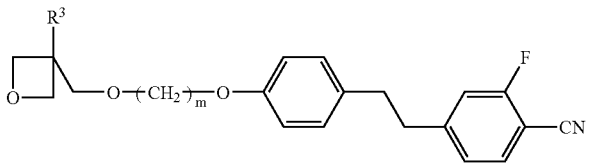
(2-1-13)
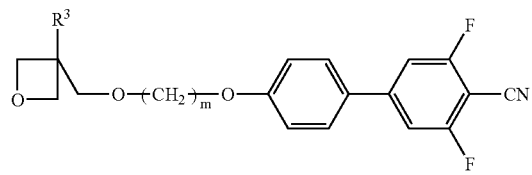
(2-1-14)
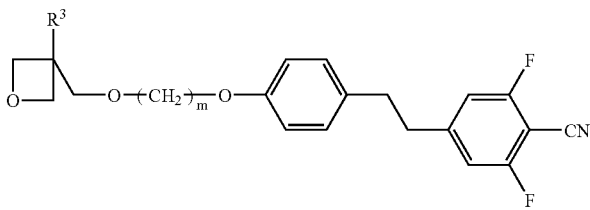
(2-1-15)
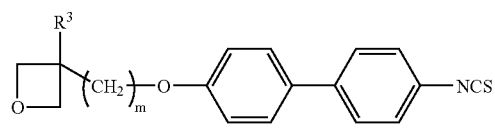
(2-1-16)
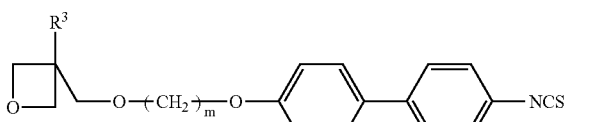
(2-1-17)
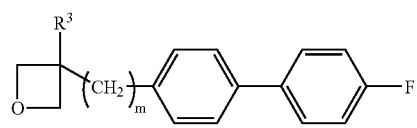
(2-1-18)
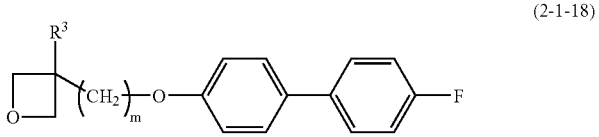
(2-1-19)
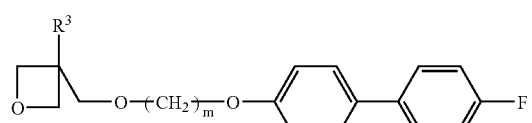
(2-1-20)
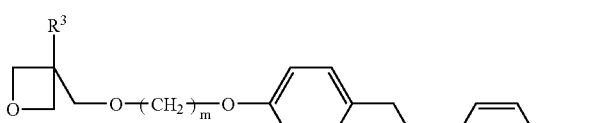
(2-1-21)
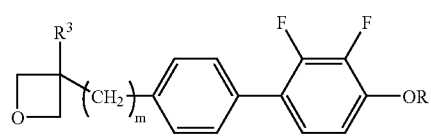
(2-1-22)
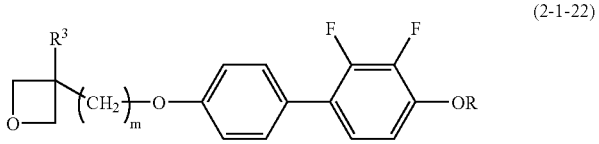
(2-1-23)
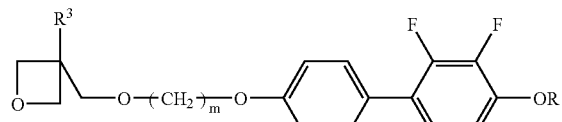
(2-1-24)
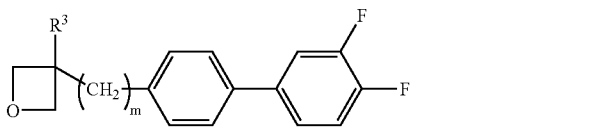
(2-1-25)
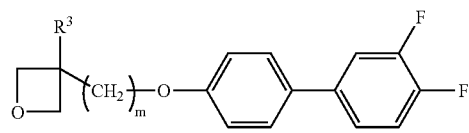
(2-1-26)
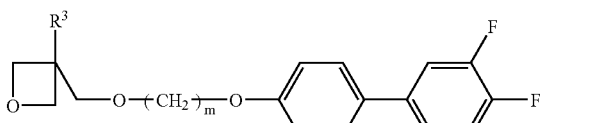
(2-1-27)
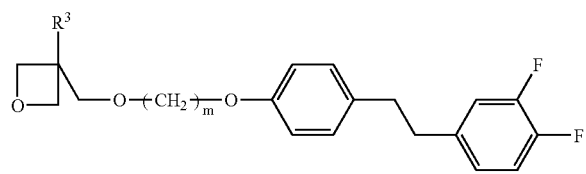
(2-1-28)
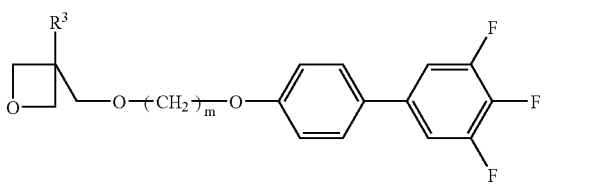

-continued
(2-1-29) 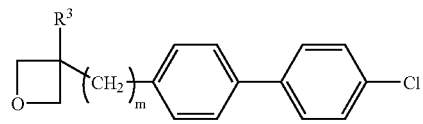
(2-1-30) 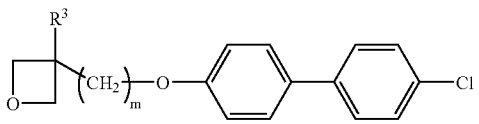
(2-1-31) 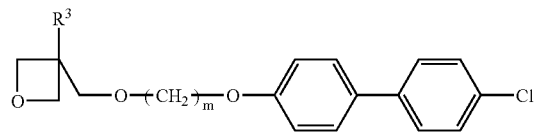
(2-1-32)
(2-1-33) 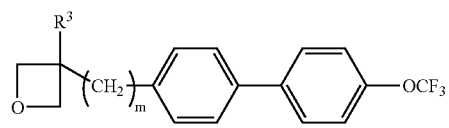
(2-1-34)
(2-1-35) 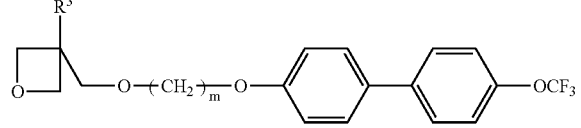
(2-1-36)
(2-1-37) 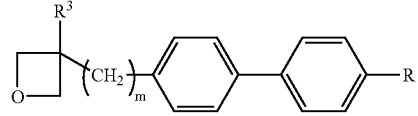
(2-1-38)
(2-1-39) 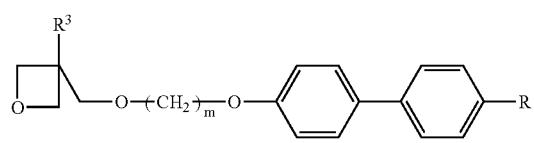
(2-1-40)
(2-1-41) 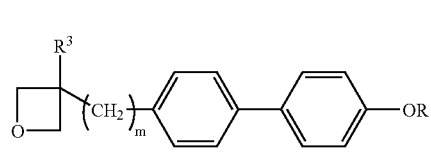
(2-1-42)
(2-1-43) 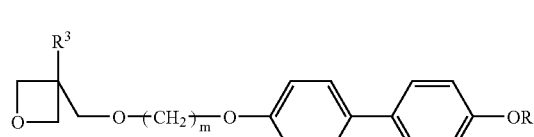
(2-1-44)
(2-1-45) 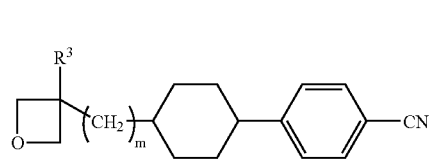
(2-1-46)
(2-1-47) 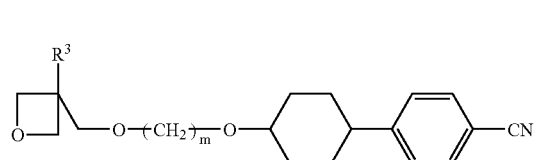
(2-1-48) 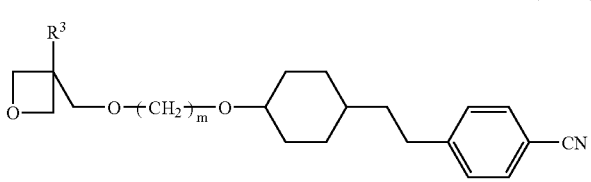

-continued
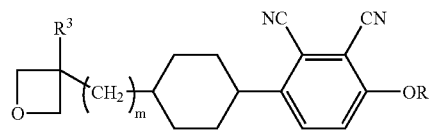
(2-1-49)
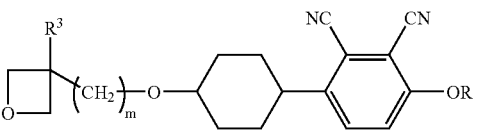
(2-1-50)
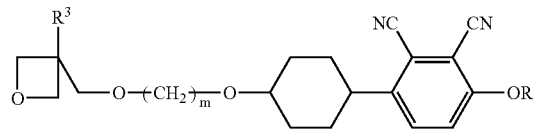
(2-1-51)
(2-1-52)
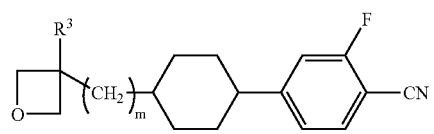
(2-1-53)
(2-1-54)
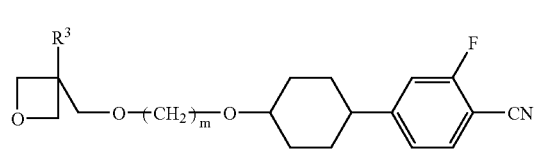
(2-1-55)
(2-1-56)
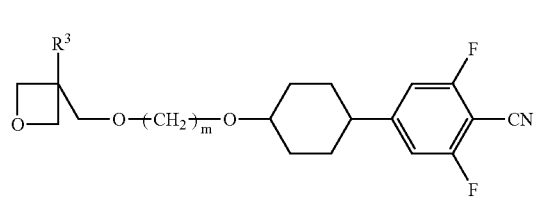
(2-1-57)
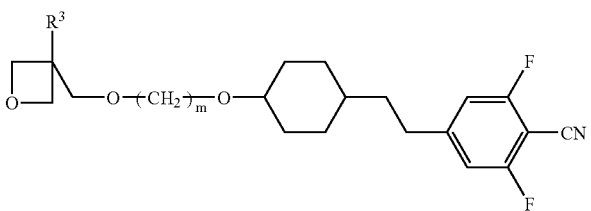
(2-1-58)
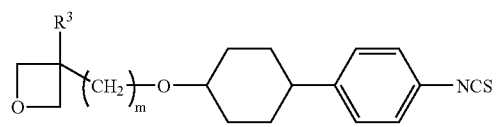
(2-1-59)
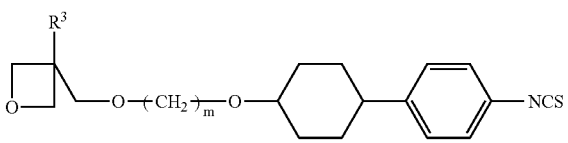
(2-1-60)
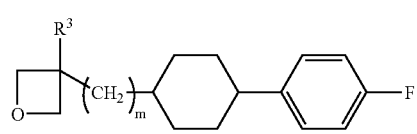
(2-1-61)
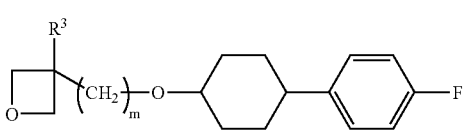
(2-1-62)
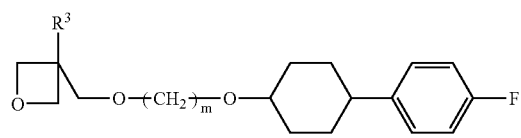
(2-1-63)
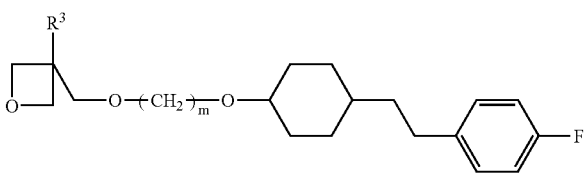
(2-1-64)
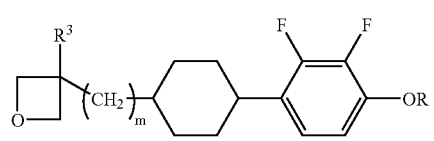
(2-1-65)
(2-1-66)

-continued
(2-1-67)
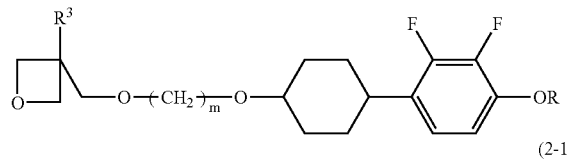
(2-1-68)
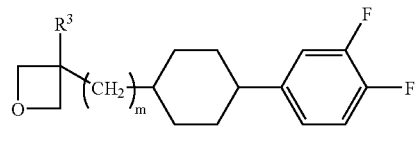
(2-1-69)
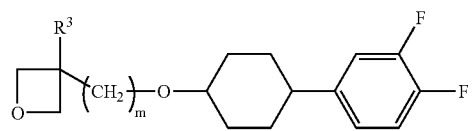
(2-1-70)
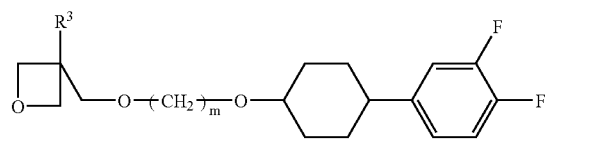
(2-1-71)
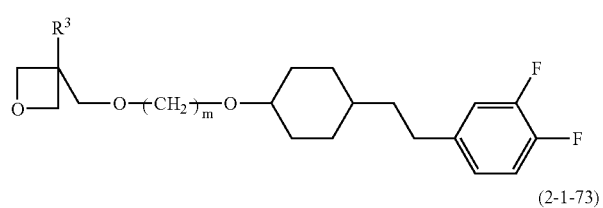
(2-1-72)
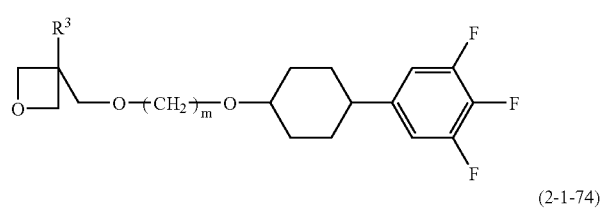
(2-1-73)
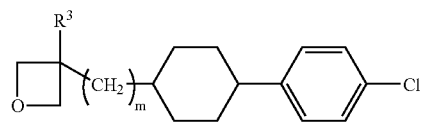
(2-1-74)
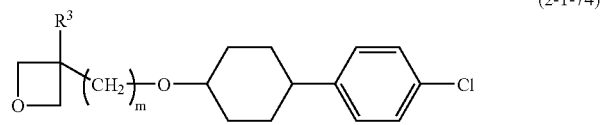
(2-1-75)
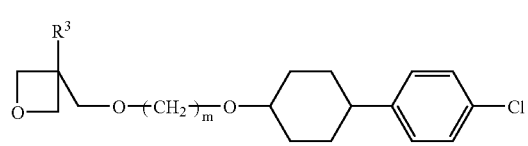
(2-1-76)
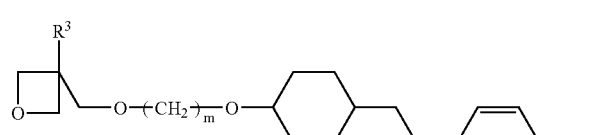
(2-1-77)
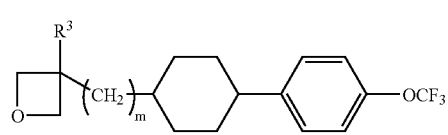
(2-1-78)
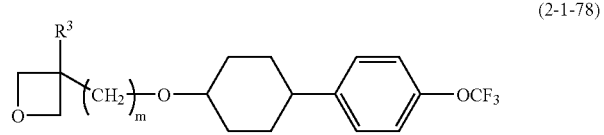
(2-1-79)
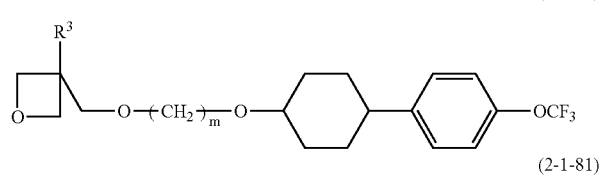
(2-1-80)
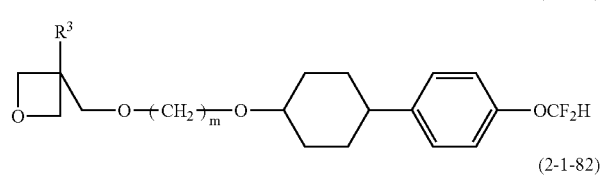
(2-1-81)
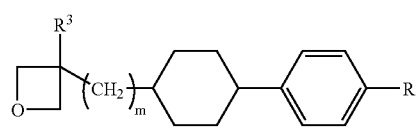
(2-1-82)
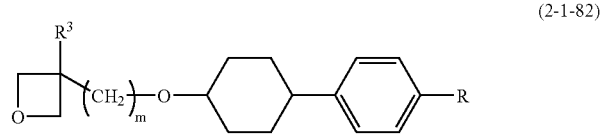
(2-1-83)
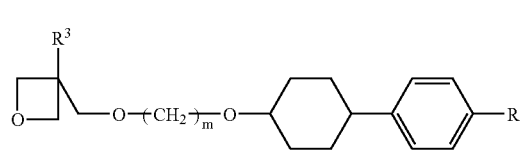
(2-1-84)
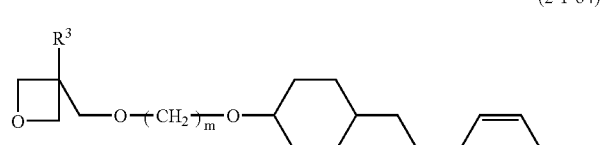
(2-1-85)
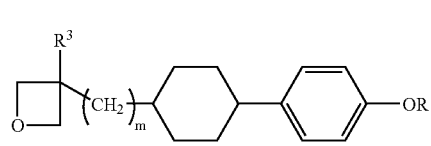
(2-1-86)
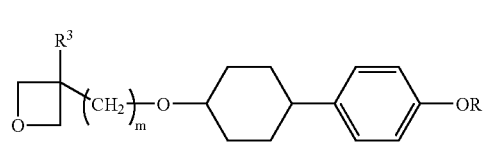

-continued
(2-1-87)
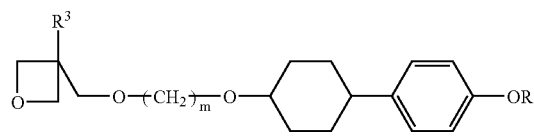
(2-1-88)
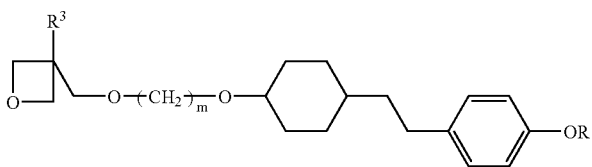
(2-1-89)
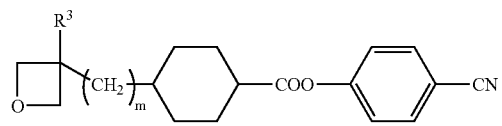
(2-1-90)
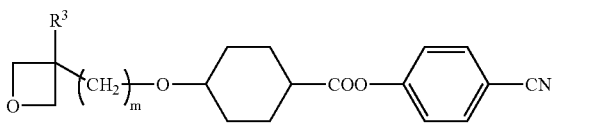
(2-1-91)
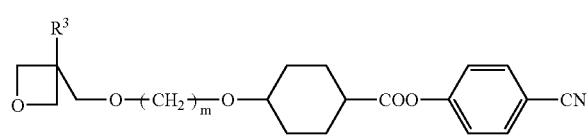
(2-1-92)
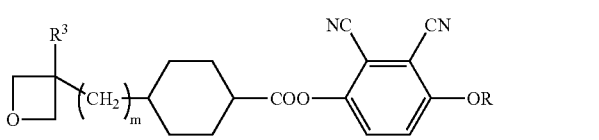
(2-1-93)
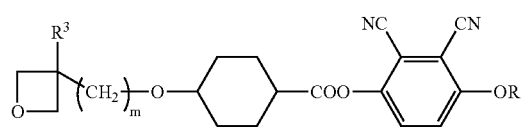
(2-1-94)
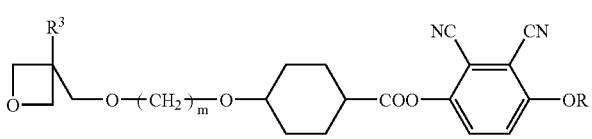
(2-1-95)
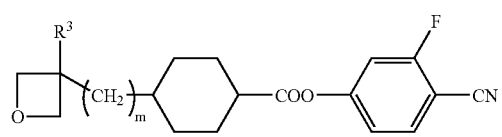
(2-1-96)
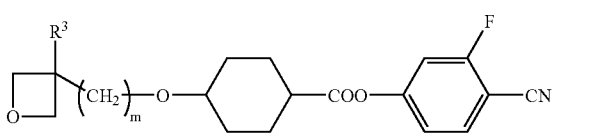
(2-1-97)
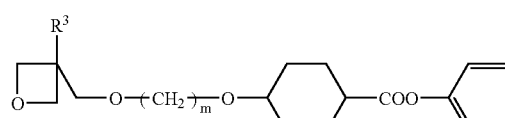
(2-1-98)
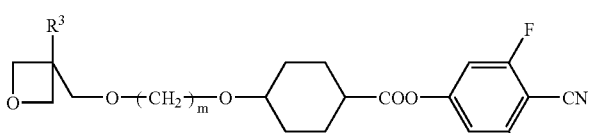
(2-1-99)
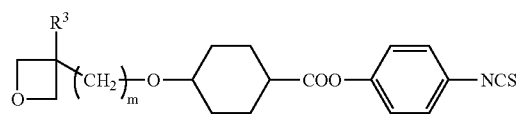
(2-1-100)
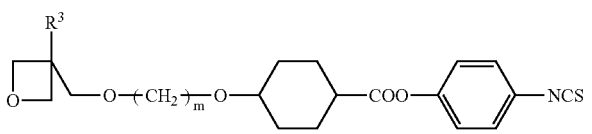
(2-1-101)
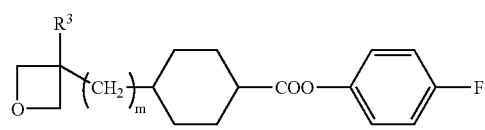
(2-1-102)
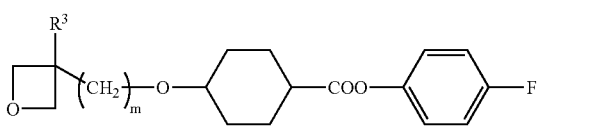
(2-1-103)
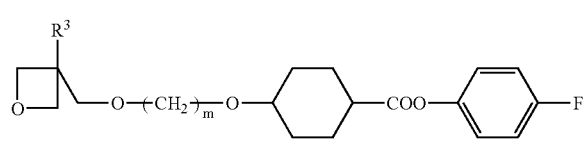
(2-1-104)
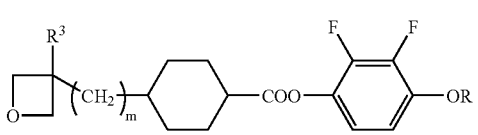

-continued
(2-1-105)
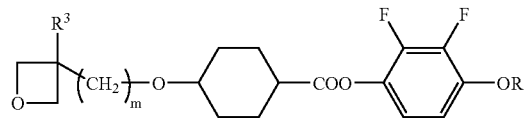
(2-1-106)
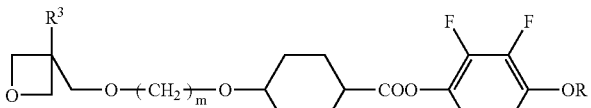
(2-1-107)
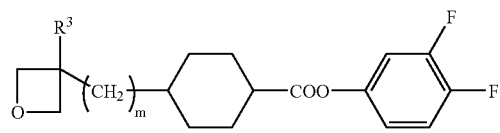
(2-1-108)
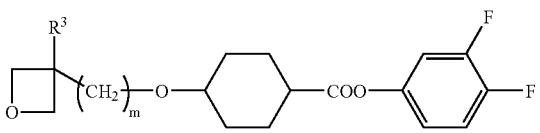
(2-1-109)
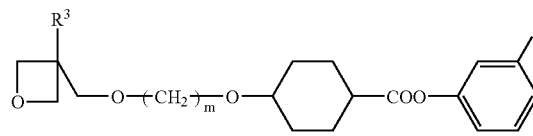
(2-1-110)
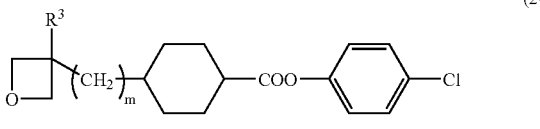
(2-1-111)
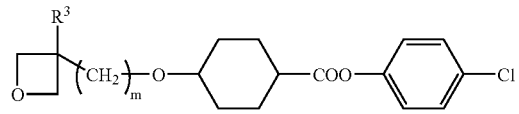
(2-1-112)
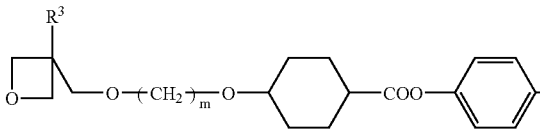
(2-1-113)
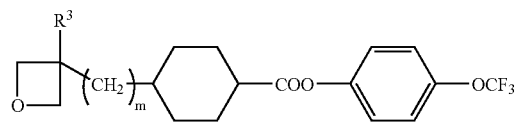
(2-1-114)
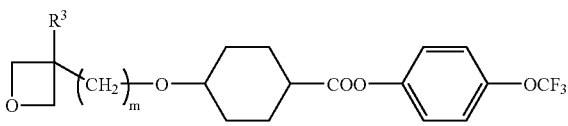
(2-1-115)
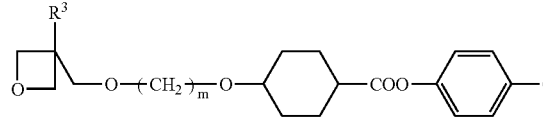
(2-1-116)
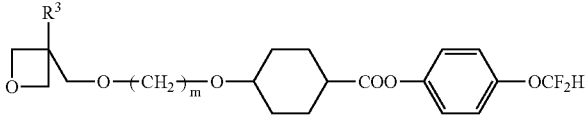
(2-1-117)
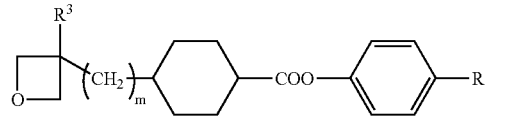
(2-1-118)
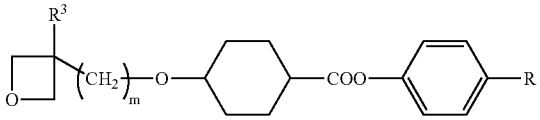
(2-1-119)
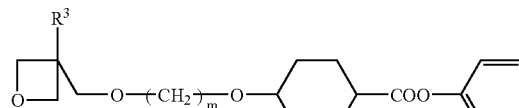
(2-1-120)
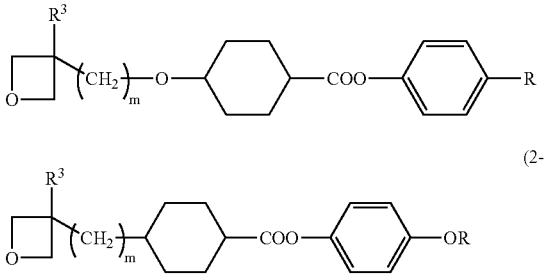
(2-1-121)
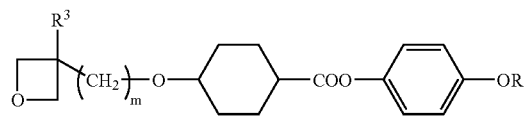
(2-1-122)
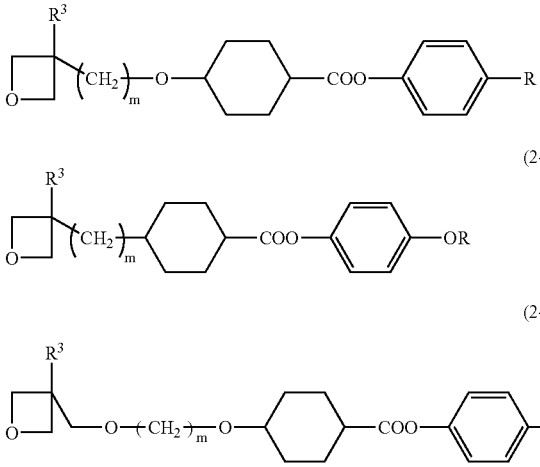
(2-1-123)
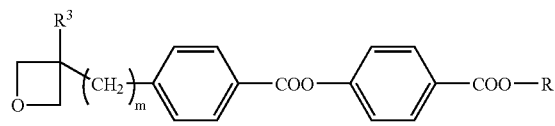
(2-1-124)
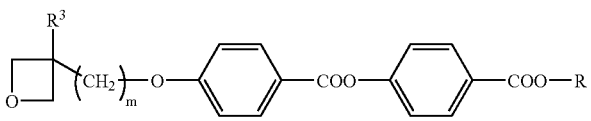

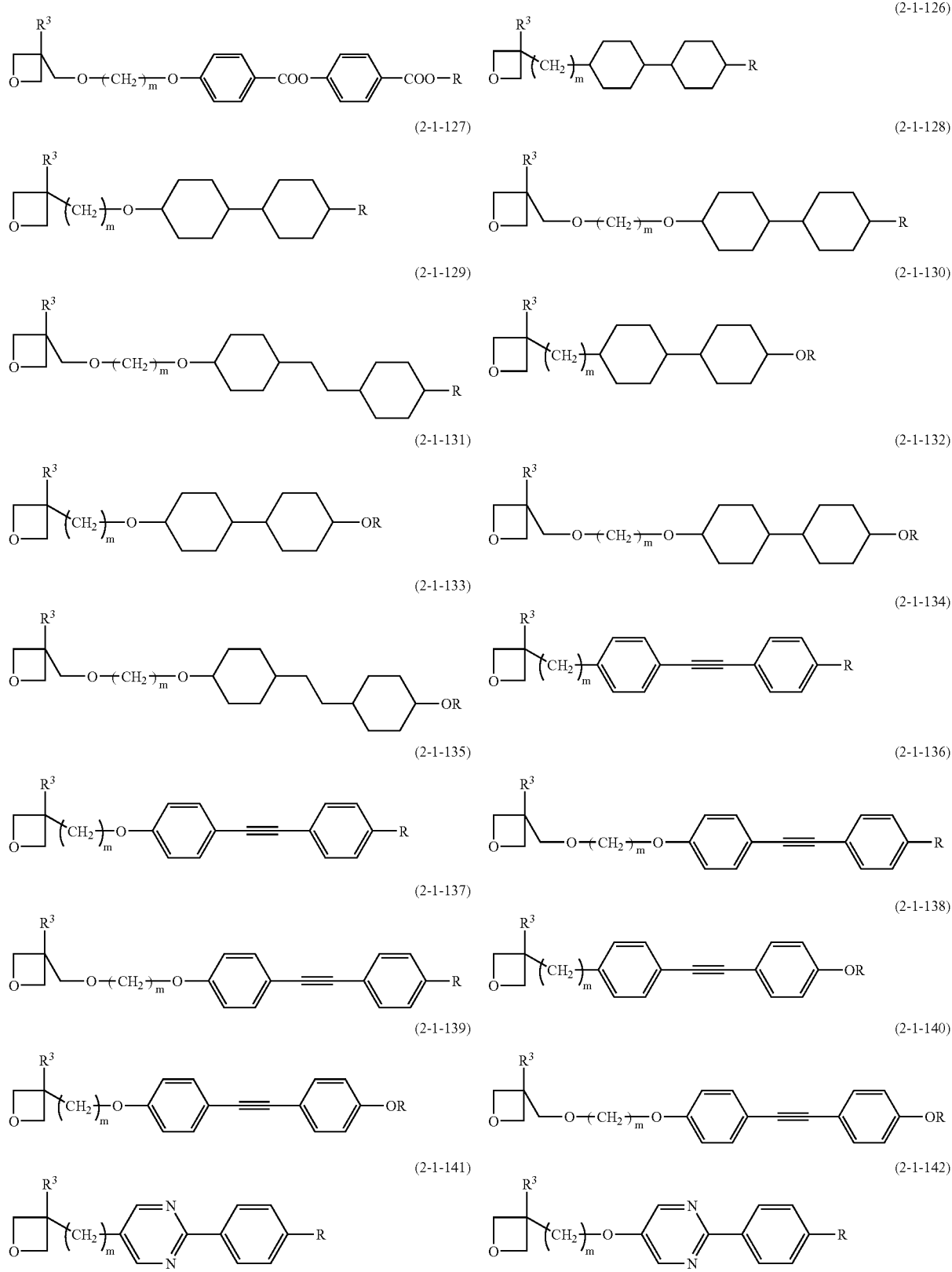

-continued
(2-1-143)
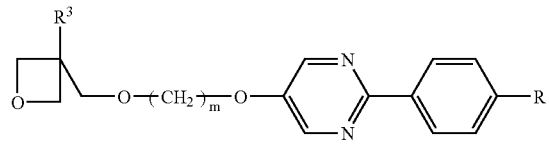
(2-1-144)
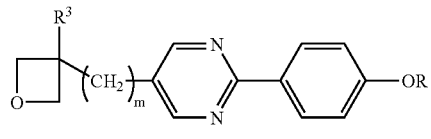
(2-1-145)
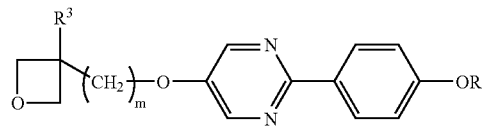
(2-1-146)
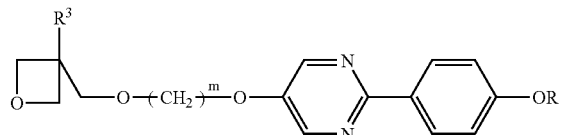
(2-1-147)
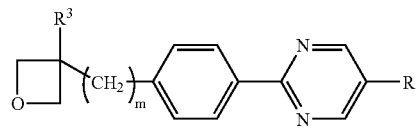
(2-1-148)
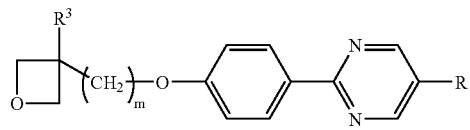
(2-1-149)
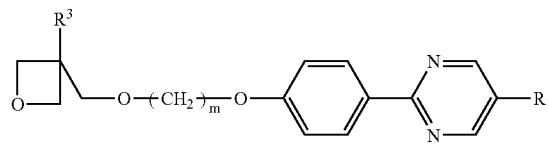
(2-1-150)
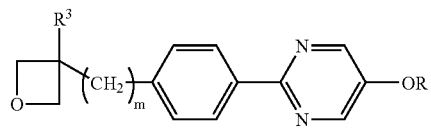
(2-1-151)
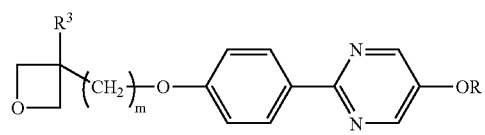
(2-1-152)
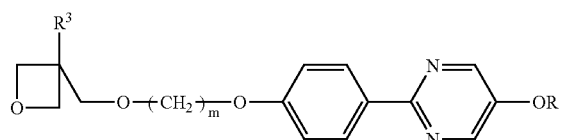
(2-1-153)
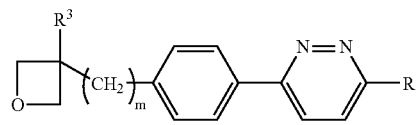
(2-1-154)
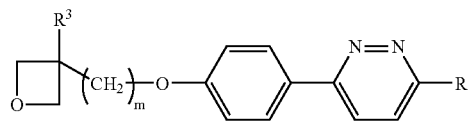
(2-1-155)
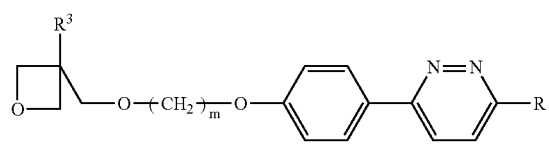
(2-1-156)
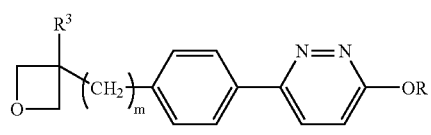
(2-1-157)
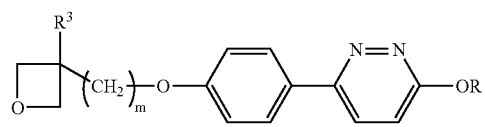
(2-1-158)
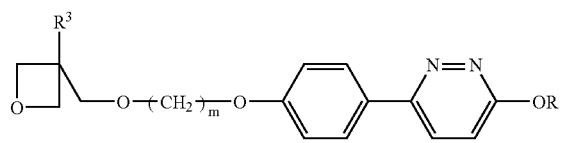
(2-1-159)
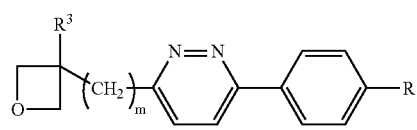
(2-1-160)
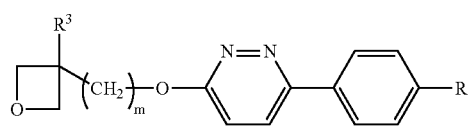
(2-1-161)
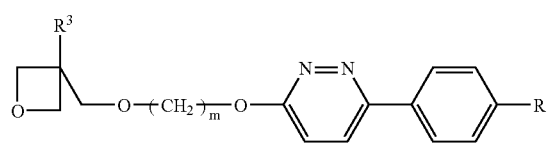
(2-1-162)

-continued
(2-1-163)
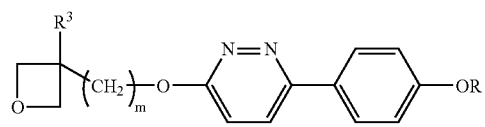
(2-1-164)
(2-1-165)
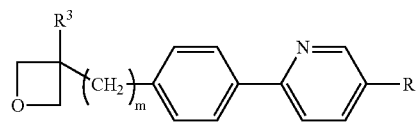
(2-1-166)
(2-1-167)
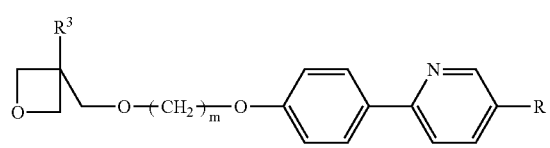
(2-1-168)
(2-1-169)
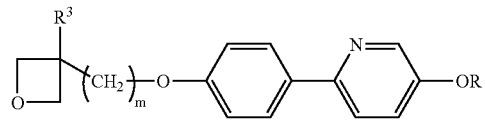
(2-1-170)
(2-1-171)
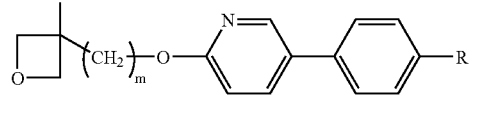
(2-1-172)
(2-1-173)
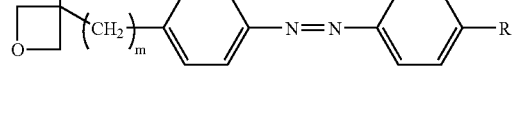
(2-1-174)
(2-1-175)
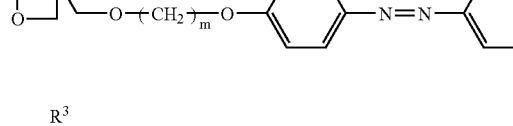
(2-1-176)
(2-1-177)
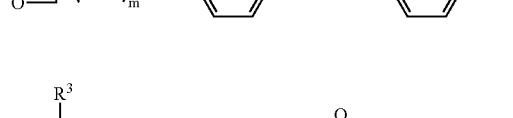
(2-1-178)
(2-1-179)
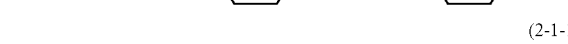
(2-1-180)
(2-1-181)
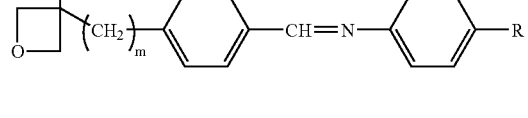
(2-1-182)

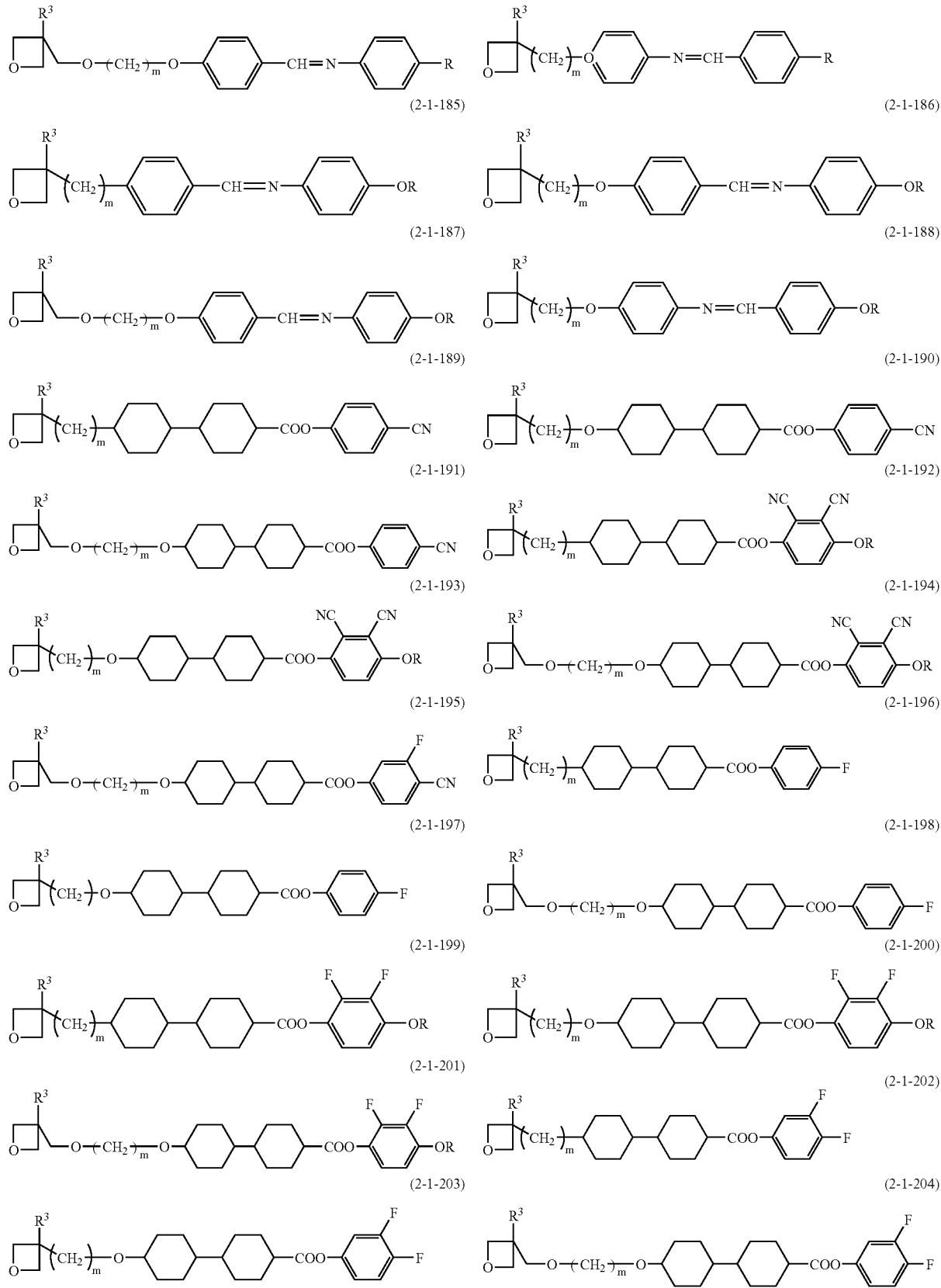

-continued
(2-1-205)
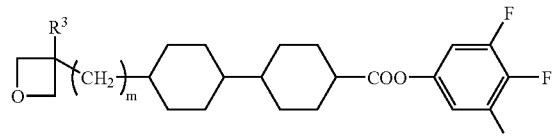
(2-1-206)
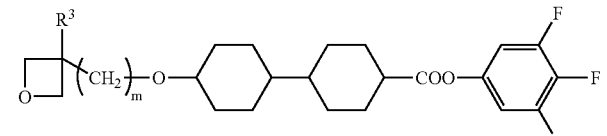
(2-1-207)
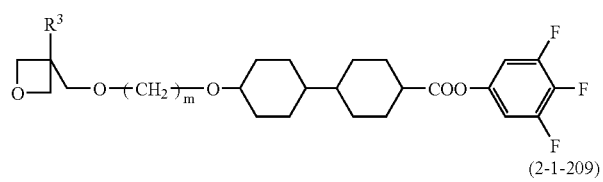
(2-1-208)
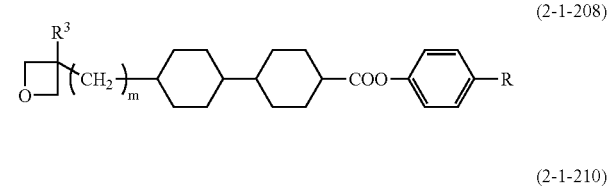
(2-1-209)
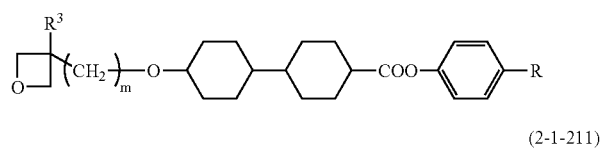
(2-1-210)
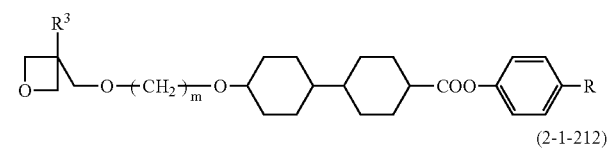
(2-1-211)
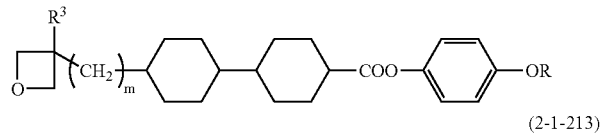
(2-1-212)
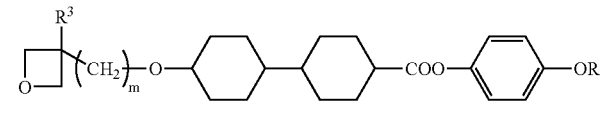
(2-1-213)
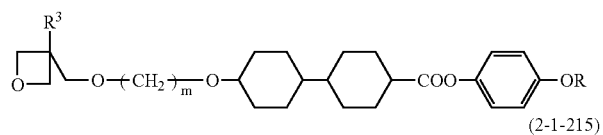
(2-1-214)
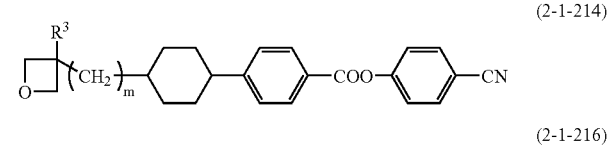
(2-1-215)
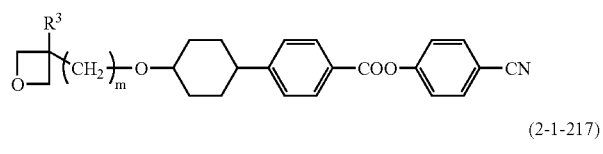
(2-1-216)
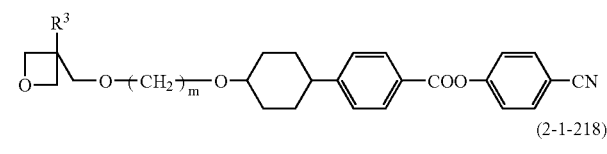
(2-1-217)
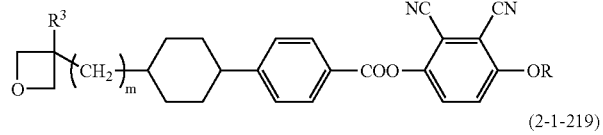
(2-1-218)
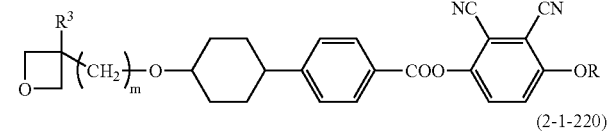
(2-1-219)
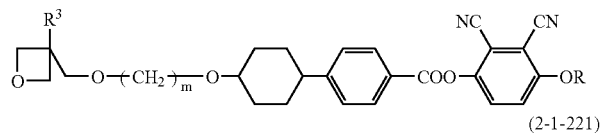
(2-1-220)
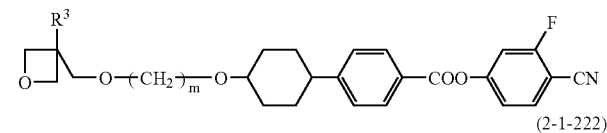
(2-1-221)
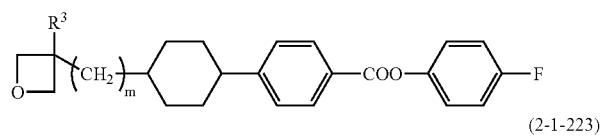
(2-1-222)
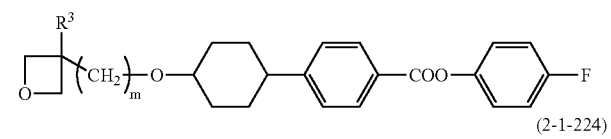
(2-1-223)
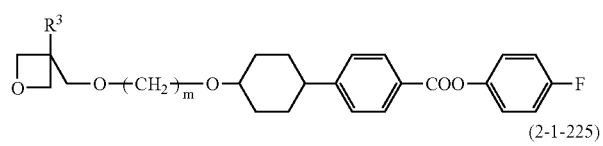
(2-1-224)
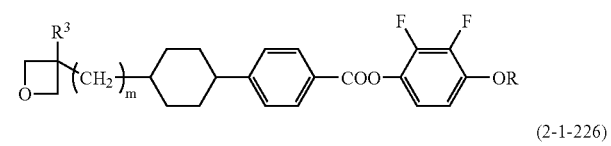
(2-1-225)
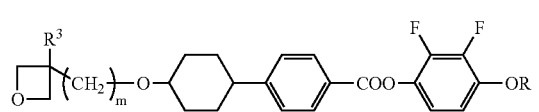
(2-1-226)
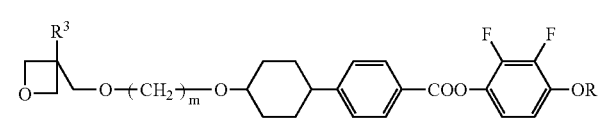

-continued
(2-1-227)
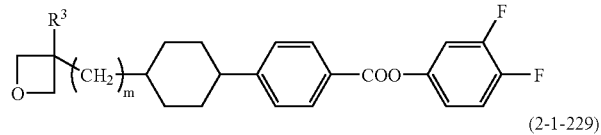
(2-1-228)
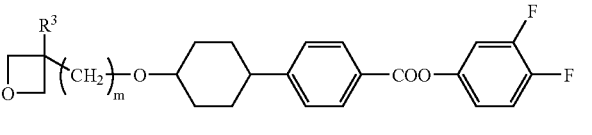
(2-1-229)
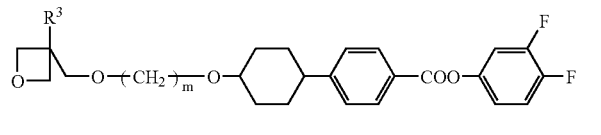
(2-1-230)
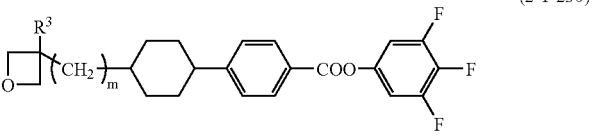
(2-1-231)
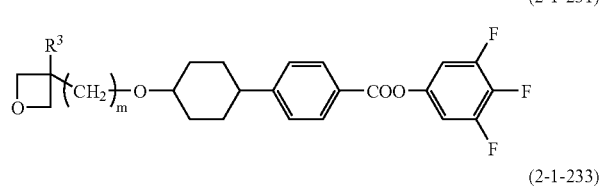
(2-1-232)
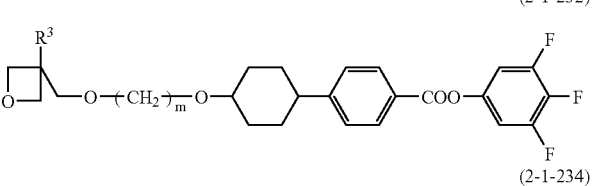
(2-1-233)
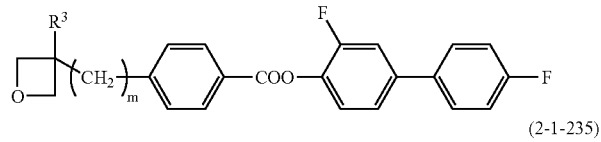
(2-1-234)
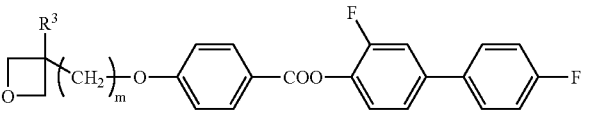
(2-1-235)
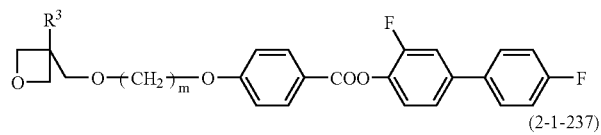
(2-1-236)
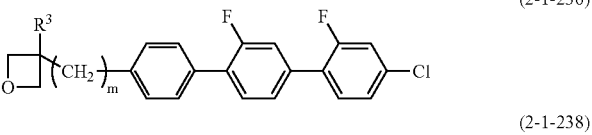
(2-1-237)
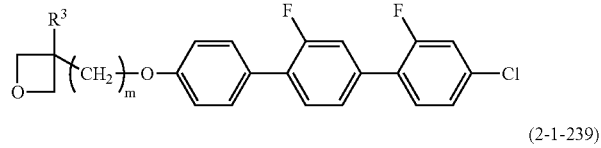
(2-1-238)
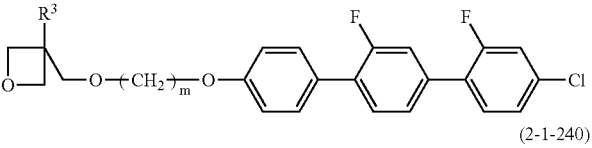
(2-1-239)
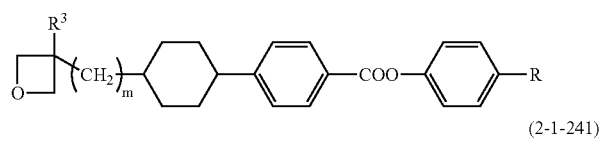
(2-1-240)
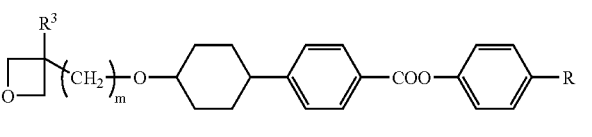
(2-1-241)
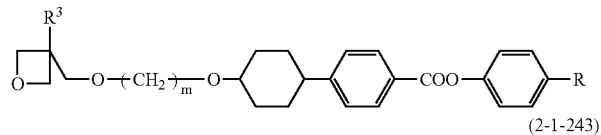
(2-1-242)
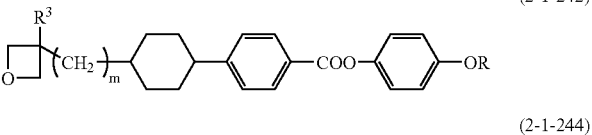
(2-1-243)
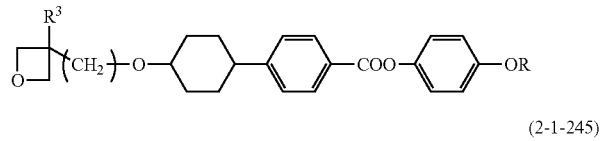
(2-1-244)
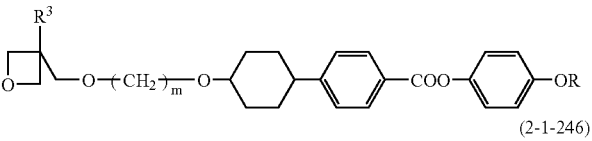
(2-1-245)
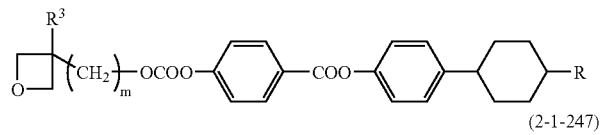
(2-1-246)
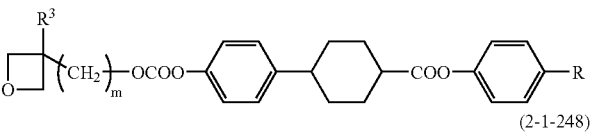
(2-1-247)
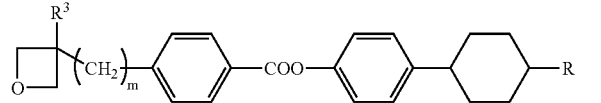
(2-1-248)
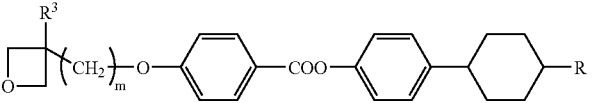

-continued
(2-1-249)
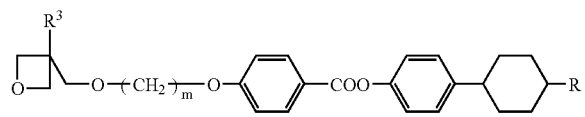
(2-1-250)
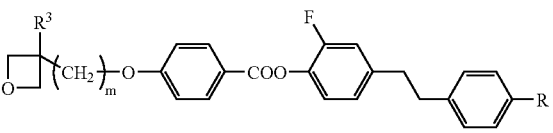
(2-1-251)
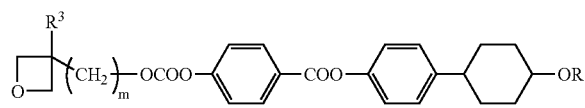
(2-1-252)
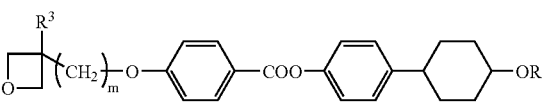
(2-1-253)
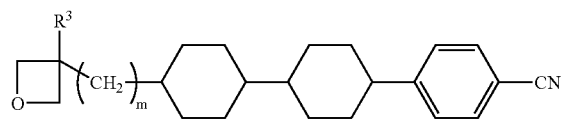
(2-1-254)
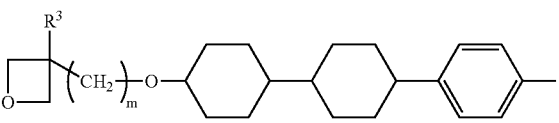
(2-1-255)
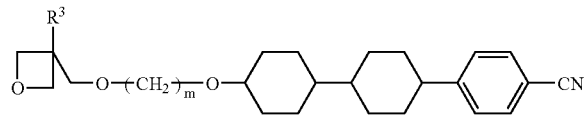
(2-1-256)
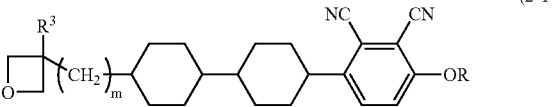
(2-1-257)
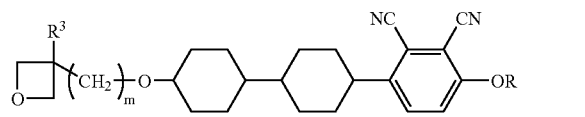
(2-1-258)
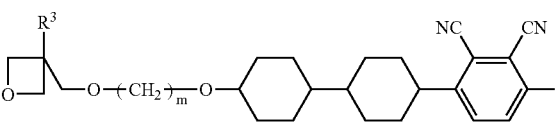
(2-1-259)
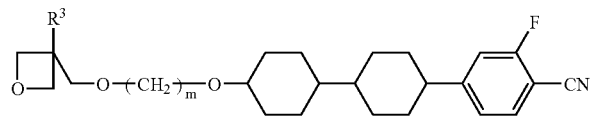
(2-1-260)
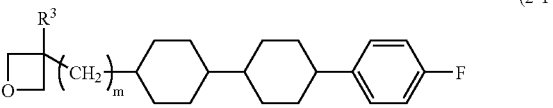
(2-1-261)
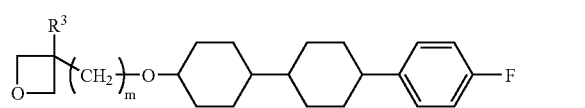
(2-1-262)
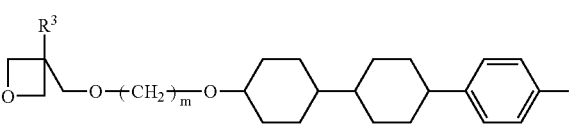
(2-1-263)
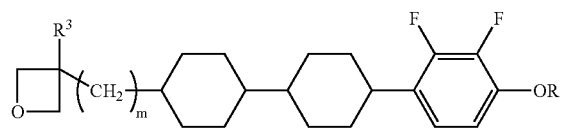
(2-1-264)
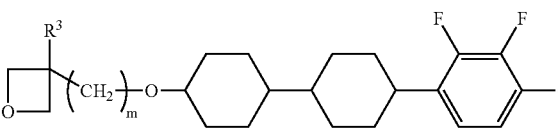
(2-1-265)
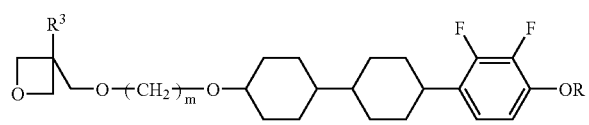
(2-1-266)
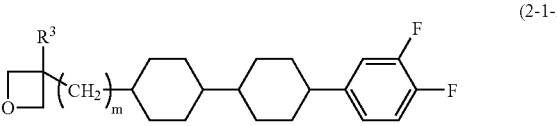
(2-1-267)
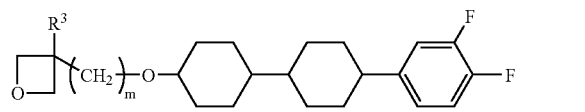
(2-1-268)
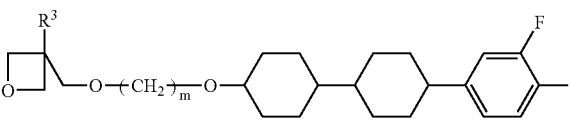

-continued
(2-1-269)
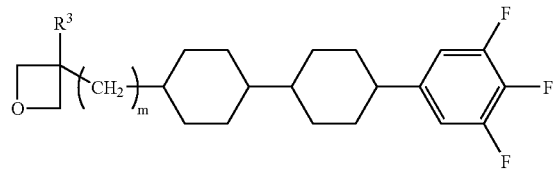
(2-1-270)
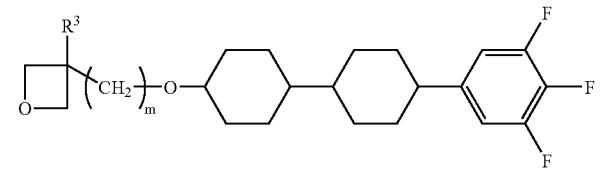
(2-1-271)
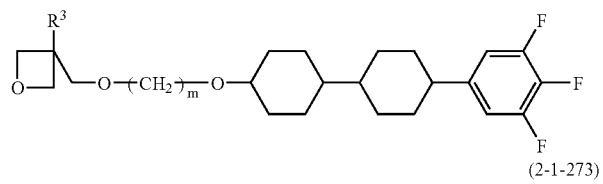
(2-1-272)
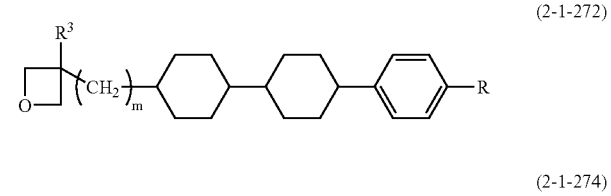
(2-1-273)
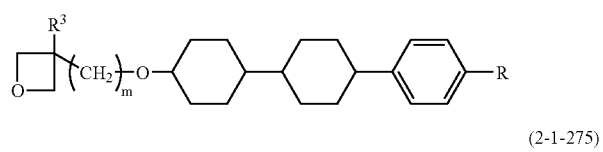
(2-1-274)
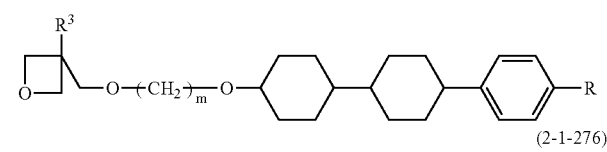
(2-1-275)
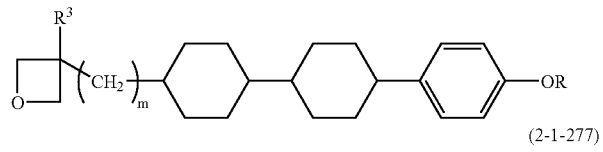
(2-1-276)
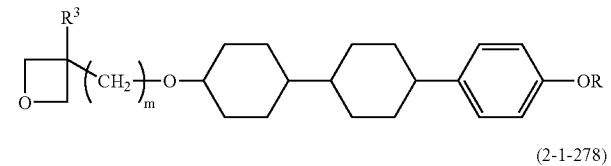
(2-1-277)
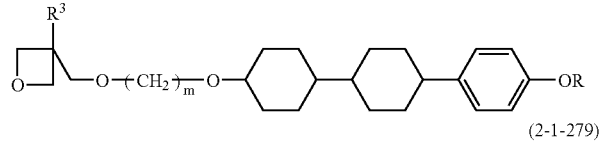
(2-1-278)
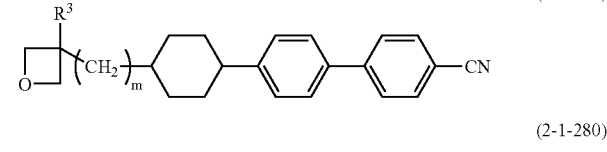
(2-1-279)
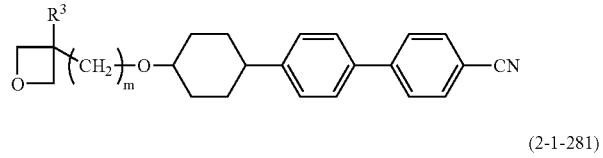
(2-1-280)
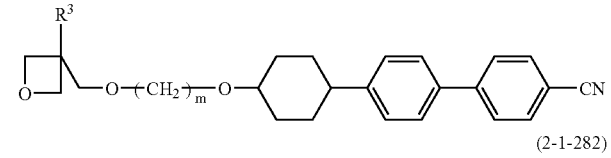
(2-1-281)
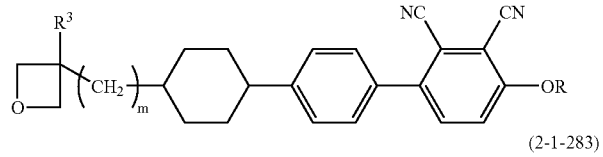
(2-1-282)
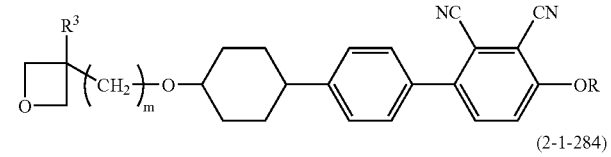
(2-1-283)
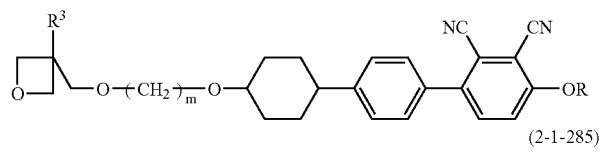
(2-1-284)
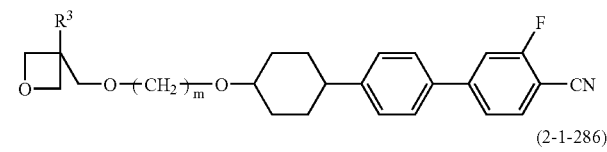
(2-1-285)
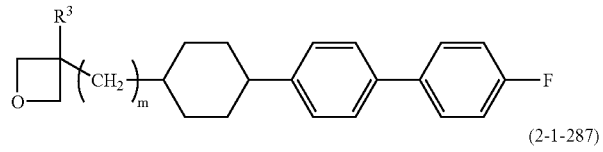
(2-1-286)
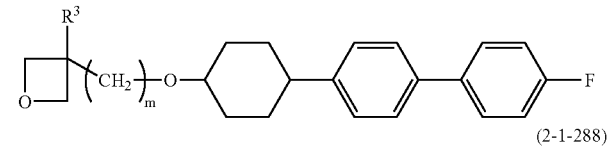
(2-1-287)
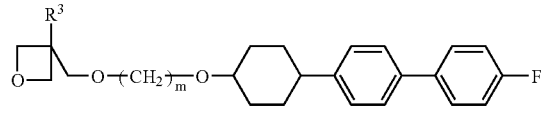
(2-1-288)
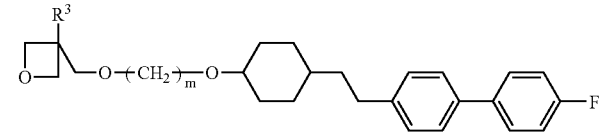

-continued
(2-1-289)
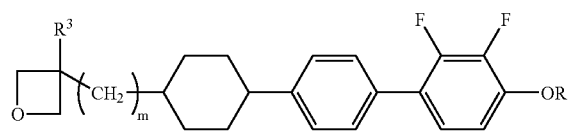
(2-1-290)
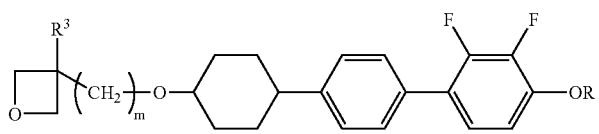
(2-1-291)
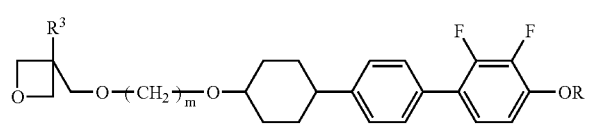
(2-1-292)
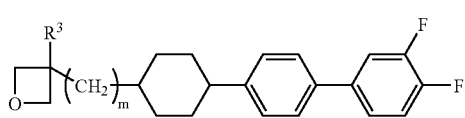
(2-1-293)
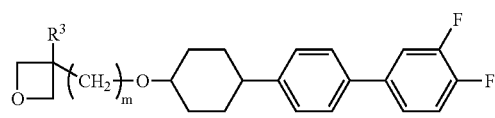
(2-1-294)
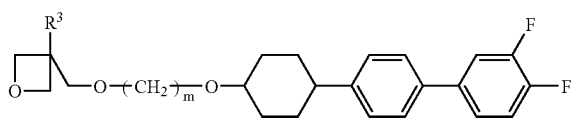
(2-1-295)
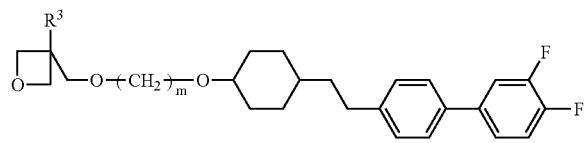
(2-1-296)
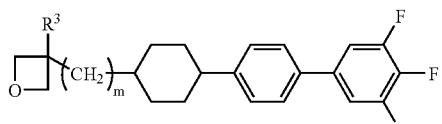
(2-1-297)
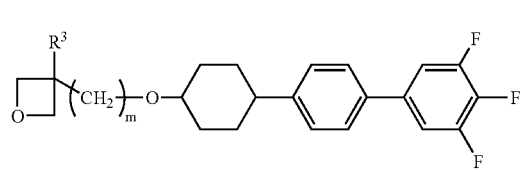
(2-1-298)
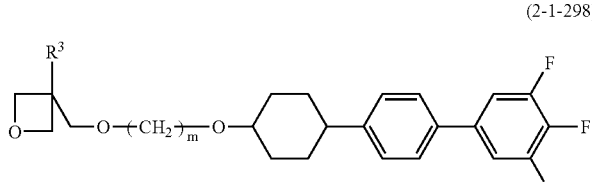
(2-1-299)
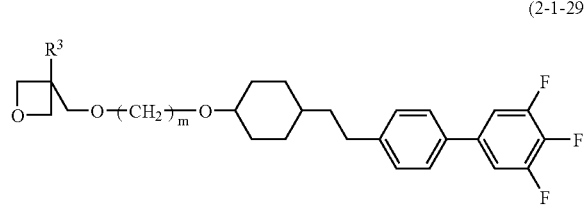
(2-1-300)
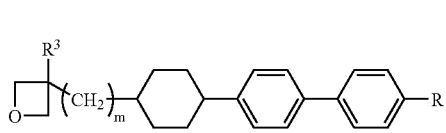
(2-1-301)
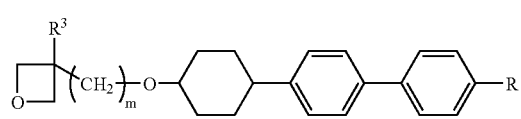
(2-1-302)
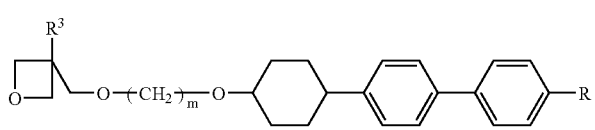
(2-1-303)
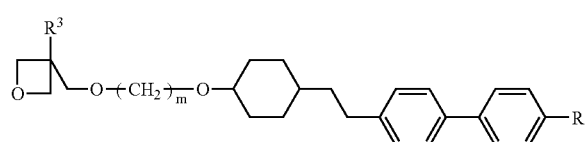
(2-1-304)
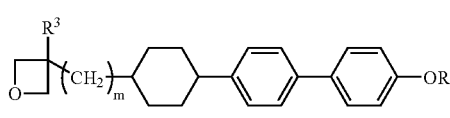
(2-1-305)
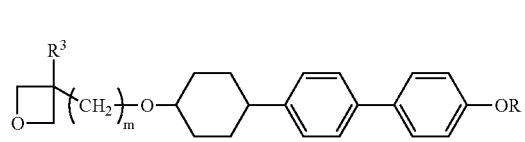
(2-1-306)
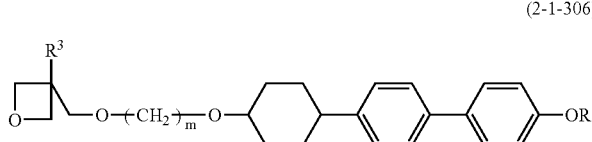

-continued
(2-1-307)
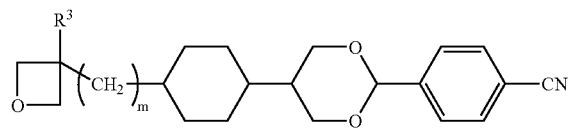
(2-1-308)
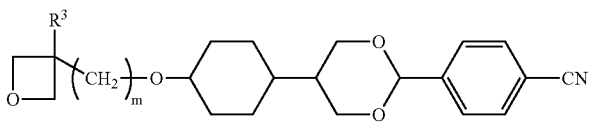
(2-1-309)
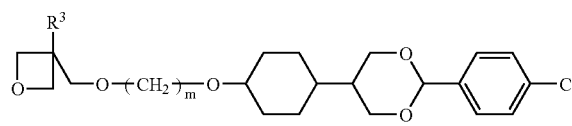
(2-1-310)
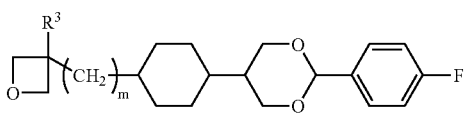
(2-1-311)
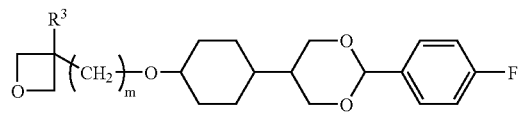
(2-1-312)
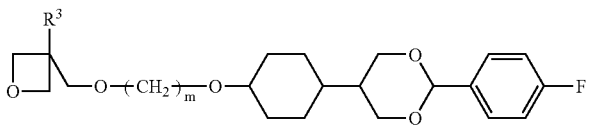
(2-1-313)
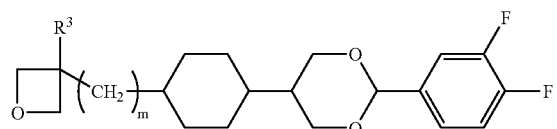
(2-1-314)
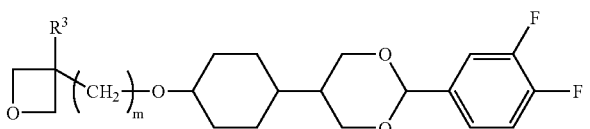
(2-1-315)
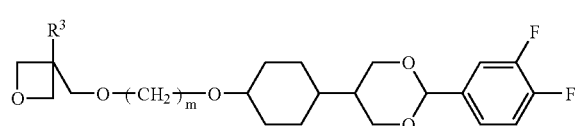
(2-1-316)
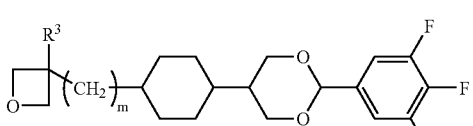
(2-1-317)
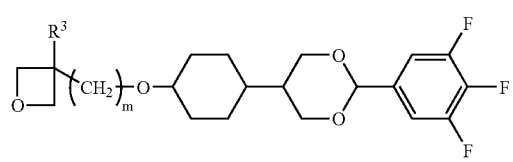
(2-1-318)
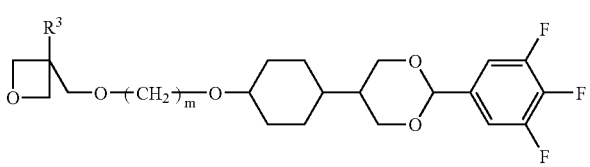
(2-1-319)
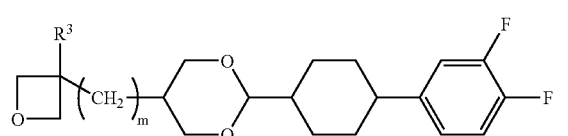
(2-1-320)
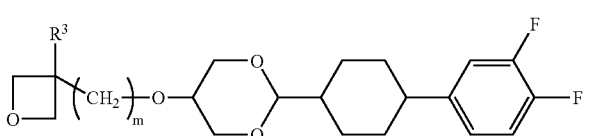
(2-1-321)
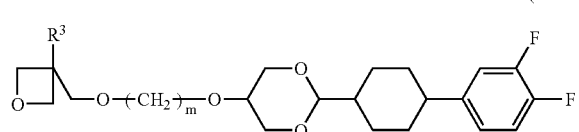
(2-1-322)
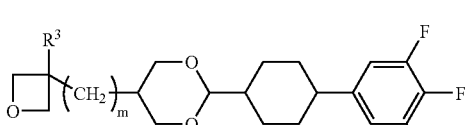
(2-1-323)
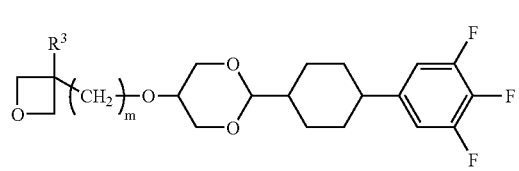
(2-1-324)
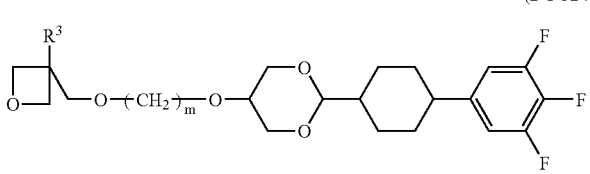

-continued
(2-1-325)
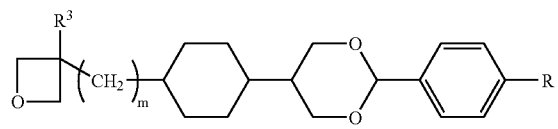
(2-1-326)
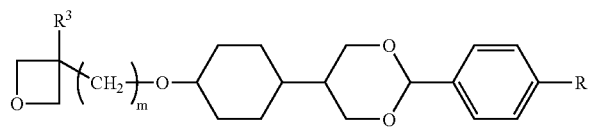
(2-1-327)
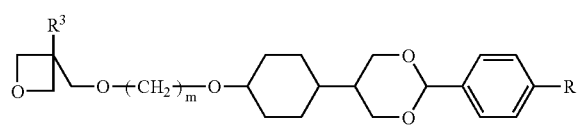
(2-1-328)
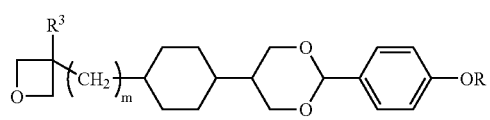
(2-1-329)
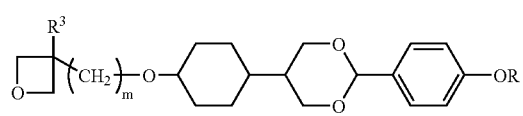
(2-1-330)
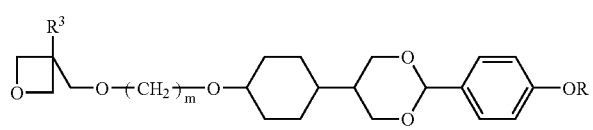
(2-1-331)
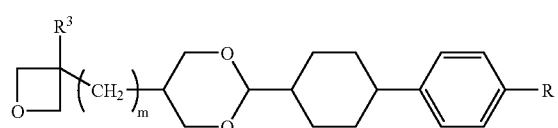
(2-1-332)
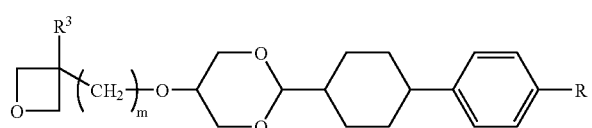
(2-1-333)
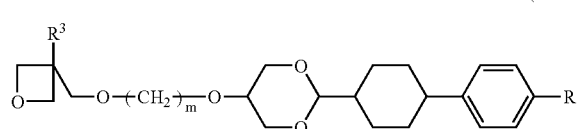
(2-1-334)
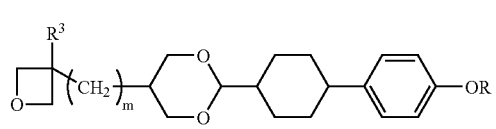
(2-1-335)
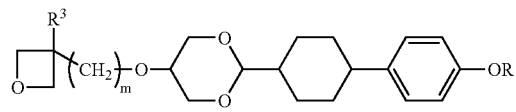
(2-1-336)
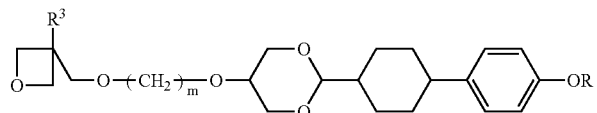
(2-1-337)
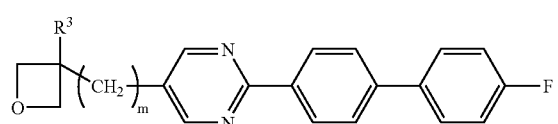
(2-1-338)
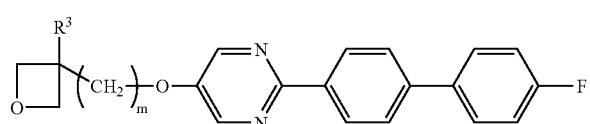
(2-1-339)
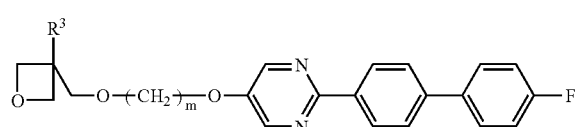
(2-1-340)
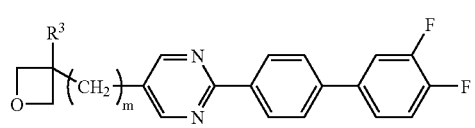
(2-1-341)
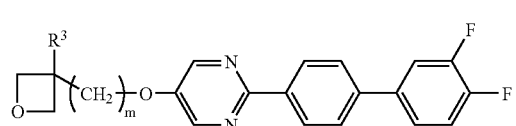
(2-1-342)
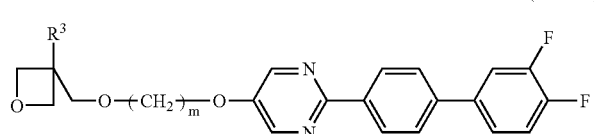
(2-1-343)
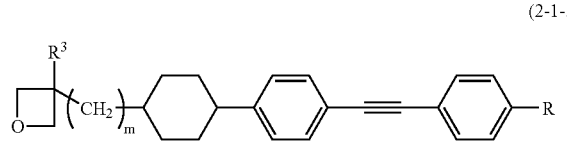
(2-1-344)
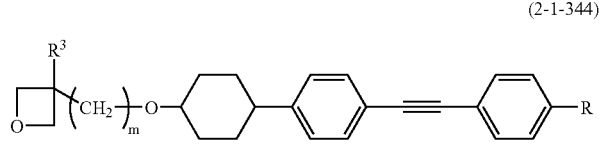

-continued
(2-1-345) (2-1-346)
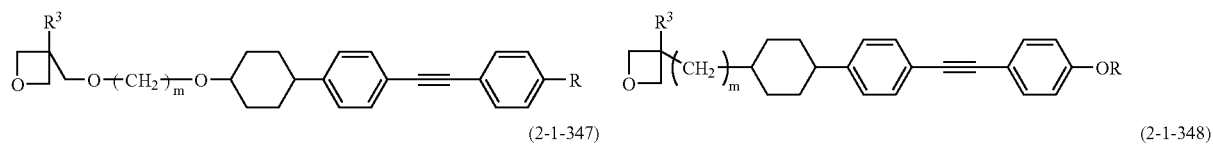
(2-1-347) (2-1-348)
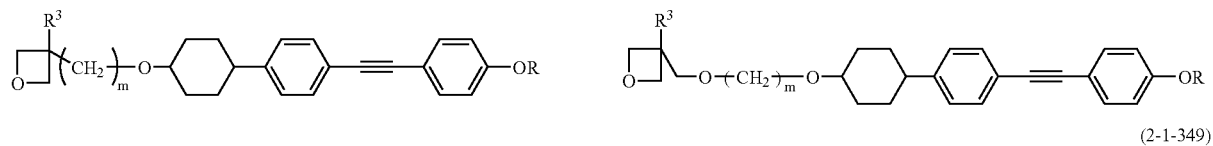
(2-1-349)
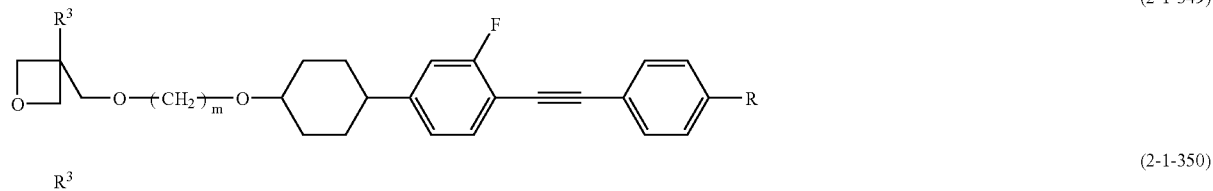
(2-1-350)
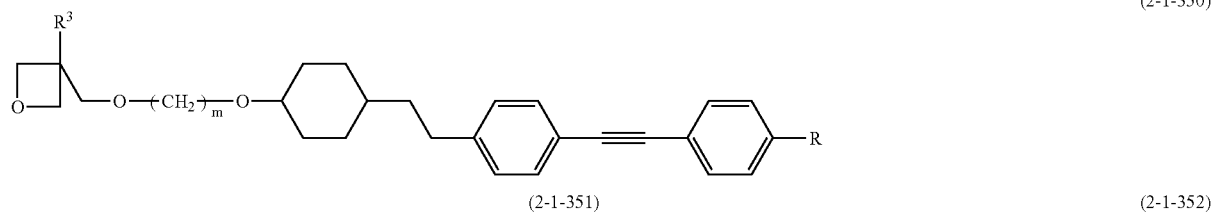
(2-1-351) (2-1-352)
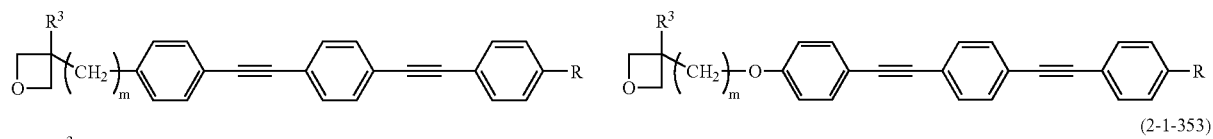
(2-1-353)
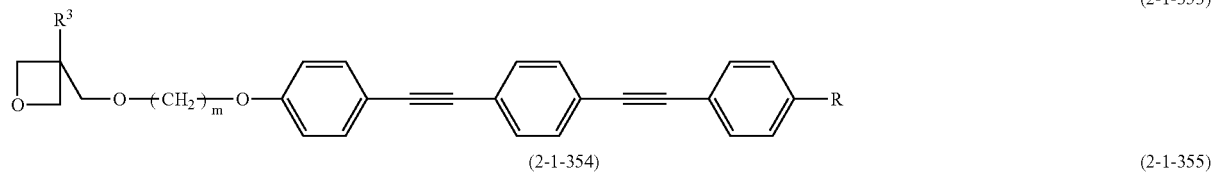
(2-1-354) (2-1-355)
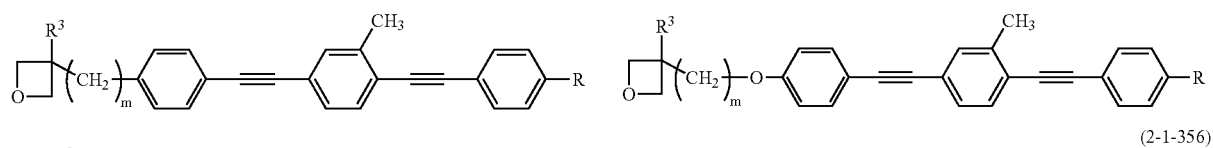
(2-1-356)
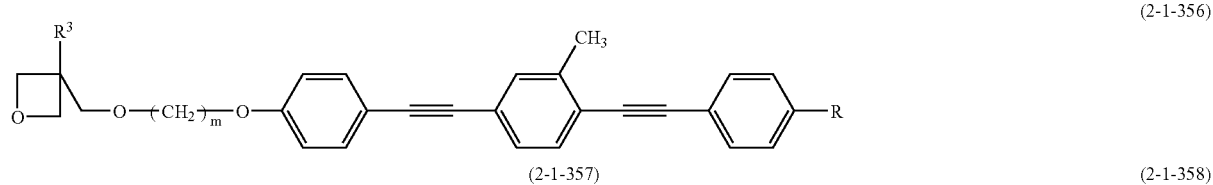
(2-1-357) (2-1-358)
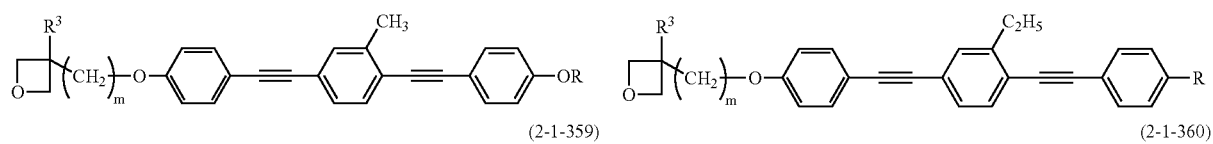
(2-1-359) (2-1-360)
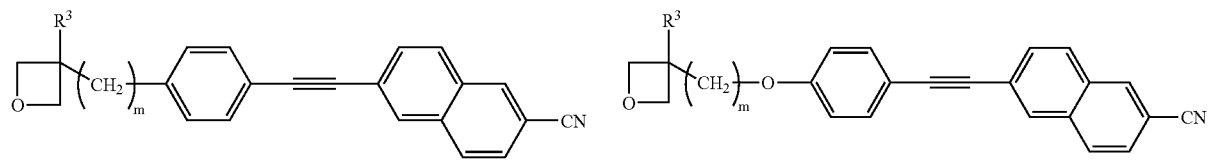

(2-1-361) 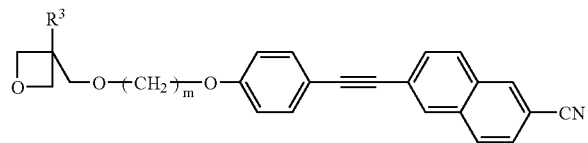

(2-1-362) 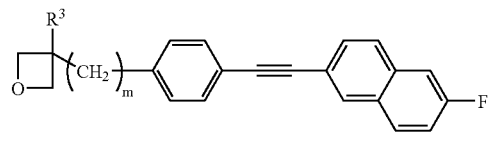

(2-1-363) 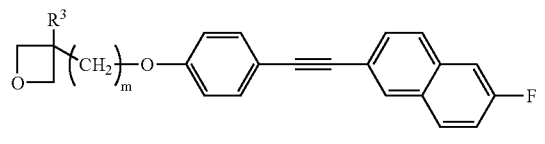

(2-1-364) 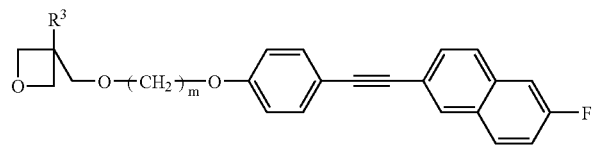

(2-1-365) 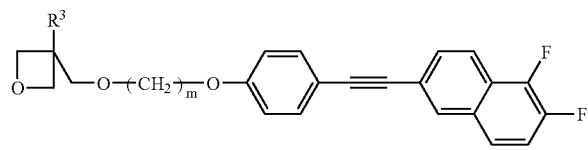

(2-1-366) 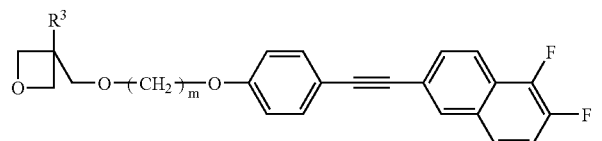

(2-1-367) 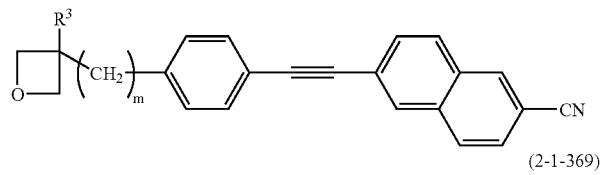

(2-1-368) 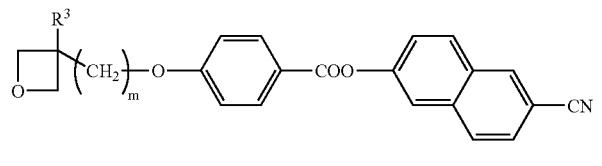

(2-1-369) 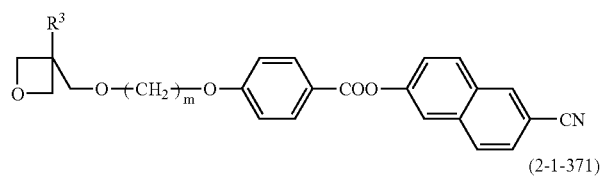

(2-1-370) 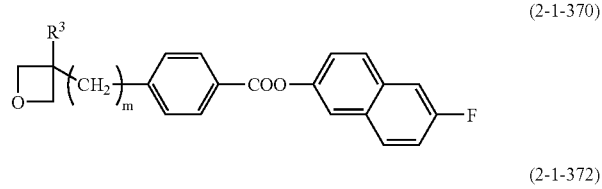

(2-1-371) 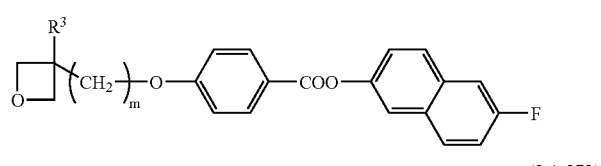

(2-1-372) 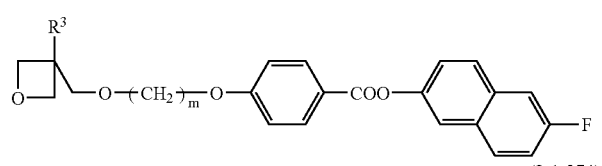

(2-1-373) 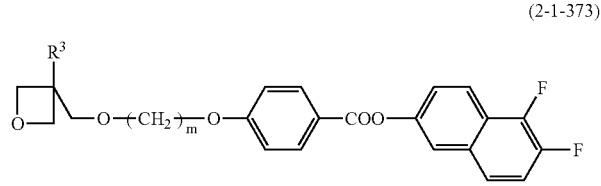

(2-1-374) 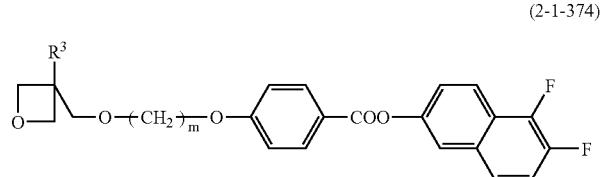

(2-1-375) 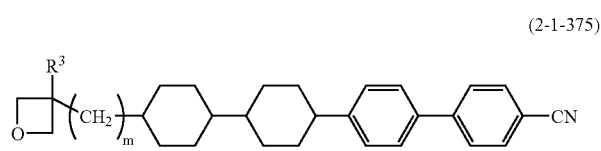

(2-1-376) 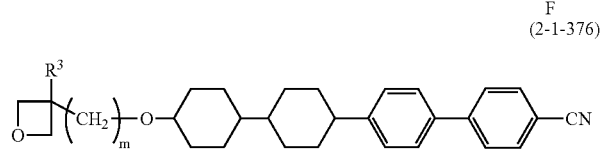

When the purpose of use is for a rotator or an application for optical compensation utilizing birefringence, a considerably high HTP will be unnecessary, and therefore the following common chiral compounds may be added in addition to those shown above, as third components composed of optically active compounds. In the following formulas, Y is independently a halogen, —CN or C2-10 alkenyl or C1-10 alkyl optionally containing oxiranyl or oxetane group, wherein any —CH$_2$— in the group may be replaced with —O—. The letter v represents an integer of 1-20.

(4-1) 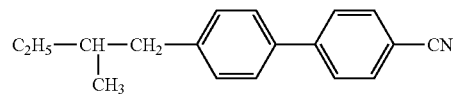
(4-2) 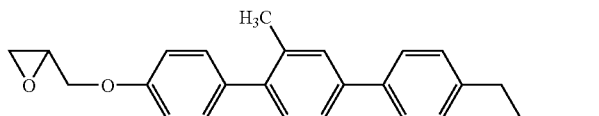
(4-3) 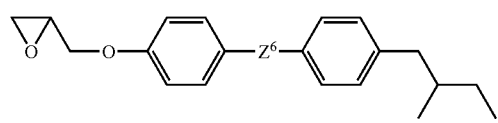
(4-4) 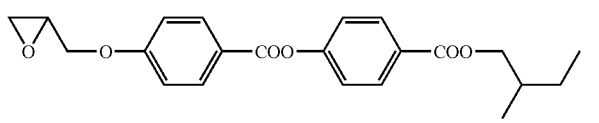
(4-5) 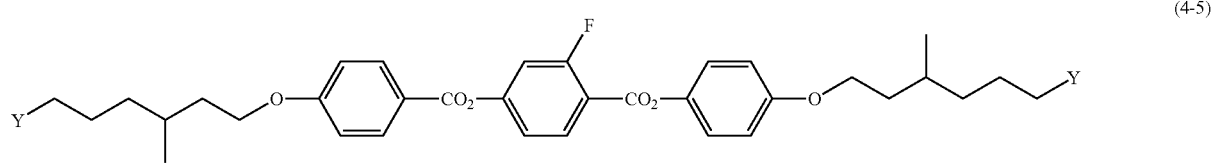
(4-6) 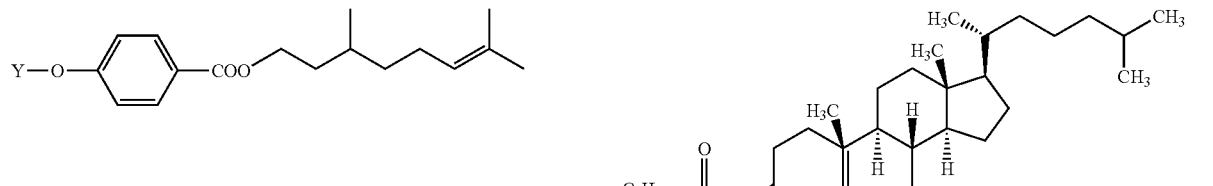
(4-7) 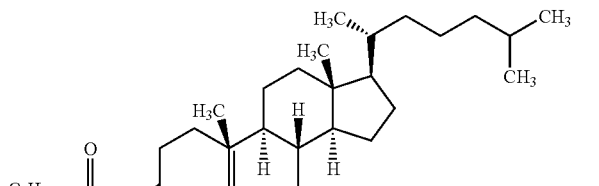
(4-8) 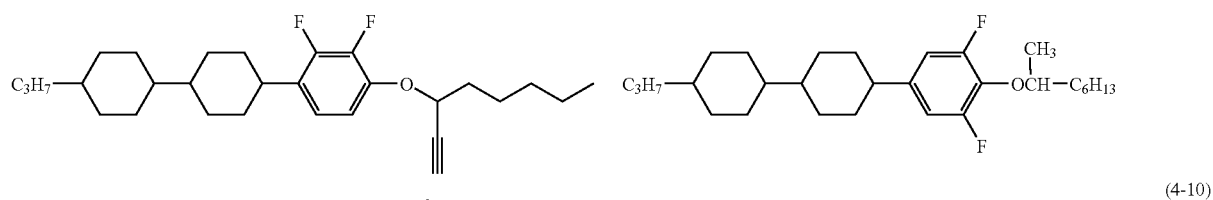
(4-9) 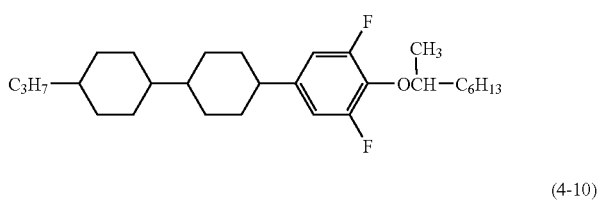
(4-10) 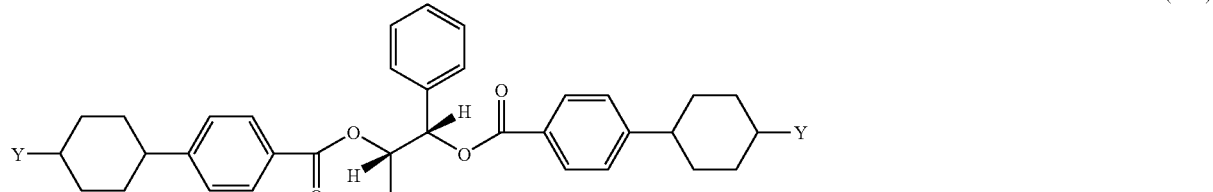
(4-11) 
(4-12) 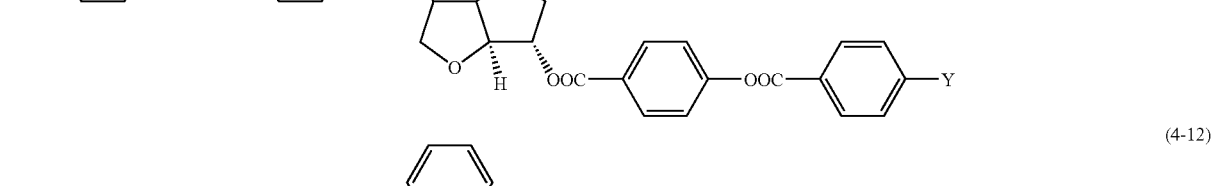

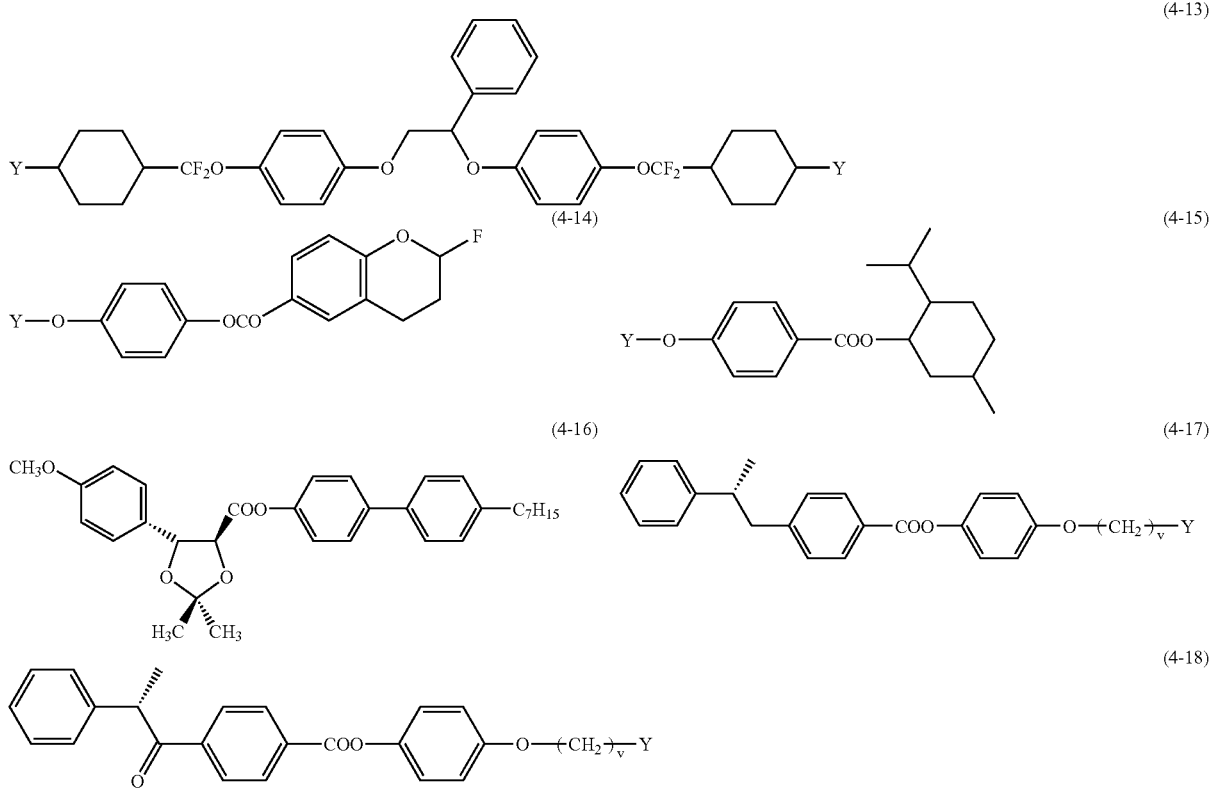

Specifically, these are 2-methylbutyl compounds typical as compounds (4-1) to (4-4), citronellol derivatives typical as compound (4-5) and compound (4-6), cholesteryl esters typical as compound (4-7), alkyn-3-ol derivatives typical as compound (4-8), 1-methylalkyl compounds typical as compound (4-9), 1,2-diphenylethane-1,2-diol derivatives typical as compound (4-10), isosorbite derivatives typical as compound (4-11), 1-phenylethane-1,2-diol derivatives typical as compounds (4-12) and (4-13), coumarin derivatives typical as compound (4-14), menthol derivatives typical as compound (4-15), tartaric acid derivatives typical as compound (4-16), and 2-substituted propionic acid derivatives typical as compounds (4-17) and (4-18). Among 2-methylbutyl compounds, cyanobiphenyls are commercially available as C15 and CB15. Typical 1-methylalkyl compounds are publicly known as CM21 and CM33. However, any analogous compounds may also be used.

Specific examples of compounds (4-5), (4-6), (4-7), (4-8), (4-10), (4-11), (4-12), (4-13), (4-14), (4-15) and (4-16) are described in JP-A-H11-302229/1999, WO02/100979, DE10221751, EP1273585, U.S. Pat. No. 6,511,719B and U.S. Pat. No. 6,495,217B, and their cited references.

The 2-substituted propionic acid derivatives represented by formulas (4-17) or (4-18) may be synthesized by the method described in Mol. Cryst. Liq. Cryst., 2000, Vol. 346, pp. 35-40. Any compound which can be derived from a chiral source such as citronellol by a publicly known method can be suitably used as an optically active alkylene site for the present invention. The ends of these compounds may be substituted with polymerizable groups such as epoxy or oxetane.

The optical activity of a polymer (optical anisotropy film) obtained from a liquid crystal composition composed only of a polymerizable compound will generally have low temperature dependence in the practical temperature range. On the other hand, since the optical properties of liquid crystal compositions filling liquid crystal display elements are temperature-dependent, the optical properties of the liquid crystal display elements exhibit temperature dependence. Thus, when the polymer is used for optical compensation of a liquid crystal display element, a polymer with optical property temperature dependence may be required depending on the use (for example, an STN type liquid crystal display element). The polymers of the invention have high molecular weights, and in most cases have three-dimensional structures which are insoluble in organic solvents. Consequently, the molecular weights cannot be measured.

A non-polymerizable liquid crystal compound may also be added as an additional component. The polymer composition will therefore refer to the cured product obtained by polymerization of the polymerizable liquid crystal composition comprising this non-polymerizable liquid crystal compound. The optical properties of the resulting polymer composition (optical anisotropy film) are temperature dependent. As a result, since the temperature dependence of the optical properties of the polymer composition satisfy the conditions for optical compensation in a wide temperature range, the display characteristics of the liquid crystal display element can be enhanced over a wide temperature range. Specific examples of non-polymerizable liquid crystal compounds are mentioned in the liquid crystal compound database LiqCryst (trade name of LCI Publisher GmbH (Hamburg, Germany)). A polymer composition is also obtained by polymerizing a liquid crystal composition composed only of the polymerizable compound, and leaving a partial residue of the unreacted polymerizable compound in the system.

A method of synthesizing the constituent compounds will now be explained fifth.

Compound (1-2-116) may be synthesized by esterification reaction of a hydroquinone derivative and a substituted benzoic acid derivative. More specifically, it may be synthesized by the method described in Japanese Patent Application No. 2003-567, for example. Compounds (1-3) and (2-3) may be synthesized by a combination of methods known in organic synthetic chemistry. Specific methods are described in Houben-Wyle, Methods of Organic Chemistry (Georg Thieme Verlag, Stuttgart), Organic Syntheses (John Wily & Sons, Inc.), Organic Reactions (John Wily & Sons Inc.), Comprehensive Organic Synthesis (Pergamon Press) and Shinjikken Kagaku Koza (Maruzen). More specifically, the method described in Japanese Patent Application No. 2001-317433 may be applied. The binaphthol derivatives represented by formulas (3-1) and (3-2) may be synthesized by the methods described in, for example, Mol. Cryst. and Liq. Cryst., 2001, Vol.364, pp. 825-834, EP0217239 and WO02/06195.

A process for forming an optical anisotropy film using the polymerizable liquid crystal composition described above will now be explained. There will be described in order: (1) the polymerization initiator, (2) additives other than the polymerization initiator, (3) the support and the orientation treatment, (4) the film-forming process and (5) the polymerization by UV irradiation.

(1) A polymerization initiator is added to the liquid crystal composition and polymerization is conducted by photoirradiation in air.

An ordinary photo-cationic polymerization initiator is added to the composition of the invention. Photo-cationic polymerization initiators include diaryliodonium salts (hereinafter abbreviated as DAS) and triarylsulfonium salts (hereinafter abbreviated as TAS).

As DAS there may be mentioned diphenyliodonium tetrafluoroborate, diphenyliodonium hexafluorophosphonate, diphenyliodonium hexafluoro arsenate, diphenyliodonium trifluoromethanesulfonate, diphenyliodonium trifluoroacetate, diphenyliodonium-p-toluenesulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoro arsenate, 4-methoxyphenylphenyliodonium trifluoromethanesulfonate, 4-methoxyphenylphenyliodonium trifluoroacetate, 4-methoxyphenylphenyliodonium-p-toluenesulfonate, 4-methoxyphenylphenyliodonium diphenyliodonium tetra(pentafluorophenyl)borate, bis(4-tert-butylphenyl)iodonium diphenyliodonium tetrafluoroborate, bis(4-tert-butylphenyl)iodonium diphenyliodonium hexafluoro arsenate, bis(4-tert-butylphenyl)iodonium diphenyliodonium trifluoromethanesulfonate, bis(4-tert-butylphenyl)iodonium trifluoroacetate, bis(4-tert-butylphenyl)iodonium p-toluenesulfonate and bis(4-tert-butylphenyl)iodonium diphenyliodonium tetra(pentafluorophenyl)borate.

A DAS may be sensitized by addition of a photosensitizer such as thioxanthone, phenothiazine, chlorothioxanthone, xanthone, anthracene, diphenylanthracene or rubrene.

As TAS there may be mentioned triphenylsulfonium tetrafluoroborate, triphenylsulfonium hexafluorophosphonate, triphenylsulfonium hexafluoro arsenate, triphenylsulfonium trifluoromethanesulfonate, triphenylsulfonium trifluoroacetate, triphenylsulfonium-p-toluenesulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoro arsenate, 4-methoxyphenyldiphenylsulfonium trifluoromethanesulfonate, 4-methoxyphenyldiphenylsulfonium trifluoroacetate, 4-methoxyphenyldiphenylsulfonium-p-toluenesulfonate, 4-methoxyphenyldiphenylsulfonium tetra(pentafluorophenyl)borate, 4-phenylthiophenyldiphenylsulfonium tetrafluoroborate, 4-phenylthiophenyldiphenylsulfonium hexafluorophosphonate, 4-phenylthiophenyldiphenylsulfonium hexafluoro arsenate, 4-phenylthiophenyldiphenylsulfonium trifluoromethanesulfonate, 4-phenylthiophenyldiphenylsulfonium-p-toluenesulfonate and 4-phenylthiophenyldiphenylsulfonium tetra(pentafluorophenyl)borate.

Examples of specific commercially available photo-cationic polymerization initiators include UCC products such as SILACURE UVI-6990, SILACURE UVI-6974 and SILACURE UVI-6992, Asahi Denka Co., Ltd. products such as ADEKA OPTOMER SP-150, SP-152, SP-170 and SP-172, Rhodia Japan products such as PHOTOINITIATOR 2074, Ciba Specialty Chemical products such as IRGACURE 250, GE Silicones products such as UV-9380C, and Midori Chemicals products such as DTS-102.

The composition of the invention may employ an ordinary photoradical polymerization initiator added in combination with the photo-cationic polymerization initiator, for hybrid curing. Examples of photoradical polymerization initiators include Ciba Specialty Chemical products such as DAROCURE 1173 (2-hydroxy-2-methyl-1-phenylpropan-1-one), IRGACURE 184 (1-hydroxycyclohexylphenylketone), IRGACURE 651 (2,2-dimethoxy-1,2-diphenylethan-1-one), IRGACURE 500, IRGACURE 2959, IRGACURE 907, IRGACURE 369, IRGACURE 1300, IRGACURE 819, IRGACURE 1700, IRGACURE 1800, IRGACURE 1850, DAROCURE 4265 and IRGACURE 784.

Other examples of photoradical polymerization initiators include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, benzophenone/Michler's ketone mixture, hexaarylbiimidazole/mercaptobenzimidazole mixture, 1-(4-isopropylphenyl)-2-hydroxy-2-methylpropan-1-one, benzyldimethylketal, 2-methyl-1-[4-(methylthio)phenyl]-2-morpholinopropan-1-one, 2,4-diethylxanthone/methyl p-dimethylaminobenzoate mixture and benzophenone/methyltriethanolamine mixture.

Curing of the composition of the invention may be accomplished utilizing a light-induced base proliferation reaction (K. Arimitsu, M. Miyamoto, K. Ichimura, Angew. Chem. Int. Ed, 2000, 39, 3425). The amount of photopolymerization initiator added is preferably 0.01-10 wt %, and more preferably 0.01-5 wt %, with respect to the liquid crystal composition.

(2) A polymerization inhibitor may be added to the photopolymerizable composition to prevent polymerization during storage. Publicly known polymerization inhibitors may be used, and preferred examples include 2,5-di(t-butyl)hydroxytoluene (BHT), hydroquinone, Methyl Blue, diphenylpicric acid hydrazide (DPPH), benzothiazine, 4-nitrosodimethylaniline (NIDI) and o-hydroxybenzophenone. For enhanced storage properties of the photopolymerizable composition, an oxygen inhibitor may also be added. Radicals generated in the composition react with oxygen to yield peroxide radicals, which can promote undesirable reactions with the polymerizable compound. An oxygen inhibitor is preferably added to prevent this. Examples of oxygen inhibitors include phosphoric acid esters.

In order to facilitate coating, or in order to control the orientation of the liquid crystal phase, a surfactant may be added within a range which does not impede the effect of the invention. As examples of surfactants there may be mentioned imidazoline, quaternary ammonium salts, alkylamine oxides, polyamine derivatives, polyoxyethylene-polyoxypropylene condensate, polyethylene glycol and its esters, sodium lauryl sulfate, ammonium lauryl sulfate, lauryl sulfuric acid amines, alkyl-substituted aromatic sulfonic acid salts, alkylphosphoric acid salts, aliphatic or aromatic sulfonic acid formalin condensates, laurylamidopropylbetaine, laurylaminoacetic acid betaine, polyethylene glycol fatty acid esters, polyoxyethylenealkylamine, perfluoroalkylsulfonic acid salts, perfluoroalkylcarboxylic acid salts, perfluoroalkylethylene oxide adducts, perfluoroalkyltrimethylammonium salts, perfluoroalkyl group- and hydrophilic group-containing oligomers, perfluoroalkyl group- and lipophilic group-containing oligomers, and perfluoroalkyl group-containing urethanes.

The aforementioned surfactants will be added in different amounts depending on the type of surfactant and the compositional ratio of the photopolymerizable liquid crystal composition, but may be in the range of 20 ppm to 5%, and preferably 100 ppm to 1%, based on the weight of the photopolymerizable liquid crystal composition.

(3) The liquid crystal film of the invention may be produced by a method of coating the photopolymerizable composition of the invention onto a support to form a coated film, and using photoirradiation to fix the nematic orientation formed by the composition in a liquid crystal state in the coated film.

Examples of supports on whose surfaces coated films of liquid crystal compositions can be formed include, triacetylcellulose, polyvinyl alcohol, polyimide, polyester, polyarylate, polyetherimide, polyethylene terephthalate and polyethylene naphthalate. Specific commercially available norbornene resins which may be used include "ARTON" by JSR Co., Ltd., "ZEONEX" and "ZEONOR" by Nihon Zeon Co., Ltd., and "APEL" by Mitsui Chemical Co., Ltd. These supports may be uniaxially drawn films or biaxially drawn films.

Preferred methods for orientation treatment of the support surface include rubbing treatment with a rayon cloth or the like, oblique vapor deposition of silicon oxide, drawing of the film, or rubbing-free orientation by polarizing ultraviolet or an ion beam. Rubbing treatment may be carried out on a thin-film layer formed of, for example, a commonly used polyimide or polyvinyl alcohol, and an optical anisotropy film made of a polymerizable liquid crystal composition is coated thereover.

(4) Although the photopolymerizable composition may be used directly for formation of the liquid crystal film, a more common method is to form a thin-film by addition of an appropriate solvent followed by coating or molding and then removal of the solvent. By carefully studying the compositional ratio of the compounds in the polymerizable liquid crystal composition, and the $\Delta n$, film thickness and orientation layer of the polymerizable liquid crystal composition, it is possible to appropriate adjust the orientation type to a homogeneous orientation, tilt orientation, hybrid orientation, homeotropic orientation or twist orientation, and to adjust the optical properties such as retardation, to adapt to various purposes.

As solvents there may be used benzene, toluene, xylene, mesitylene, n-butylbenzene, diethylbenzene, tetralin, methoxybenzene, 1,2-dimethoxybenzene, ethyleneglycol dimethylether, diethyleneglycol dimethylether, acetone, methyl ethyl ketone, methyl isobutyl ketone, cyclohexanone, cyclopentanone, ethyl acetate, methyl lactate, ethyl lactate, propyl lactate, butyl lactate, trifluoroacetic acid, trifluoroethyl acetate, ethyleneglycol monomethylether acetate, propyleneglycol monomethylether acetate, propyleneglycol monoethylether acetate, γ-butyrolactone, 2-pyrrolidone, N-methyl-2-pyrrolidone, dimethylformamide, chloroform, dichloromethane, carbon tetrachloride, dichloroethane, tetrachloroethylene, trichloroethylene, tetrachloroethylene, chlorobenzene, t-butylalcohol, diacetone alcohol, ethanol, isopropanol, glycerin, monoacetin, ethylene glycol, triethylene glycol, hexylene glycol, ethyleneglycol monomethylether, ethylcellosolve, butylcellosolve, THF and the like, either as simple solvents or as a mixture of multiple solvents.

The coating may be carried out by a method of spin coating, roll coating, curtain coating, flow coating, printing, microgravure coating, gravure coating, wire bar coating, dip coating, spray coating, meniscus coating or casting film formation, for development of a thin film, followed by drying treatment to remove the solvent.

(5) The preferred range for the dose of irradiation from the light source will differ depending on the compounds used in the photopolymerizable composition, the type of polymerization initiator and the compositional ratio. Thus, the conditions for the temperature and time for heat treatment of the coated film explained below the wavelength of light used for photoirradiation, and the dose of light irradiated from the light source, will be discussed in approximate ranges.

The nematic orientation of the photopolymerizable composition formed on the support is fixed by polymerizing the coated film by photoirradiation. The wavelength of light used for the photoirradiation is not particularly restricted. Electron beam rays, ultraviolet rays, visible light rays, infrared rays (heat rays) or the like may be used. For most cases, ultraviolet rays or visible light rays may be used. The wavelength range is generally 150-500 nm. The range is preferably 250-450 nm and more preferably 300-400 nm. Examples of light sources include low-voltage mercury lamps (germicidal lamps, fluorescent chemical lamps, blacklights), high-voltage discharge lamps (high-voltage mercury lamps, metal halide lamps), short arc discharge lamps (extra-high voltage mercury lamps, xenon lamps, mercury-xenon lamps), and the like. Preferred light sources include metal halide lamps and xenon lamps, as well as high-voltage mercury lamps.

A filter or the like may be situated between the light source and the coated film layer of the photopolymerizable composition to allow passage only of a specific wavelength range, thereby allowing selection of the wavelength range for the irradiation light source. The dose of photoirradiation from the light source may be 2-5000 mJ/cm$^2$. The dose range is preferably 10-3000 mJ/cm$^2$, and more preferably 100-2000 mJ/cm$^2$. The temperature conditions for the photoirradiation are preferably determined in the same manner as for the heat treatment temperature described above.

The present invention will now be explained in greater detail by examples, with the understanding that the invention is not limited to the examples. The percentage values are weight percentages based on the total weight of the composition. The compounds in the examples and comparative examples will be referred to by symbols as defined in Table 1 below. In Table 1, the spatial configuration for 1,4-cyclohexylene is the trans form.

TABLE 1

Symbols for compounds
L—Z$^1$—(A$^1$)—Z$^2$—...Z$^{n-1}$—(A$^n$)—Z$^n$—R

| 1) Left end group L— | Symbol | 2) Right end group —R | Symbol | 3) Ring structure$^n$ —(A$^n$)— | Symbol | 4) Bonding group —Z$^n$— | Symbol |
|---|---|---|---|---|---|---|---|
| epoxide | E— | epoxide | —E | phenylene | B | —CH$_n$H$_{2n}$— | n |
| oxetane | X(0)— | oxetane | —X(0) | F-phenylene | B(F) | —COO— | E |
| methyl oxetane | X(1)— | methyl oxetane | —X(1) | F-phenylene | Br(F) | —OCO— | Er |
| methyl oxetane | X(2)— | methyl oxetane | —X(2) | DF-phenylene | B(DF) | —C≡C— | T |
| acrylate | A— | acrylate | —A | CN-phenylene | B(C) | —O— | O |
|  |  | —CN | C | NC-phenylene | Br(C) |  |  |
|  |  | —F | F | DC-phenylene | B(DC) |  |  |
|  |  | —C$_n$H$_{2n+1}$ | n | CF$_3$-phenylene | B(CF3) |  |  |
|  |  |  |  | F$_3$C-phenylene | Br(CF3) |  |  |
|  |  |  |  | DCF$_3$-phenylene | B(DCF3) |  |  |

TABLE 1-continued

Symbols for compounds
$L-Z^1-(A^1)-Z^2-\ldots Z^{n-1}-(A^n)-Z^n-R$

B(1)

H

FL(1)

FL(2)

5) Examples

1: E-1060BBC

2: X(1)-1040HEFL(1)ErH0401-X(1)

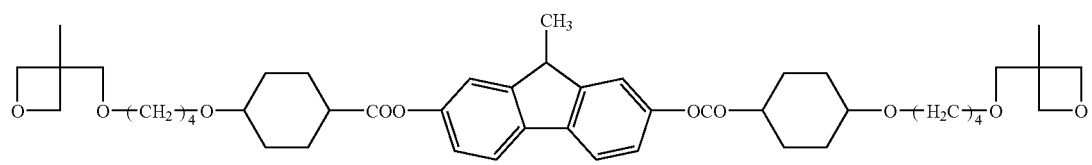

The conditions for curing (polymerization) in the examples were as follows: "Irradiation of light at intensity of 30 mW/cm$^2$ (365 nm) for 20 seconds using a 250 W extra-high voltage mercury lamp at room temperature, in air or under nitrogen purging". The major evaluated properties were (A) rapid curing property, (B) heat resistance and (C) adhesion. For (A), the internal curing property was judged according to the surface curing property determined by a fingernail scratch test, based on the tack (stickiness) of the surface under the curing conditions described above. For (B), the film was allowed to stand at 200° C. for 1 hour after curing, and the change in retardation at 25° C. was determined with respect to the initial value. A smaller change indicated more satisfactory heat resistance. The measuring wavelength was 550 nm. The evaluation sample was obtained by film formation/orientation on a rubbing-treated polyimide (heated at 210° C. for 30 minutes)-attached glass plate, followed by polymerization under the curing conditions described above. For (C), a cellophane tape peel test was conducted after curing. The cellophane tape peel test was carried out according to JIS-5400, i.e. the evaluation was based on the number of squares remaining among 100 grid squares. A TAC film with an acetylation degree of 2.9 was used as the support. An evaluation sample was also obtained by film formation/orientation on a rubbing-treated TAC film, followed by polymerization under the curing conditions described above.

EXAMPLE 1

Composition I of the invention was first coated onto a base by the following two methods: (1) After dissolution in cyclopentanone to a concentration of 30%, the solution was coated onto the rubbing-treated polyimide-attached glass plate by a spin coating method, or (2) after dissolution in a toluene/cyclopentanone mixture (mixing ratio (by weight)=2:1) to a concentration of 30%, the solution was coated onto a rubbing-treated TAC film with a bar coater. In both cases, the solvent was removed under conditions of 70° C. for 3 minutes, and polymerization was conducted to obtain an optical thin-film having a homogeneous orientation.

(Composition I)

| | |
|---|---|
| E-2OBEBO2-E | 49% |
| X(1)-1O6OBEFL(1)ErBO6O1-X(1) | 48% |
| DTS-102 (Compound shown below) | 3% |
| (DTS-102) | |

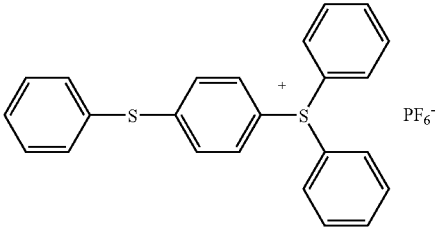

COMPARATIVE EXAMPLE

The following acrylate-based Composition II was first coated onto a base by the following two methods: (1) After dissolution in cyclopentanone to a concentration of 30%, the solution was coated onto the rubbing-treated polyimide-attached glass plate by a spin coating method, or (2) after dissolution in a toluene/cyclopentanone mixture (mixing ratio (by weight)=2:1) to a concentration of 30%, the solution was coated onto a rubbing-treated TAC film with a bar coater. In both cases, the solvent was removed under conditions of 70° C. for 3 minutes, and polymerization was conducted to obtain an optical thin-film having a homogeneous orientation.

(Composition II)

| | |
|---|---|
| A-6OBBC | 30% |
| A-6OBEB(CF3)ErBO6-A | 27% |
| A-6OBEFL(1)ErBO6-A | 40% |
| IRG907 | 3% |

The following epoxy-based Composition III was first coated onto a base by the following two methods: (1) After dissolution in cyclopentanone to a concentration of 30%, the solution was coated onto the rubbing-treated polyimide-attached glass plate by a spin coating method, or (2) after dissolution in a toluene/cyclopentanone mixture (mixing ratio (by weight)=2:1) to a concentration of 30%, the solution was coated onto a rubbing-treated TAC film with a bar coater. In both cases, the solvent was removed under conditions of 70° C. for 3 minutes, and polymerization was conducted to obtain an optical thin-film having a homogeneous orientation.

(Composition III)

| | |
|---|---|
| E-2OBEBO2-E | 49% |
| E-1O6OBEFL(1)ErBO6O1-E | 48% |
| DTS-102 | 3% |

The following oxetane-based Composition IV was first coated onto a base by the following two methods: (1) After dissolution in cyclopentanone to a concentration of 30%, the solution was coated onto the rubbing-treated polyimide-attached glass plate by a spin coating method, or (2) after dissolution in a toluene/cyclopentanone mixture (mixing ratio (by weight)=2:1) to a concentration of 30%, the solution was coated onto a rubbing-treated TAC film with a bar coater. In both cases, the solvent was removed under conditions of 70° C. for 3 minutes, and polymerization was conducted to obtain an optical thin-film having a homogeneous orientation.

(Composition IV)

| | |
|---|---|
| X(1)-4OBEB(1)ErBO4-X(1) | 20% |
| X(1)-6OBEB(1)ErBO6-X(1) | 37% |
| X(1)-1O6OBEFL(1)ErO6O1-X(1) | 40% |
| DTS-102 | 3% |

The results for the (A) rapid curing property of Compositions I-IV above and the (B) heat resistance and (C) adhesion of the polymers obtained by polymerization of the compositions are summarized in the following table. For evaluation of the (B) heat resistance, if the change in retardation after standing at 200° C. for 1 hour was less than 3% an evaluation of "good" was given, if 3% or greater and less than 10% an evaluation of "fair" was given, and if 10% or greater an evaluation of "bad" was given. For evaluation of the (C) adhesion, a word of "good" was given if the number of squares remaining among the 100 squares was 100, and a word of "bad" was given if it was 0.

TABLE 2

| | (A) Rapid curing property | | (B) Heat resistance | | (C) Adhesion | |
|---|---|---|---|---|---|---|
| Composition | Curing in air | Curing under N$_2$ purging | Curing in air | Curing under N$_2$ purging | Curing in air | Curing under N$_2$ purging |
| I | good | good | good | good | good | good |
| II | bad | good | bad | bad | bad | bad |
| III | fair | fair | fair | fair | good | good |
| IV | fair | fair | fair | fair | good | good |

These results indicate that Composition I of the invention has an excellent rapid curing property, excellent heat resistance and adhesion in air, and thus achieves the desired object.

EXAMPLE 2

| | |
|---|---|
| E-1O4OBBC | 49% |
| X(1)-1O6OBEFL(1)ErBO6O1-X(1) | 48% |
| DTS-102 | 3% |

The composition shown above was dissolved in a toluene/cyclopentanone mixed solvent (mixing ratio (by weight)=2:1) to a concentration of 20%, and then (1) coated onto a rubbing-treated polyimide-attached glass plate by a spin coating method, or (2) coated onto a rubbing-treated TAC film with a bar coater, after which, in both cases, the solvent was removed under conditions of 70° C. for 3 minutes, and polymerization was conducted in air to obtain an optical anisotropy film having a satisfactory orientation property. The optical anisotropy film formed on the glass plate had a front side retardation of 221 nm, and had a hybrid orientation. The measuring temperature and measuring wavelength were 25° C. and 550 nm, respectively. The obtained anisotropy film exhibited excellent heat resistance in a heat resistance test, with a retardation change of less than 3%. Satisfactory results were also obtained in an adhesion test, with 100 squares remaining.

EXAMPLE 3

| | |
|---|---|
| E-2OBEBO2-E | 20% |
| E-6OBEB(DCF3)ErBO6-E | 30% |
| X(1)-1O6OBEFL(1)ErBO6O1-X(1) | 30% |
| X(1)-1O6OBEFL(2)ErBO6O1-X(1) | 17% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain an optical anisotropy film with homogeneous orientation having a satisfactory orientation property with a front side retardation of 260.2 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 4

| | |
|---|---|
| E-1OBTB3 | 30% |
| E-2OBEBO2-E | 20% |
| X(2)-1O4OBEFL(1)ErBO4O1-X(2) | 15% |
| X(1)-1O6OBEFL(2)ErBO6O1-X(1) | 32% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain an optical anisotropy film with homogeneous orientation having a satisfactory orientation property with a front side retardation of 323 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 5

| | |
|---|---|
| E-2OBEBO2-E | 30% |
| E-3HHB(F)F | 37% |
| X(1)-1O6OHEFL(1)ErHO6O1-X(1) | 30% |
| DTS-102 | 3% |

The composition shown above was dissolved in cyclopentanone to a concentration of 20% and coated onto a rubbing-treated polyimide-attached glass plate by a spin coating method, the solvent was removed under conditions of 70° C. for 3 minutes, and then polymerization was conducted in air to obtain an optical anisotropy film with hybrid orientation having a satisfactory orientation property with a front side retardation of 141.2 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 6

| | |
|---|---|
| E-1OBBC | 5% |
| E-4OBBC | 40% |
| X(1)-6OBEB(1)ErBO6-X(1) | 52% |
| DTS-102 | 3% |

The composition shown above was dissolved in cyclopentanone to a concentration of 20% and coated onto a rubbing-treated polyimide-attached glass plate by a spin coating method, the solvent was removed under conditions of 70° C. for 3 minutes, and then polymerization was conducted in air to obtain an optical anisotropy film with hybrid orientation having a satisfactory orientation property with a front side retardation of 285.5 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 7

| | |
|---|---|
| E-2OBEBO2-E | 10% |
| E-3HHB(F)F | 30% |
| E-6OBEB(1)ErBO6-E | 27% |
| X(1)-3HHB(F)F | 30% |
| DTS-102 | 3% |

The composition shown above was dissolved in cyclopentanone to a concentration of 20% and coated onto a rubbing-treated polyimide-attached glass plate by a spin coating method, the solvent was removed under conditions of 70° C. for 3 minutes, and then polymerization was conducted in air to obtain an optical anisotropy film with hybrid orientation having a satisfactory orientation property with a front side retardation of 139.6 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 8

| | |
|---|---|
| E-2OBEBO2-E | 20% |
| E-6OBEB(1)ErBO6-E | 28% |
| X(1)-1O4OBBC | 20% |
| X(1)-6OBEB(1)ErBO6-X(1) | 29% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain an optical anisotropy film with homogeneous orientation having a satisfactory orientation property with a front side retardation of 259.5 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 9

| | |
|---|---|
| E-6OBEB(1)ErBO6-E | 48% |
| X(1)-6OBEB(1)ErBO6-X(1) | 49% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain an optical anisotropy film with homogeneous orientation having a satisfactory orientation property with a front side retardation of 263.1 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 10

| | |
|---|---|
| E-1O4OBEFL(1)ErBO4O1-E | 48% |
| X(2)-1O4OBBC | 49% |
| DTS-102 | 3% |

The composition shown above was dissolved in a toluene/cyclopentanone mixed solvent (mixing ratio (by weight)=2:1) to a concentration of 30%, and then (1) coated onto a rubbing-treated polyimide-attached glass plate by a spin coating method, or (2) coated onto a rubbing-treated TAC film with a bar coater, after which, in both cases, the solvent was removed under conditions of 70° C. for 3 minutes, and polymerization was conducted in air to obtain an optical anisotropy film having a satisfactory orientation property. The optical anisotropy film formed on the glass plate had a front side retardation of 367.2 nm, and had a homogeneous orientation. The measuring temperature and measuring wavelength were 25° C. and 550 nm, respectively. The obtained anisotropy film exhibited excellent heat resistance in a heat resistance test, with a retardation change of less than 3%. Satisfactory results were also obtained in an adhesion test, with 100 squares remaining.

EXAMPLE 11

| | |
|---|---|
| E-1O6OBEFL(1)ErBO6O1-E | 40% |
| X(2)-1O4OBBC | 27% |
| X(1)-3HHB(F)F | 30% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain an optical anisotropy film with homogeneous orientation having a satisfactory orientation property with a front side retardation of 327.8 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 12

| | |
|---|---|
| E-1OBTB3 | 17% |
| E-2OBEBO2-E | 20% |
| E-1O6OBEFL(1)ErBO6O1-E | 30% |
| X(1)-1O6OBEFL(1)ErBO6O1-X(1) | 30% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain an optical anisotropy film with homogeneous orientation having a satisfactory orientation property with a front side retardation of 314.2 nm. The measuring temperature and measuring wavelength were 25° C. and 550 nm, respectively. The obtained anisotropy film exhibited excellent heat resistance in a heat resistance test, with a retardation change of less than 3%. The composition was also dissolved in a toluene/cyclopentanone mixed solvent (mixing ratio (by weight). 2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 13

| | |
|---|---|
| E-2OBEBO2-E | 43% |
| X(1)-1O6OBEFL(1)ErBO6O1-X(1) | 44% |
| Compound (3-1-6): Y = C5 alkyl | 10% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −34.6 nm at an inclination angle of 400 with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight) =2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 14

| | |
|---|---|
| E-2OBEBO2-E | 47% |
| X(1)-1O6OBEFL(1)ErBO6O1-X(1) | 46% |
| Compound (3-1-6): Y = C5 alkyl | 4% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colored optical thin-film. Measurement of the light transmission spectrum revealed selective reflection in a wavelength band of $\Delta\lambda$=68 nm, with a central wavelength $\lambda c$=610 nm. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 15

| | |
|---|---|
| E-2OBEBO2-E | 33% |
| E-6OBEB(DCF3)ErBO6-E | 10% |
| X(2)-1O4OBEFL(1)ErBO4O1-X(2) | 10% |
| X(1)-1O6OBEFL(1)ErBO6O1-X(1) | 34% |
| Compound (3-1-10): Y = C5 alkyl, v = 5 | 10% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −33.1 nm at an inclination angle of 40° with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 16

| E-1O6OBEFL(1)ErBO6O1-E | 44% |
| X(1)-1O4OBBC | 43% |
| Compound (3-1-6): Y = C5 alkyl | 10% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −41.9 nm at an inclination angle of 40° with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 17

| E-2OBEBO2-E | 15% |
| E-6OBEB(1)ErBO6-E | 30% |
| X(1)-6OBEB(1)ErBO6-X(1) | 42% |
| Compound (3-1-6): Y = C5 alkyl | 10% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −34.2 nm at an inclination angle of 40° with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 18

| E-1O4OBBC | 10% |
| E-2OBEBO2-E | 20% |
| E-6OBEB(1)ErBO6-E | 30% |
| X(1)-6OBEB(1)ErBO6-X(1) | 31% |
| Compound (3-2-2): Y = C3 alkyl | 6% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colored optical thin-film. Measurement of the light transmission spectrum revealed selective reflection in a wavelength band of $\Delta\lambda=41.8$ nm, with a central wavelength $\lambda c=421$ nm. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 19

| E-1OBBC | 20% |
| E-2OBEBO2-E | 15% |
| E-6OBEB(1)ErBO6-E | 20% |
| X(1)-3HHB(F)F | 29% |
| Compound (3-2-2): Y = C3 alkyl | 13% |
| DTS-102 | 3% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −26.3 nm at an inclination angle of 40° with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 20

| | |
|---|---|
| E-2OBEBO2-E | 10% |
| X(1)-1O4OB(F)EB(DCF$_3$)ErBr(F)O4O1-X(1) | 10% |
| X(1)-1O4OBEFL(1)ErBO4O1-X(1) | 38% |
| X(1)-1O6OBEFL(1)ErBO6O1-X(1) | 39% |
| DTS-102 | 3% |

The composition shown above was dissolved in a toluene/cyclopentanone mixed solvent (mixing ratio (by weight)=2:1) to a concentration of 20%, and then (1) coated onto a rubbing-treated polyimide-attached glass plate by a spin coating method, or (2) coated onto a rubbing-treated TAC film with a bar coater, after which, in both cases, the solvent was removed under conditions of 70° C. for 3 minutes, and polymerization was conducted in air to obtain an optical anisotropy film having a satisfactory orientation property. The optical anisotropy film formed on the glass plate had a front side retardation of 273 nm, and had a homogeneous orientation. The measuring temperature and measuring wavelength were 25° C. and 550 nm, respectively. The obtained anisotropy film exhibited excellent heat resistance in a heat resistance test, with a retardation change of less than 3%. Satisfactory results were also obtained in an adhesion test, with 100 squares remaining.

EXAMPLE 21

| | |
|---|---|
| X(1)-1O4OBBC | 24% |
| E-1O4OBBC | 20% |
| X(1)-1O4OBEFL(1)ErBO4O1-X(1) | 26% |
| X(1)-1O6OBEFL(1)ErBO6O1-X(1) | 27% |
| DTS-102 | 3% |

The composition shown above was dissolved in a toluene/cyclopentanone mixed solvent (mixing ratio (by weight)=2:1) to a concentration of 20%, and then (1) coated onto a rubbing-treated polyimide-attached glass plate by a spin coating method, or (2) coated onto a rubbing-treated TAC film with a bar coater, after which, in both cases, the solvent was removed under conditions of 70° C. for 3 minutes, and polymerization was conducted in air to obtain an optical anisotropy film having a satisfactory orientation property. The optical anisotropy film formed on the glass plate had a front side retardation of 167 nm, and had a hybrid orientation. The measuring temperature and measuring wavelength were 25° C. and 550 nm, respectively. The obtained anisotropy film exhibited excellent heat resistance in a heat resistance test, with a retardation change of less than 3%. Satisfactory results were also obtained in an adhesion test, with 100 squares remaining.

EXAMPLE 22

| | |
|---|---|
| E-2OBEBO2-E | 10% |
| X(1)-1O6OBEFL(1)ErBO6O1-X(1) | 8% |
| E-1O4OBEFL(1)ErBO4O1-E | 39% |
| E-1O6OBEFL(1)ErBO6O1-E | 40% |
| DTS-102 | 3% |

The composition shown above was dissolved in a toluene/cyclopentanone mixed solvent (mixing ratio (by weight)=2:1) to a concentration of 20%, and then (1) coated onto a rubbing-treated polyimide-attached glass plate by a spin coating method, or (2) coated onto a rubbing-treated TAC film with a bar coater, after which, in both cases, the solvent was removed under conditions of 70° C. for 3 minutes, and polymerization was conducted in air to obtain an optical anisotropy film having a satisfactory orientation property. The optical anisotropy film formed on the glass plate had a front side retardation of 171 nm, and had a hybrid orientation. The measuring temperature and measuring wavelength were 25° C. and 550 nm, respectively. The obtained anisotropy film exhibited excellent heat resistance in a heat resistance test, with a retardation change of less than 3%. Satisfactory results were also obtained in an adhesion test, with 100 squares remaining.

EXAMPLE 23

| | |
|---|---|
| E-2OBEBO2-E | 20% |
| E-1O6OBBr(F)BO6O1-E | 34% |
| E-1O6OBTBTBO6O1-E | 33% |
| X(1)-1O6OBEFL(1)ErBO6O1-X(1) | 10% |
| DTS-102 | 3% |

The composition shown above was dissolved in a toluene/cyclopentanone mixed solvent (mixing ratio (by weight)=2:1) to a concentration of 20%, and then (1) coated onto a rubbing-treated polyimide-attached glass plate by a spin coating method, or (2) coated onto a rubbing-treated TAC film with a bar coater, after which, in both cases, the solvent was removed under conditions of 70° C. for 3 minutes, and polymerization was conducted in air to obtain an optical anisotropy film having a satisfactory orientation property. The optical anisotropy film formed on the glass plate had a front side retardation of 235 nm, and had a homogeneous orientation. The measuring temperature and measuring wavelength were 25° C. and 550 nm, respectively. The obtained anisotropy film exhibited excellent heat resistance in a heat resistance test, with a retardation change of less than 3%. Satisfactory results were also obtained in an adhesion test, with 100 squares remaining.

EXAMPLE 24

| | |
|---|---|
| X(1)-1O4OBB(DF)O2 | 30% |
| E-1O4OBEFL(1)ErBO4O1-E | 34% |
| E-1O6OBEFL(1)ErBO6O1-E | 33% |
| DTS-102 | 3% |

The composition shown above was dissolved in a toluene/cyclopentanone mixed solvent (mixing ratio (by weight)=2:

1) to a concentration of 20%, and then (1) coated onto a rubbing-treated polyimide-attached glass plate by a spin coating method, or (2) coated onto a rubbing-treated TAC film with a bar coater, after which, in both cases, the solvent was removed under conditions of 70° C. for 3 minutes, and polymerization was conducted in air to obtain an optical anisotropy film having a satisfactory orientation property. The optical anisotropy film formed on the glass plate had a front side retardation of 166 nm, and had a homogeneous orientation. The measuring temperature and measuring wavelength were 25° C. and 550 nm, respectively. The obtained anisotropy film exhibited excellent heat resistance in a heat resistance test, with a retardation change of less than 3%. Satisfactory results were also obtained in an adhesion test, with 100 squares remaining.

EXAMPLE 25

| | |
|---|---|
| E-2OBEBO2-E | 33% |
| X(2)-1O6OBEFL(1)ErBO6O1-X(2) | 33% |
| X(2)-1O6OBBC | 31% |
| DTS-102 | 3% |

The composition shown above was dissolved in a toluene/cyclopentanone mixed solvent (mixing ratio (by weight)=2:1) to a concentration of 20%, and then (1) coated onto a rubbing-treated polyimide-attached glass plate by a spin coating method, or (2) coated onto a rubbing-treated TAC film with a bar coater, after which, in both cases, the solvent was removed under conditions of 70° C. for 3 minutes, and polymerization was conducted in air to obtain an optical anisotropy film having a satisfactory orientation property. The optical anisotropy film formed on the glass plate had a front side retardation of 172 nm, and had a homogeneous orientation. The measuring temperature and measuring wavelength were 25° C. and 550 nm, respectively. The obtained anisotropy film exhibited excellent heat resistance in a heat resistance test, with a retardation change of less than 3%. Satisfactory results were also obtained in an adhesion test, with 100 squares remaining.

EXAMPLE 26

| | |
|---|---|
| E-2OBEBO2-E | 30% |
| E-1O4OBEFL(1)ErBO4O1-E | 30% |
| X(2)-1O6OBEFL(1)ErBO6O1-X(2) | 30% |
| Compound (3-1-7): Y = C5 alkyl | 9% |
| DTS-102 | 1% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −36.5 nm at an inclination angle of 40° with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 27

| | |
|---|---|
| E-2OBEBO2-E | 22% |
| E-1O4OBEFL(1)ErBO4O1-E | 23% |
| X(2)-1O4OB(F)EB(DCF$_3$)ErBr(F)O4O1-X(2) | 23% |
| X(2)-1O6OBEFL(1)ErBO6O1-X(2) | 22% |
| Compound (3-1-7): Y = C5 alkyl | 9% |
| DTS-102 | 1% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −34.5 nm at an inclination angle of 40° with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 28

| | |
|---|---|
| E-2OBEBO2-E | 22% |
| E-1O4OBEFL(1)ErBO4O1-E | 23% |
| X(2)-1O6OB(F)2EB(DCF$_3$)Er2Br(F)O6O1-X(2) | 23% |
| Compound (2-2-236) | |
| X(2)-1O6OBEFL(1)ErBO6O1-X(2) | 22% |
| Compound (3-1-7): Y = C5 alkyl | 9% |
| DTS-102 | 1% |

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −32.5 nm at an inclination angle of 40° with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight)=2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

EXAMPLE 29

| | |
|---|---|
| E-20BEB02-E | 45% |
| X(2)-1060BEFL(1)ErB0601-X(2) | 45% |
| Compound shown below | 9% |
| DTS-102 | 1% |

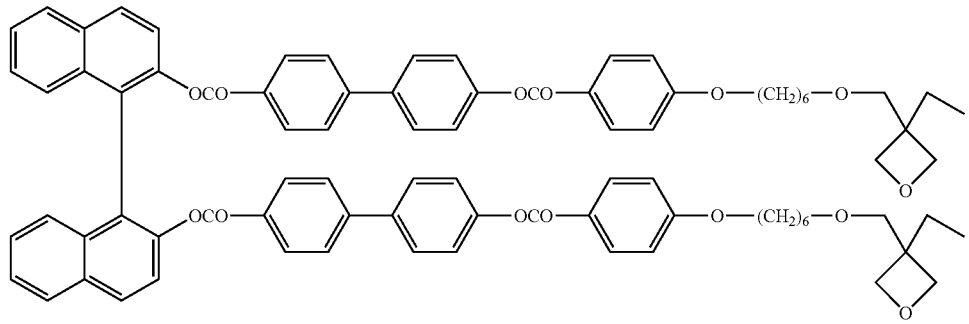

The composition shown above was dissolved in cyclopentanone to a concentration of 30% and coated onto a rubbing-treated polyimide-attached glass plate by a spin coating method, the solvent was removed under conditions of 70° C. for 3 minutes, and then polymerization was conducted in air to obtain a colorless, transparent optical thin-film. Measurement of the light transmission spectrum showed no selective reflection at 350 nm or higher. The effective retardation at 550 nm was measured and found to be 0 with vertical incidence and −34.0 nm at an inclination angle of 40° with respect to the normal to the layer surface, thus confirming its suitability as a negative C-plate. Also, the obtained anisotropy film exhibited excellent heat resistance in a heat resistance test, with a retardation change of less than 3%. The composition was also dissolved in a toluene/cyclopentanone mixed solvent (mixing ratio (by weight)=0.2:1) to a concentration of 30% and coated onto a rubbing-treated TAC film with a bar coater, the solvent was removed under conditions of 70° C. for 3 minutes, and then polymerization was conducted in air to obtain an optical anisotropy film with a satisfactory orientation property. Satisfactory results were obtained in an adhesion test, with 100 squares remaining.

INDUSTRIAL APPLICABILITY

The photopolymerizable liquid crystal composition of the invention, in terms of properties before curing, has a nematic phase at room temperature, has a wide nematic phase, exhibits satisfactory orientation properties and has rapid curing properties by UV irradiation in air, and in terms of properties after curing, has satisfactory adhesion with supports, exhibits sufficient heat and humidity resistance, has a suitable n and has transparency, and it is therefore useful as a optical element, and particularly as a optical compensation element for a liquid crystal display element.

What is claimed is:

1. A liquid crystal composition comprising a compound with oxiranyl as the first component and a compound with oxetanyl as the second component, wherein the compound with oxiranyl as the first component is a compound represented by any of the following formulas (1-1) to (1-3), and the compound with oxetanyl as the second component is a compound represented by any of the following formulas (2-1) to (2-3):

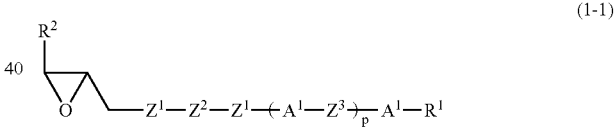

(1-1)

(1-2)

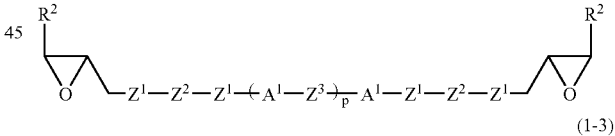

(1-3)

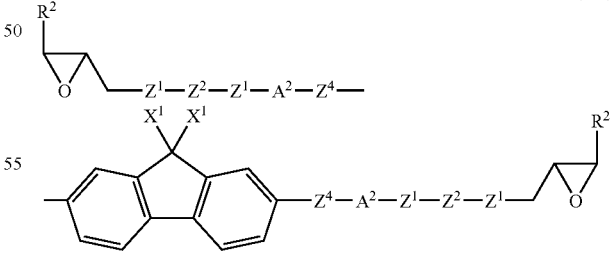

wherein, $R^1$ is a halogen, —CN, —NCS, —OCF$_3$,— OCF$_2$H, C2-30 alkenyl or C1-30 alkyl, wherein any —CH$_2$— in the alkyl or alkenyl may be replaced with —O— or —S—; $R^2$ is independently hydrogen, a halogen or C1-5 alkyl, wherein any hydrogen in the group may be replaced with a halogen; $Z^1$ is independently a single bond, —O—, —S—, —COO—, —OCO— or —OCOO—; $Z^2$ is independently a single bond or C1-30 alkylene, wherein any —CH$_2$— in the group may be replaced with —O— or —S—; $Z^3$ is independently a single bond, —CH$_2$CH$_2$—, —O—, —S—, —COO—, —OCO—, —C≡C—, —CH=CH—, —CH$_2$O—, —OCH$_2$—, —N=N—, —N=N(O)—, —CH$_2$S—, —SCH$_2$—, —N=CH—, —CH=N—, —CO—NH—, —NH—CO—, —OCO—CH=CH—, —CH=CH—COO—, —CH=CH—CO—NH—, —NH—CO—CH=CH—, —(CH$_2$)$_q$—COO— or —OCO—(CH$_2$)$_q$—; $Z^4$ is independently a single bond, —CH$_2$CH$_2$—, —O—, —COO—, —OCO— or —C≡C—; $A^1$ is independently an aromatic ring, aliphatic ring, heterocyclic ring or fused ring, and any hydrogen in the ring may be replaced with a halogen or C1-10 alkyl, wherein the hydrogens of the alkyl may be replaced with halogens; $A^2$ is independently 1,4-cyclohexylene, 1,4-phenylene or 1,4-phenylene with at least one hydrogen replaced with a halogen or C1-10 alkyl, wherein any hydrogen of the alkyl may be replaced with a halogen; $X^1$ is independently hydrogen, a halogen or C1-10 alkyl, wherein any hydrogen of the alkyl may be replaced with a halogen; p is an integer of 1-3; and q is an integer of 1-20,

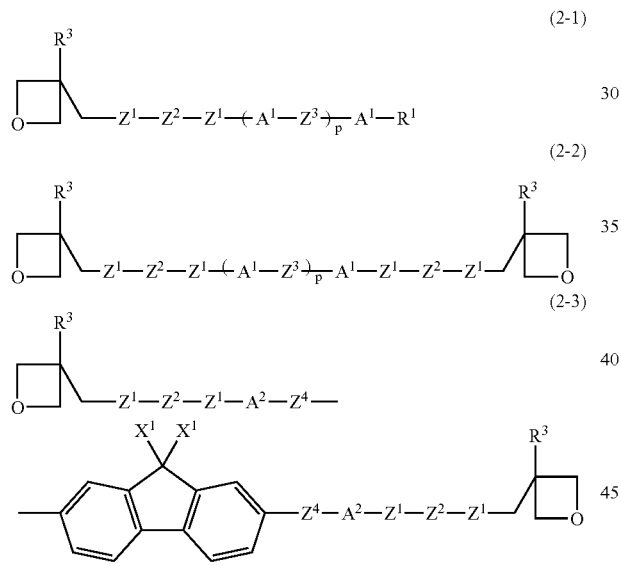

(2-1)

(2-2)

(2-3)

wherein, $R^1$ is a halogen, —CN, —NCS, —OCF$_3$,— OCF$_2$H, C2-30 alkenyl or C1-30 alkyl, wherein any —CH$_2$— in the alkyl or alkenyl may be replaced with —O— or —S—; $R^3$ is independently a halogen or C1-5 alkyl, wherein any hydrogen in the group may be replaced with a halogen; $Z^1$ is independently a single bond, —O—, —S—, —COO—, —OCO— or —OCOO—; $Z^2$ is independently a single bond or C1-30 alkylene, wherein any —CH$_2$— in the group may be replaced with —O— or —S—; $Z^3$ is independently a single bond, —CH$_2$CH$_2$—, —O—, —S—, —COO—, —OCO—, —OCOO—, —C≡C—, —CH=CH—, —CH$_2$O—, —OCH$_2$—, —N=N—, —N=N(O)—, —CH$_2$S—, —SCH$_2$—, —N=CH—, —CH=N—, —CO—NH—,—NH—CO—, —OCO—CH=CH—, —CH=CH—COO—, —CH=CH—CO—NH—, —NH—CO—CH=CH—, —(CH$_2$)$_q$—COO— or —OCO—(CH$_2$)$_q$—; $Z^4$ is independently a single bond, —CH$_2$CH$_2$—, —O—, —COO—, —OCO— or —C≡C—; $A^1$ is independently an aromatic ring, aliphatic ring, heterocyclic ring or fused ring, and any hydrogen in the ring may be replaced with a halogen or C1-10 alkyl, wherein the hydrogens of the alkyl may be replaced with halogens; $A^2$ is independently 1,4-cyclohexylene, 1,4-phenylene or 1,4-phenylene with at least one hydrogen replaced with a halogen or C1-10 alkyl, wherein any hydrogen of the alkyl may be replaced with a halogen; $X^1$ is independently hydrogen, a halogen or C1-10 alkyl, wherein any hydrogen of the alkyl may be replaced with a halogen; p is an integer of 1-3; and q is an integer of 1-20.

2. A liquid crystal composition according to claim 1, wherein in formulas (1-1), (1-2), (1-3), (2-1), (2-2) and (2-3), $R^2$ is hydrogen; $R^3$ is methyl or ethyl; $Z^3$ is independently a single bond, —CH$_2$CH$_2$—, —O—, —COO—, —OCO—, —OCOO—, —C≡C—, —CH=CH—, —CH$_2$O—, —OCH$_2$—, —OCO—CH=CH—, —CH=CH—COO—, —(CH$_2$)$_q$—COO—, —OCO—(CH$_2$)$_q$—, —N=N—, —N=CH— or —CH=N—; $A^1$ is a ring selected from the group represented by the following formulas (B1) to (B15); and q is an integer of 1-20:

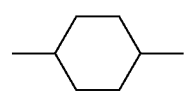  (B1)

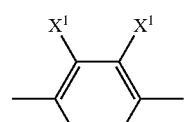  (B2)

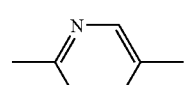  (B3)

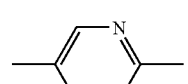  (B4)

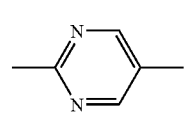  (B5)

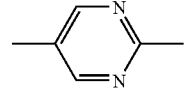  (B6)

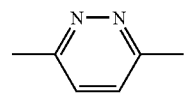  (B7)

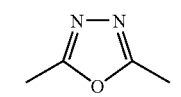  (B8)

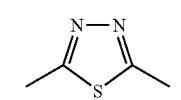  (B9)

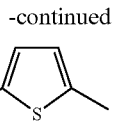
(B10)

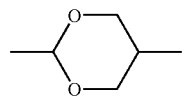
(B11)

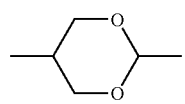
(B12)

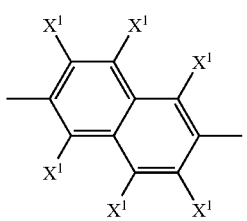
(B13)

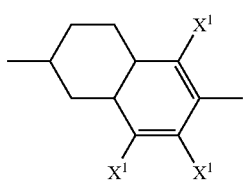
(B14)

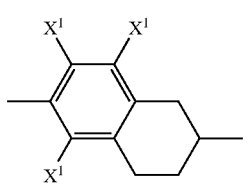
(B15)

wherein, $X^1$ is independently hydrogen, a halogen or C1-10 alkyl, wherein any hydrogen of the alkyl may be replaced with a halogen.

3. A liquid crystal composition according to claim 2, which comprises at least one compound selected from the group consisting of compounds represented by formulas (1-1) or (1-2) as the first component composed of a compound with oxiranyl, and at least one compound selected from the group consisting of compounds represented by formula (2-1) or (2-2) as the second component composed of a compound with oxetanyl.

4. The liquid crystal composition according to claim 2, which comprises at least one compound selected from the group consisting of compounds represented by formula (1-1) or (1-2) as the first component composed of a compound with oxiranyl, and at least one compound selected from the group consisting of compounds represented by formula (2-3) as the second component composed of a compound with oxetanyl.

5. The liquid crystal composition according to claim 2, which comprises at least one compound selected from the group consisting of compounds represented by formula (1-3) as the first component composed of a compound with oxiranyl, and at least one compound selected from the group consisting of compounds represented by formula (2-1) or (2-2) as the second component composed of a compound with oxetanyl.

6. A liquid crystal composition according to claim 2, which comprises at least one compound selected from the group consisting of compounds represented by formula (1-3) as the first component composed of a compound with oxiranyl, and at least one compound selected from the group consisting of compounds represented by formula (2-3) as the second component composed of a compound with oxetanyl.

7. The liquid crystal composition according to claim 3, wherein p=1 or 2 in formula (1-1), p=1 or 2 in formula (1-2), p=1 or 2 in formula (2-1) and p=1 or 2 in formula (2-2).

8. The liquid crystal composition according to claim 4, wherein p=1 or 2 in formula (1-1) and p=1 or 2 in formula (1-2).

9. The liquid crystal composition according to claim 5, wherein $Z^4$ is independently —COO— or —OCO— in formula (1-3), p=1 or 2 in formula (2-1) and p=1 or 2 in formula (2-2).

10. The liquid crystal composition according to claim 6, wherein $Z^4$ is independently —COO— or —OCO— in formula (1-3) and $Z^4$ is independently —COO— or —OCO— in formula (2-3).

11. The liquid crystal composition according to claim 1, wherein in formulas (1-1), (1-2), (1-3), (2-1), (2-2) and (2-3), $R^1$ is —CN, F, ethyl or propyl; $R^2$ is hydrogen; $R^3$ is methyl or ethyl; $Z^1$ is a single bond or —O—; $Z^2$ is a single bond or C1-10 alkylene in which any —CH$_2$— may be replaced by —O—; $Z^3$ is independently a single bond, —C≡C—, —COO—, —OCO—, —(CH$_2$)$_q$—COO— or —OCO—(CH$_2$)$_q$—; $Z^4$ is —COO— or —OCO—; $A^1$ is 1,4-phenylene, 2-fluoro-1,4-phenylene, 3-fluoro-1,4-phenylene, 2,3-difluoro-1,4-phenylene, 2-trifluoromethyl-1,4-phenylene, 3-trifluoromethyl-1,4-phenylene, 2,3-di-trifluoromethyl-1,4-phenylene, 2-methyl-1,4-phenylene, 3-methyl-1,4-phenylene, 2,3-dimethyl-1,4-phenylene or 1,4-hexylene; $X^1$ is hydrogen or methyl; and q is 2.

12. The liquid crystal composition according to claim 1, which comprises the first component in a range of 5-95 wt % and the second component in a range of 5-95 wt %, with respect to the total weight of the liquid crystal composition.

13. The liquid crystal composition according to claim 1, which further comprises an optically active compound as a third component.

14. The liquid crystal composition according to claim 13, wherein the optically active compound is any compound represented by the following formula (3-1),(3-2) or (3-3):

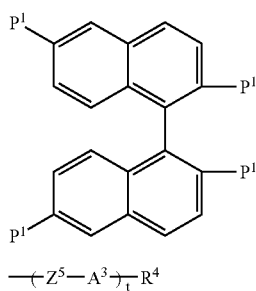

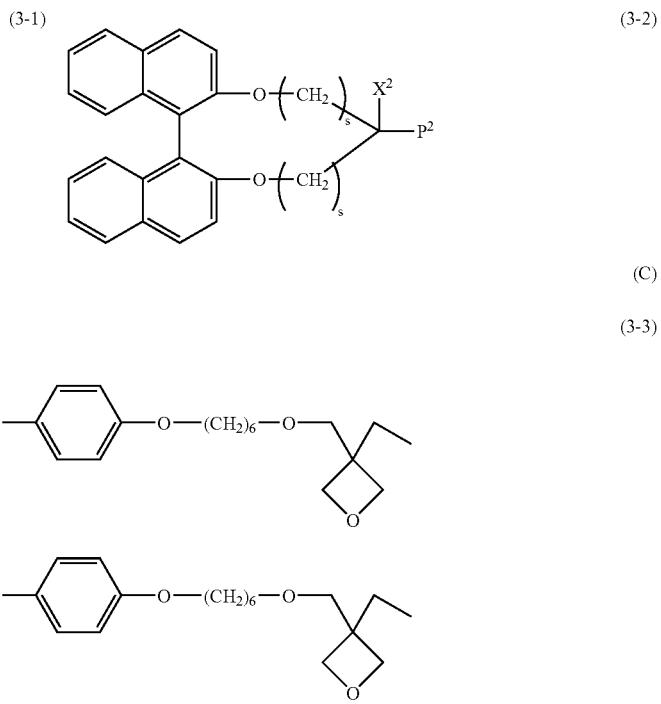

wherein P¹ is independently hydrogen, a halogen or (C), provided that at least two P¹ groups are (C); P² is (C); R⁴ is independently a halogen, —CN, C2-30 alkenyl or C1-30 alkyl, wherein any —CH₂— in the alkenyl or alkyl may be replaced with —O— or —S—, any hydrogen in the alkenyl or alkyl may be replaced with a halogen, and one hydrogen in the alkenyl or alkyl may be replaced with an epoxy or oxetane group; Z⁵ is independently a single bond, —O—, —COO—, —OCO—, —OCF₂— or —(CH₂)ᵣ—, wherein one —CH₂— of the —(CH₂)ᵣ— group may be replaced with —O—; X² is independently hydrogen, a halogen or C1-10 alkyl, wherein any hydrogen of the alkyl may be replaced with a halogen; A³ is independently 1,4-cyclohexylene, 1,4-phenylene or 1,4-phenylene with at least one hydrogen replaced with a halogen; r is an integer of 1-20; s is 0 or 1 and t is an integer of 1-3.

15. The liquid crystal composition according to claim 14, in formulas (3-1) and (C), P¹ is independently hydrogen or a group represented by formula (C); Z⁵ is a single bond, —OCO— or —O—(CH₂)—O—; A³ is 1,4-phenylene of 1,4-cyclohexylene; R⁴ is pentyl or a group represented by the following formula (5):

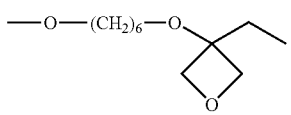

r is an integer of 1-20.

16. The liquid crystal composition according to claim 13, which comprises the first component in a range of 5-95 wt %, the second component in a range of 5-95 wt % and the third component in a range of 0.01-30 wt %, with respect to the total weight of the liquid crystal composition.

17. The liquid crystal composition according to claim 1, which comprises a non-polymerizable liquid crystal compound.

18. The liquid crystal composition according to claim 1, which is composed solely of a polymerizable compound.

19. A polymer composition obtained from a liquid crystal composition according to claim 17, which comprises a non-polymerizable liquid crystal compound.

20. A polymer obtained from a liquid crystal composition according to claim 18, which composed solely of a polymerizable compound.

21. The polymer composition according to claim 19, having a pitch of at least 1 μm and less than 200 μm.

22. The polymer according to claim 20, having a pitch of at least 1 μm and less than 200 μm.

23. The polymer composition according to claim 19, having a selective reflection wavelength range of at least 350 nm and less than 800 nm.

24. The polymer according to claim 20, having a selective reflection wavelength range of at least 350 nm and less than 800 nm.

25. The polymer composition according to claim 19, having a selective reflection wavelength range of less than 350 nm.

26. The polymer according to claim 20, having a selective reflection wavelength range of less than 350 nm.

27. A film comprising a polymer composition according to claim 19.

28. An optical compensation element employing a polymer composition according to claim 19.

29. A film comprising a polymer composition according to claim 20.

30. An optical compensation element employing a polymer composition according to claim 20.

* * * * *